(12) United States Patent
Nishiki

(10) Patent No.: US 10,724,849 B2
(45) Date of Patent: Jul. 28, 2020

(54) DISPLACEMENT MEASURING APPARATUS

(71) Applicant: Keyence Corporation, Osaka (JP)

(72) Inventor: Masakazu Nishiki, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 16/601,604

(22) Filed: Oct. 15, 2019

(65) Prior Publication Data
US 2020/0149873 A1 May 14, 2020

(30) Foreign Application Priority Data
Nov. 9, 2018 (JP) .................................. 2018-211022

(51) Int. Cl.
*G01B 11/06* (2006.01)
*G01B 11/14* (2006.01)
*G01B 11/25* (2006.01)
*G02B 26/10* (2006.01)
*G02B 26/08* (2006.01)
(Continued)

(52) U.S. Cl.
CPC .......... *G01B 11/0608* (2013.01); *G01B 11/14* (2013.01); *G01B 11/2518* (2013.01); *G02B 26/0833* (2013.01); *G02B 26/105* (2013.01); *G06T 7/70* (2017.01); *G03B 21/145* (2013.01);
(Continued)

(58) Field of Classification Search
CPC . G01B 11/0608; G01B 11/14; G01B 11/2518; G06T 7/70; G06T 2207/20208; G02B 26/0833; G02B 26/105; G03B 21/145; G03B 21/53
See application file for complete search history.

(56) References Cited

U.S. PATENT DOCUMENTS 4,181,430 A * 1/1980 Shirota ............... B61K 9/08
33/287
5,171,984 A * 12/1992 van Rosmalen ..... G02B 26/121
250/236
(Continued)

FOREIGN PATENT DOCUMENTS

JP         2000193428 A      7/2000

OTHER PUBLICATIONS

U.S. Appl. No. 16/601,603, filed Oct. 15, 2019 (182 pages).
(Continued)

*Primary Examiner* — Deoram Persaud
(74) *Attorney, Agent, or Firm* — Kilyk & Bowersox, P.L.L.C.

(57) ABSTRACT

To enable measuring a displacement at a predetermined position of a measurement object for a short time at a high accuracy. While a scanning mirror is moved in a first scanning range to cause measurement light to irradiate a measurement position, a first irradiation angle of the scanning mirror at the time the measurement light is emitted to the measurement position is obtained. While a scanning mirror is moved in a second scanning range that covers the first irradiation angle and that is narrower than the first scanning range, and a second irradiation angle at the time the measurement light is emitted to the measurement position is obtained. A light receiver outputs a received-light quantity distribution, and a displacement at the measurement position is measured on the basis of the second irradiation angle and the position in a second direction of the measurement position.

9 Claims, 45 Drawing Sheets

(51) Int. Cl.
  *G06T 7/70* (2017.01)
  *G03B 21/53* (2006.01)
  *G03B 21/14* (2006.01)

(52) U.S. Cl.
  CPC .... *G03B 21/53* (2013.01); *G06T 2207/20208* (2013.01)

(56) References Cited

U.S. PATENT DOCUMENTS

| | | | | |
|---|---|---|---|---|
| 5,668,631 | A * | 9/1997 | Norita | G01B 11/2518 |
| | | | | 250/559.22 |
| 5,789,743 | A * | 8/1998 | Van Rosmalen | G11B 7/0025 |
| | | | | 250/234 |
| 7,639,373 | B2 * | 12/2009 | Torii | G01B 11/0608 |
| | | | | 356/614 |
| 9,205,850 | B2 * | 12/2015 | Shimada | B61K 9/08 |
| 9,488,469 | B1 * | 11/2016 | Michael | G01B 11/25 |
| 9,568,358 | B2 * | 2/2017 | Nakamura | G01J 1/0422 |
| 2003/0227635 | A1 * | 12/2003 | Muller | G01B 11/026 |
| | | | | 356/614 |
| 2008/0088856 | A1 * | 4/2008 | Nishio | G01B 11/026 |
| | | | | 356/623 |
| 2008/0094643 | A1 * | 4/2008 | Nishio | G01B 11/026 |
| | | | | 356/623 |
| 2013/0169974 | A1 * | 7/2013 | Iwayama | B29D 30/3007 |
| | | | | 356/601 |
| 2014/0168630 | A1 * | 6/2014 | Iida | G01C 3/08 |
| | | | | 356/3 |
| 2014/0320812 | A1 * | 10/2014 | Yoshida | A61B 3/102 |
| | | | | 351/206 |
| 2016/0223654 | A1 * | 8/2016 | Sparbert | G01S 17/89 |
| 2019/0025409 | A1 * | 1/2019 | Kawazoe | G01S 7/4814 |

OTHER PUBLICATIONS

U.S. Appl. No. 16/601,605, filed Oct. 15, 2019 (181 pages).
U.S. Appl. No. 16/601,606, filed Oct. 15, 2019 (160 pages).
U.S. Appl. No. 16/601,608, filed Oct. 15, 2019 (113 pages).

* cited by examiner

FIG. 22

| PROGRAM 01 | | SETTING EXAMPLE |
|---|---|---|
| MODE | | SCANNING MODE |
| TRIGGER RELATED CONDITION | TRIGGER METHOD | INTERNAL TRIGGER/EXTERNAL TRIGGER |
| TRIGGER RELATED CONDITION | INTERNAL TRIGGER PERIOD | 50ms |
| TRIGGER RELATED CONDITION | IMAGING DELAY TIME | 10ms |
| IMAGING RELATED CONDITION | BRIGHTNESS | 50 |
| IMAGING RELATED CONDITION | MODE | NORMAL/HDR/Hi-Gain |
| IMAGING RELATED CONDITION | INTERNAL ILLUMINATION | ON/OFF |
| MEASUREMENT RELATED CONDITION | MEASUREMENT DIRECTION | NORMAL/REVERSE |
| MEASUREMENT RELATED CONDITION | MEASUREMENT MODE | HIGH SENSITIVE/HIGH SPEED |
| MASTER | IMAGE | |
| MASTER | HEIGHT DATA 1 | |
| MASTER | HEIGHT DATA 2 | |
| MASTER | HEIGHT DATA 3 | |
| HEAD TILT CORRECTION | CORRECTION | ACTIVE/INACTIVE |
| HEAD TILT CORRECTION | USING IMAGE | Master/ANOTHER IMAGE |
| HEAD TILT CORRECTION | CORRECT EACH TIME OF DETECTION | INACTIVE/ACTIVE |
| HEAD TILT CORRECTION | MEASUREMENT POSITION 1 (CENTER COORDINATE) | (159.5, 119.5) |
| HEAD TILT CORRECTION | MEASUREMENT POSITION 2 (CENTER COORDINATE) | (259.5, 219.5) |
| HEAD TILT CORRECTION | MEASUREMENT POSITION 3 (CENTER COORDINATE) | (59.5, 19.5) |
| HEAD TILT CORRECTION | POINT SIZE | NORMAL/SMALL/LARGE |
| EXTERNAL OUTPUTS 1 TO 10 | OUTPUT ASSIGNMENT | OFF/COMPREHENSIVE DETERMINATION/BUSY/ERROR/RESULT OF TOOL 1 |
| TOOL 00 | TOOL TYPE | POSITION CORRECTION |
| TOOL 00 | TEMPLATE SHAPE | RECTANGLE |
| TOOL 00 | TEMPLATE POSITION (CENTER COORDINATE) | (159.5, 119.5) |
| TOOL 00 | TEMPLATE RANGE (WIDTH, HEIGHT) | (100.0, 100.0) |
| TOOL 00 | TEMPLATE ANGLE | 0 |
| TOOL 00 | SHAPE OF DETECTION RANGE | RECTANGLE |
| TOOL 00 | POSITION OF DETECTION RANGE (CENTER COORDINATE) | (159.5, 119.5) |
| TOOL 00 | DETECTION RANGE (WIDTH, HEIGHT) | (320.0, 240.0) |
| TOOL 00 | THRESHOLD | 70 |
| TOOL 00 | ROTATION ACCEPTABLE RANGE (LOWER LIMIT, UPPER LIMIT) | (-180, 180) |
| TOOL 01 | TOOL TYPE | HEIGHT |
| TOOL 01 | MEASUREMENT POSITION (CENTER COORDINATE) | (159.5, 119.5) |
| TOOL 01 | MEASUREMENT SIZE | NORMAL/SMALL/LARGE |
| TOOL 01 | USING RANGE | ±10mm |
| TOOL 01 | | 1.00mm |
| TOOL 01 | UPPER LIMIT OF THRESHOLD | 2.00mm |
| TOOL 01 | LOWER LIMIT OF THRESHOLD | 0.00mm |
| TOOL 02 | MEASUREMENT POSITION A (CENTER COORDINATE) | (100.5, 100.5) |
| TOOL 02 | MEASUREMENT SIZE A | NORMAL/SMALL/LARGE |
| TOOL 02 | USING RANGE A | ±10mm |
| TOOL 02 | MEASUREMENT POSITION B (CENTER COORDINATE) | (50.5, 50.5) |
| TOOL 02 | MEASUREMENT SIZE B | NORMAL/SMALL/LARGE |
| TOOL 02 | USING RANGE B | ±10mm |
| TOOL 02 | OFFSET TARGET VALUE | 1.00mm |
| TOOL 02 | UPPER LIMIT OF THRESHOLD | 2.00mm |
| TOOL 02 | LOWER LIMIT OF THRESHOLD | 0.00mm |
| TOOL 03 | TOOL TYPE | AREA |
| TOOL 03 | INEFFECTIVE/EFFECTIVE OF HI SETTING VALUE | EFFECTIVE |
| TOOL 03 | BRIGHTNESS EXTRACTION RANGE (LOWER LIMIT, UPPER LIMIT) | (100, 125) |
| TOOL 03 | THRESHOLD: SETTING VALUE (LOWER LIMIT, UPPER LIMIT) | (50, 150) |

FIG. 23

| PROGRAM 02 | | SETTING EXAMPLE |
|---|---|---|
| MODE | | LINE MODE |
| MEASUREMENT RELATED CONDITION | SAMPLING PERIOD | 10ms |
| MEASUREMENT RELATED CONDITION | NUMBER OF AVERAGING TIMES | TWO TIMES |
| MEASUREMENT RELATED CONDITION | LASER POSITION | 10 |
| MEASUREMENT RELATED CONDITION | MEASUREMENT DIRECTION | NORMAL/REVERSE |
| IMAGING RELATED CONDITION | BRIGHTNESS | 50 |
| IMAGING RELATED CONDITION | MODE | NORMAL/HDR/Hi-Gain |
| IMAGING RELATED CONDITION | INTERNAL ILLUMINATION | ON/OFF |
| MASTER | IMAGE | |
| MASTER | HEIGHT DATA | |
| EXTERNAL OUTPUTS 1 TO 10 | ASSIGNMENT TO OUTPUT PINS | OFF/COMPREHENSIVE DETERMINATION/BUSY/ERROR/RESULT OF TOOL 1 |
| TOOL 00 | TOOL TYPE | POSITION CORRECTION |
| TOOL 00 | POSITION OF DETECTION RANGE (CENTER COORDINATE) | 150 |
| TOOL 00 | DETECTION RANGE (WIDTH) | 100 |
| TOOL 00 | DETECTION SENSITIVITY | NORMAL |
| TOOL 01 | TOOL TYPE | HEIGHT |
| TOOL 01 | MEASUREMENT POSITION (CENTER COORDINATE) | 100 |
| TOOL 01 | MEASUREMENT POSITION (WIDTH) | 50 |
| TOOL 01 | MEASUREMENT METHOD | AVERAGE |
| TOOL 01 | OFFSET TARGET VALUE | 1.00mm |
| TOOL 01 | UPPER LIMIT OF THRESHOLD | 2.00mm |
| TOOL 01 | LOWER LIMIT OF THRESHOLD | 0.00mm |
| TOOL 02 | TOOL TYPE | HEIGHT DIFFERENCE |
| TOOL 02 | MEASUREMENT POSITION A (CENTER COORDINATE) | 50 |
| TOOL 02 | MEASUREMENT POSITION A (WIDTH) | 20 |
| TOOL 02 | MEASUREMENT METHOD A | AVERAGE |
| TOOL 02 | MEASUREMENT POSITION B (CENTER COORDINATE) | 150 |
| TOOL 02 | MEASUREMENT POSITION B (WIDTH) | 30 |
| TOOL 02 | MEASUREMENT METHOD B | AVERAGE |
| TOOL 02 | OFFSET TARGET VALUE | 1.00mm |
| TOOL 02 | UPPER LIMIT OF THRESHOLD | 2.00mm |
| TOOL 02 | LOWER LIMIT OF THRESHOLD | 0.00mm |

FIG. 24

| PROGRAM 03 | | SETTING EXAMPLE |
|---|---|---|
| MODE | | SCANNING MODE |
| TRIGGER RELATED CONDITION | TRIGGER METHOD | INTERNAL TRIGGER/EXTERNAL TRIGGER |
| TRIGGER RELATED CONDITION | INTERNAL TRIGGER PERIOD | 50ms |
| TRIGGER RELATED CONDITION | IMAGING DELAY TIME | 10ms |
| IMAGING RELATED CONDITION | BRIGHTNESS | 50 |
| IMAGING RELATED CONDITION | MODE | NORMAL/HDR/Hi-Gain |
| IMAGING RELATED CONDITION | INTERNAL ILLUMINATION | ON/OFF |
| MEASUREMENT RELATED CONDITION | MEASUREMENT DIRECTION | NORMAL/REVERSE |
| MEASUREMENT RELATED CONDITION | MEASUREMENT MODE | HIGH SENSITIVE/HIGH SPEED |
| MASTER | IMAGE | |
| MASTER | HEIGHT DATA 1 | |
| MASTER | HEIGHT DATA 2 | |
| MASTER | HEIGHT DATA 3 | |
| HEAD TILT CORRECTION | CORRECTION | ACTIVE/INACTIVE |
| HEAD TILT CORRECTION | USING IMAGE | Master/ANOTHER IMAGE |
| HEAD TILT CORRECTION | CORRECT EACH TIME OF DETECTION | INACTIVE/ACTIVE |
| HEAD TILT CORRECTION | MEASUREMENT POSITION 1 (CENTER COORDINATE) | (159.5, 119.5) |
| HEAD TILT CORRECTION | MEASUREMENT POSITION 2 (CENTER COORDINATE) | (259.5, 219.5) |
| HEAD TILT CORRECTION | MEASUREMENT POSITION 3 (CENTER COORDINATE) | (59.5, 19.5) |
| HEAD TILT CORRECTION | POINT SIZE | NORMAL/SMALL/LARGE |
| EXTERNAL OUTPUTS 1 TO 10 | OUTPUT ASSIGNMENT | OFF/COMPREHENSIVE DETERMINATION/BUSY/ERROR/RESULT OF TOOL 1 |
| TOOL 00 | TOOL TYPE | POSITION CORRECTION |
| TOOL 00 | TEMPLATE SHAPE | RECTANGLE |
| TOOL 00 | TEMPLATE POSITION (CENTER COORDINATE) | (159.5, 119.5) |
| TOOL 00 | TEMPLATE RANGE (WIDTH, HEIGHT) | (100.0, 100.0) |
| TOOL 00 | TEMPLATE ANGLE | 0 |
| TOOL 00 | SHAPE OF DETECTION RANGE | RECTANGLE |
| TOOL 00 | POSITION OF DETECTION RANGE (CENTER COORDINATE) | (159.5, 119.5) |
| TOOL 00 | DETECTION RANGE (WIDTH, HEIGHT) | (320.0, 240.0) |
| TOOL 00 | THRESHOLD | 70 |
| TOOL 00 | ROTATION ACCEPTABLE RANGE (LOWER LIMIT, UPPER LIMIT) | (-180, 180) |
| TOOL 01 | TOOL TYPE | MAX/MIN |
| TOOL 01 | MEASUREMENT METHOD | MAX / MIN |
| TOOL 01 | SHAPE OF DETECTION RANGE | RECTANGLE/CIRCLE |
| TOOL 01 | AVERAGE SIZE | SMALL/LARGE |
| TOOL 01 | POSITION OF DETECTION RANGE (CENTER COORDINATE) | (159.5, 119.5) |
| TOOL 01 | DETECTION RANGE (WIDTH, HEIGHT) | (320.0, 240.0) |
| TOOL 01 | UPPER LIMIT OF USING RANGE | +10mm |
| TOOL 01 | LOWER LIMIT OF USING RANGE | -10mm |
| TOOL 01 | OFFSET TARGET VALUE | 1.00mm |
| TOOL 01 | UPPER LIMIT OF THRESHOLD | 2.00mm |
| TOOL 01 | LOWER LIMIT OF THRESHOLD | 0.00mm |
| TOOL 02 | TOOL TYPE | DESIGNATED-HEIGHT AREA |
| TOOL 02 | SHAPE OF DETECTION RANGE | RECTANGLE/CIRCLE |
| TOOL 02 | AVERAGE SIZE | SMALL/LARGE |
| TOOL 02 | POSITION OF DETECTION RANGE (CENTER COORDINATE) | (159.5, 119.5) |
| TOOL 02 | DETECTION RANGE (WIDTH, HEIGHT) | (320.0, 240.0) |
| TOOL 02 | UPPER LIMIT OF HEIGHT EXTRACTION RANGE | +10mm |
| TOOL 02 | LOWER LIMIT OF HEIGHT EXTRACTION RANGE | -10mm |
| TOOL 02 | INEFFECTIVE/EFFECTIVE OF HI SETTING VALUE | EFFECTIVE |
| TOOL 02 | THRESHOLD: SETTING VALUE (LOWER LIMIT, UPPER LIMIT) | (50, 150) |

DISPLACEMENT MEASURING APPARATUS

CROSS-REFERENCE TO RELATED APPLICATIONS

The present application claims foreign priority based on Japanese Patent Application No. 2018-211022, filed Nov. 9, 2018, the contents of which is incorporated herein by reference.

BACKGROUND OF THE INVENTION

1. Field of the Invention

The present invention relates to a displacement measuring apparatus that measures a displacement at a predetermined position of a measurement object.

2. Description of Related Art

A three-dimensional measuring method using the principle of triangulation, generally called a "light section method", is conventionally known (e.g., JP-A-2000-193428). In this method, strip-shaped measurement light is emitted to a surface of a measurement object in such a way that the measurement object is cut, and light that is reflected back from the surface of the measurement object is received by a light receiving element, whereby height information is obtained.

JP-A-2000-193428 discloses an apparatus that scans a measurement object in a stationary state by emitting measurement light in a direction perpendicular to an extending direction of the measurement light, to measure a three-dimensional shape of the measurement object.

SUMMARY OF THE INVENTION

The apparatus disclosed in JP-A-2000-193428 scans the whole measurement object by using measurement light to measure a three-dimensional shape of the measurement object, and therefore, a time required from start to finish the measurement tends to be prolonged.

In an actual measurement site of a measurement object, it may not be necessary to measure a displacement of every part of the whole measurement object, and for example, measuring a displacement of only some parts may be enough. The apparatus disclosed in JP-A-2000-193428 operates to scan the whole measurement object by using the measurement light even though it is necessary to measure a displacement of only some parts. Thus, the time required for the measurement tends to be prolonged.

In consideration of this, a user may determine a measurement position of a measurement object and may limit a scanning range of the measurement light to cause the measurement light to irradiate the determined measurement position and the vicinity of the determined measurement position. However, in making the measurement light irradiate the measurement position and the vicinity of the measurement position, the angle of irradiation is not intuitively known. As a result, the measurement light is made to irradiate a range that is wider than a range covering the measurement position and the vicinity of the measurement position, and therefore, it is difficult to sufficiently reduce the time required for the measurement.

Meanwhile, it is desired to further increase accuracy of measurement at a measurement position in the displacement measuring apparatus. The measurement accuracy is improved by setting a fine pitch of the measurement light relative to the measurement position, that is, irradiating the measurement light at high density. However, in this case, the measurement light is emitted at a fine pitch to a range covering the measurement position and the vicinity of the measurement position, whereby the time required for measurement may be further prolonged.

The present invention has been achieved in view of these circumstances, and an object of the present invention is to enable measuring a displacement at a predetermined position of a measurement object for a short time at a high accuracy.

To achieve the above-described object, a first aspect of the invention provides a displacement measuring apparatus for measuring a displacement at a predetermined position of a measurement object. The displacement measuring apparatus includes a light projector, a scanning part, a light receiver, a setting unit, an angle measuring unit, a measurement controller, and a displacement measuring unit. The light projector includes a measurement light source and a light projection lens that receives light from the measurement light source. The light projector is configured to emit strip-shaped measurement light extending in a first direction, to the measurement object. The scanning part includes a scanning mirror that is configured to perform scanning using the measurement light in a second direction crossing the first direction. The light receiver includes a two-dimensional light receiving element. The two-dimensional light receiving element is configured to output a received-light quantity distribution for displacement measurement in response to sequentially receiving the measurement light. The measurement light is made to scan by the scanning part and is reflected back from different positions in the second direction of the measurement object. The setting unit is configured to receive setting of a measurement position at which a displacement is measured in a range scannable by the scanning part. The angle measuring unit is configured to measure an irradiation angle of the scanning mirror. The measurement controller is configured to acquire a first irradiation angle of the scanning mirror that is measured by the angle measuring unit at the time the measurement light is emitted to the measurement position while the measurement controller moves the scanning mirror in a first scanning range that is narrower than the scannable range to cause the measurement light to irradiate at least the measurement position that is set by the setting unit. The measurement controller is further configured to acquire a second irradiation angle of the scanning mirror that is measured by the angle measuring unit at the time the measurement light is emitted to the measurement position while the measurement controller moves the scanning mirror in a second scanning range that covers the first irradiation angle and that is narrower than the first scanning range. The displacement measuring unit is configured to acquire the received-light quantity distribution for displacement measurement output from the light receiver and to measure the displacement at the measurement position on the basis of the second irradiation angle and the position in the second direction of the measurement position.

With this structure, the measurement light is emitted to different positions in the second direction of the measurement object by moving the scanning mirror in the first scanning range. The measurement light that is respectively reflected back from the different positions is received by the light receiver, and the light receiver outputs the received-light quantity distribution for displacement measurement. After the measurement controller determines the first irradiation angle of the scanning mirror at the time the measurement light is emitted to the measurement position, the measurement controller moves the scanning mirror in the second scanning range that is narrower than the first scanning range. The second scanning range covers the measurement position, and therefore, the second irradiation angle of the scanning mirror at the time the measurement light is emitted to the measurement position is determined.

The second scanning range that is narrower than the first scanning range suppresses increase in the measurement time to the minimum even when the measurement light is emitted to the measurement position at a fine pitch, that is, in a dense manner.

The scanning part can be constituted of, for example, a MEMS mirror, a galvanometer mirror, or a mirror that is rotated by a stepping motor. The "MEMS" is an abbreviation of "Micro Electro Mechanical Systems" and is a generally called "micro electro mechanical system".

According to a second aspect of the invention, the displacement measuring unit may acquire the received-light quantity distribution for displacement measurement, which is output from the light receiver while scanning is performed in the first scanning range, at intervals longer than the intervals of the acquisition of the received-light quantity distribution for displacement measurement, which is output from the light receiver while scanning is performed in the second scanning range.

With this structure, the displacement measuring unit acquires the received-light quantity distribution for displacement measurement output from the light receiver, at a relatively long interval in scanning in the first scanning range. Thus, scanning is performed in the first scanning range rapidly. On the other hand, in scanning in the second scanning range, the displacement measuring unit acquires the received-light quantity distribution for displacement measurement output from the light receiver, at a relatively short interval. Thus, dense scanning is performed in the second scanning range. This enables measuring a displacement at a predetermined position of a measurement object for a short time at a high accuracy.

According to a third aspect of the invention, the measurement controller may perform a second scanning process for scanning the measurement object at a relatively small pitch by using the measurement light in the second scanning range after performing a first scanning process for scanning the measurement object at a relatively large pitch by using the measurement light in the first scanning range. In this case, the displacement measuring unit may be configured to measure the displacement at the measurement position on the basis of the received-light quantity distribution obtained at the time the measurement light is emitted to a region containing the measurement position in the second scanning process.

With this structure, the measurement light scans the measurement object at a relatively large pitch in the first scanning process, whereby a wide range of the measurement object is scanned for a short time. After the first scanning process is performed, the second scanning process for scanning at a relatively small pitch is performed, thereby densely measuring a displacement at the measurement position and in the vicinity of the measurement position. The "pitch" refers to a pitch at which the measurement light scans, and for example, the pitch can also be represented by the number of rays of irradiated measurement light per unit length.

According to a fourth aspect of the invention, the setting unit may be configured to set multiple positions that differ from each other at least in the second direction in the range scannable by the scanning part, as measurement positions at which a displacement is to be measured. In this case, the measurement controller may be configured to cause the measurement light to irradiate each of the measurement positions in the first scanning range and in the second scanning range, in this order.

With this structure, the measurement light is made to irradiate each measurement position in the first scanning range and in the second scanning range, in this order, when multiple measurement positions are set. Thus, displacements at the multiple measurement positions are measured for a short time at a high accuracy.

According to a fifth aspect of the invention, the setting unit may be configured to set multiple positions that differ from each other at least in the second direction in the range scannable by the scanning part, as a first measurement position and a second measurement position at which a displacement is to be measured. In this case, the measurement controller may be configured to cause the measurement light to irradiate the first measurement position in the first scanning range and in the second scanning range, in this order, and then irradiate the second measurement position in the first scanning range and in the second scanning range, in this order.

With this structure, after a displacement at the first measurement position is measured at a high accuracy, a displacement at the second measurement position is also measured at a high accuracy.

According to a sixth aspect of the invention, the setting unit may be configured to set multiple positions that differ from each other at least in the second direction in the range scannable by the scanning part, as a first measurement position and a second measurement position at which a displacement is to be measured. In this case, the measurement controller may be configured to cause the measurement light to irradiate the first measurement position and the second measurement position in the first scanning range and then irradiate the first measurement position and the second measurement position in the second scanning range.

According to a seventh aspect of the invention, the displacement measuring apparatus may further include a measurement tool selector. The measurement tool selector may have multiple measurement tools, in which dimensions of displacement measurement regions differ from each other, and may be configured to receive selection of the measurement tool that is freely selected from among the multiple measurement tools. In this case, the measurement controller may be configured to vary the pitch of the measurement light for scanning the measurement position, in accordance with dimensions of the measurement region of the measurement tool selected by the measurement tool selector.

This structure enables a user to freely select between a measurement tool in which the measurement region is relatively large and a measurement tool in which the measurement region is relatively small. In using the measurement tool in which the measurement region is relatively large, the measurement region is irradiated with the measurement light although the pitch of the measurement light for scanning is large, compared with a case of using the measurement tool in which the measurement region is relatively small. In view of this, in the case of using the measurement tool in which the measurement region is relatively large, the pitch of the measurement light for scanning is made large, whereas in the case of the measurement tool in which the measurement region is relatively small, the pitch of the measurement light for scanning is made small. This enables appropriately setting the speed and the accuracy of the measurement in accordance with the dimensions of the measurement region.

According to an eighth aspect of the invention, the measurement controller may move the scanning mirror to cause the measurement light to irradiate the measurement region of the measurement tool that is selected by the measurement tool selector.

According to a ninth aspect of the invention, the measurement controller may move the scanning mirror to cause the measurement light to irradiate the measurement region of the measurement tool selected by the measurement tool selector, at intervals in the second direction multiple times. In this case, the displacement measuring unit may be configured to measure the displacement at the measurement position multiple times by acquiring the received-light quantity distribution for displacement measurement, which is output from the light receiver, each time the measurement light is emitted. The displacement measuring unit may be further configured to average the obtained multiple displacements.

With this structure, results of multiple times of measurements are averaged, thereby increasing measurement accuracy.

In the present invention, a first irradiation angle of the scanning mirror at the time the measurement light is emitted to the measurement position is obtained while the measurement light scans in the first scanning range. Moreover, while the scanning mirror is moved in a second scanning range that covers the first irradiation angle and that is narrower than the first scanning range, a second irradiation angle of the scanning mirror at the time the measurement light is emitted to the measurement position is obtained. In these conditions, a displacement at the measurement position is measured on the basis of the second irradiation angle and the position in the second direction of the measurement position. Thus, a displacement at a predetermined position of the measurement object is measured for a short time at a high accuracy.

BRIEF DESCRIPTION OF THE DRAWINGS

FIG. 17A shows a case of scanning the whole region in a Z-direction by using measurement light in measuring a measurement object at a first position;

FIG. 17B shows a case of scanning a narrow range in the Z-direction by using the measurement light in measuring the measurement object at the first position;

FIG. 17C shows a case of scanning the whole region in the Z-direction by using the measurement light in measuring a measurement object at a second position;

FIG. 17D shows a case of scanning a narrow range in the Z-direction by using the measurement light in measuring the measurement object at the second position;

FIG. 18A shows a case in which a measurement object is at a first position;

FIG. 18B shows a case in which a measurement object is at a second position;

FIG. 19A shows a case in which the tool size is large;

FIG. 19B shows a case in which the tool size is small;

FIG. 22 shows contents of a first program;

FIG. 23 shows contents of a second program;

FIG. 24 shows contents of a third program;

DESCRIPTION OF EMBODIMENTS

Embodiments of the present invention are explained in detail below with reference to the drawings. However, the following descriptions of the embodiments are substantially only illustrations and are not intended to limit the present invention, objects using the present invention, and use of the present invention.

Figure 1:
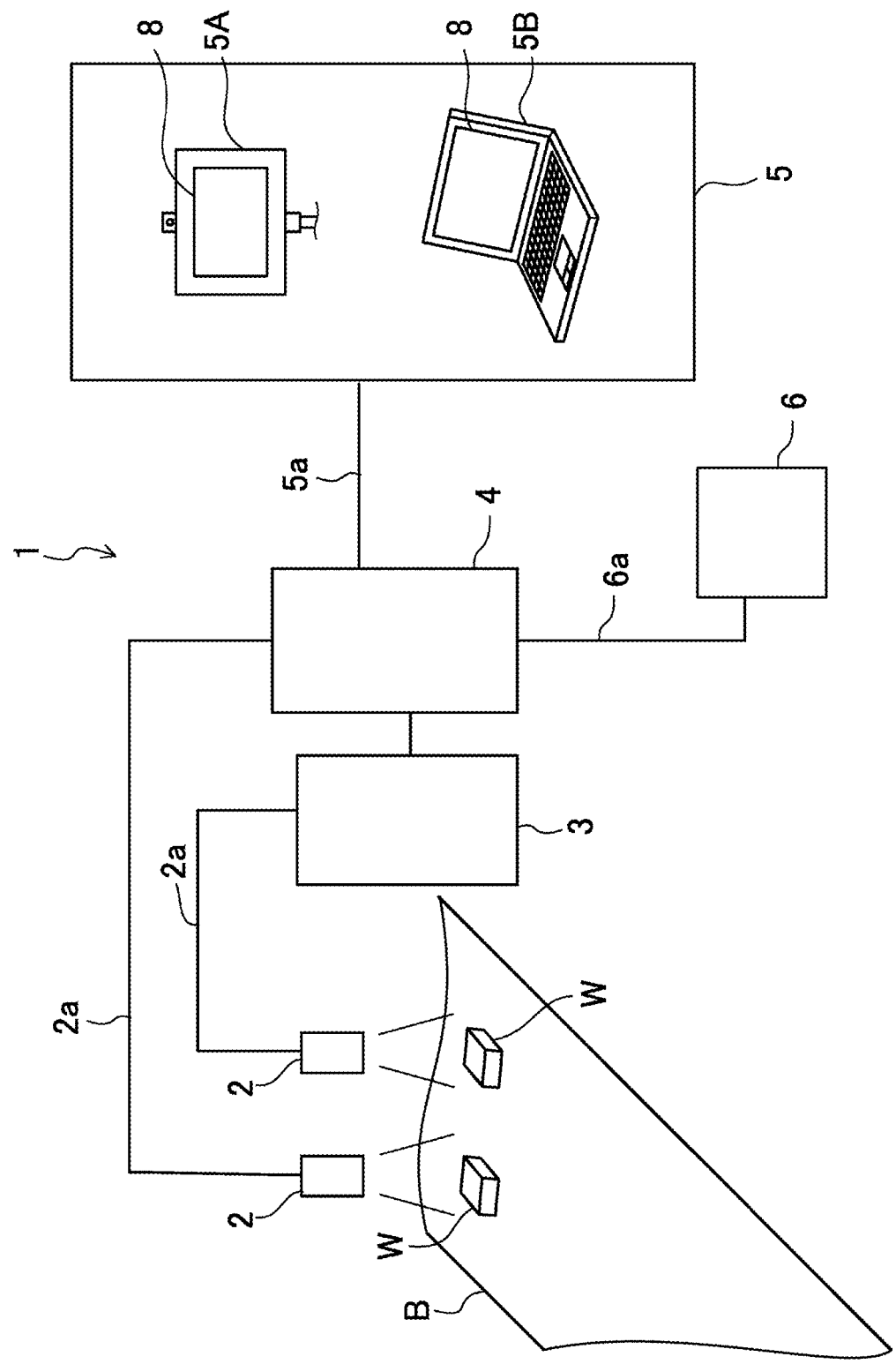
FIG. 1 is a schematic explanatory diagram showing an operation situation of a displacement measuring apparatus according to an embodiment of the present invention.

FIG. 1 is a schematic diagram showing an operation situation of a displacement measuring apparatus 1 according to an embodiment of the present invention. The displacement measuring apparatus 1 is an apparatus or a system that measures a displacement of a predetermined position of a measurement object W. The displacement measuring apparatus 1 can be simply called a "displacement meter" or can also be called another name such as "distance measuring meter" or "height displacement meter". Although details are described later, the displacement measuring apparatus 1 that is used in a scanning mode for scanning with measurement light can also be called an "apparatus including an image sensor added with a displacement meter" or an "apparatus including a displacement meter that measures a variable part". In this embodiment, a displacement at each part of the measurement object W may be measured, and thus, the displacement measuring apparatus 1 can also be called a "three-dimensional measuring system". In addition, the displacement measurement is also called "height measurement" in this embodiment.

FIG. 1 shows a situation in which a measurement object W is conveyed by a conveying device, such as a belt conveyor B for conveyance, that is, a situation in which the measurement object W is moved. However, the situation is not limited to that shown in FIG. 1, and the measurement object W may remain stationary. The number of the measurement objects W that are able to be measured at once is one or multiple, and displacements of predetermined positions of multiple measurement objects W may be measured at once. The type of the measurement object W is not specifically limited.

Overall Configuration of Displacement Measuring Apparatus 1

In the example shown in FIG. 1, the displacement measuring apparatus 1 includes multiple sensor heads 2, a slave amplifier 3, a master amplifier 4, and a monitor device 5A or a personal computer 5B as a setting device 5. The sensor head 2 may be one. In a case in which the setting device 5 is not necessary, one sensor head 2 and one master amplifier 4 are used in a minimum configuration. A system having the slave amplifier 3 and the master amplifier 4 that are integrated to each other may be used.

The sensor head 2 is connected to the slave amplifier 3 or the master amplifier 4 via a connection line 2a in a mutually communicable manner. The slave amplifier 3 is not operable alone but is operable by being connected to the master amplifier 4 and receiving power supply from the master amplifier 4. The slave amplifier 3 and the master amplifier 4 are mutually communicable. Multiple slave amplifiers 3 may be connected to the master amplifier 4. In this embodiment, only the master amplifier 4 is provided with an Ethernet connector, and both the master amplifier 4 and the slave amplifier 3 are communicable with the monitor device 5A or the personal computer 5B via the Ethernet connector. In one example, the slave amplifier 3 may not be used, or the function of the slave amplifier 3 may be incorporated in the master amplifier 4, to use only one amplifier. In another example, the functions of the slave amplifier 3 and the master amplifier 4 may be incorporated in the sensor head 2 to dispense with the slave amplifier 3 and the master amplifier 4. The Ethernet connector may also be provided to the slave amplifier 3 in addition to the master amplifier 4.

An external device 6 may be, for example, a programmable logic controller (PLC). The PLC is a controller for sequentially controlling the belt conveyor B for conveyance and the displacement measuring apparatus 1. The PLC can use a general-purpose device. FIG. 1 shows merely an example of a system configuration of the displacement measuring apparatus 1. The present invention is not limited to this example, and the master amplifier 4 and the slave amplifier 3 may be equipped with an input-output (I/O) unit to be directly connected to the external device 6. In this case, a physical signal, such as a trigger signal or a result output signal, is transferred between the master amplifier 4 or the slave amplifier 3 and the external device 6. The master amplifier 4 may also be provided with an analog output. The master amplifier 4 and the slave amplifier 3 may communicate with the external device 6 via the Ethernet connector. This communication may be made by using a publicly known communication protocol of each type, such as Ethernet/IP or PROFINET.

The displacement measuring apparatus 1 receives a measurement start trigger signal that defines a measurement start timing, via the connection line 6a from the external device 6 during operation. The displacement measuring apparatus 1 performs displacement measurement and pass/fail determination in response to the measurement start trigger signal. The results of the displacement measurement and the pass/fail determination may be transmitted to the external device 6 via the connection line 6a.

During operation of the displacement measuring apparatus 1, input of the measurement start trigger signal and output of the result are repeatedly performed via the connection line 6a between the displacement measuring apparatus 1 and the external device 6. The input of the measurement start trigger signal and the output of the result may be performed via the connection line 6a that connects the displacement measuring apparatus 1 and the external device 6, as described above, or may be performed via a communication line, which is not shown in the drawing, instead of the connection line 6a. For example, a sensor (not shown) that detects arrival of a measurement object W and the displacement measuring apparatus 1 may be directly connected to each other, and the measurement start trigger signal may be input from the sensor to the displacement measuring apparatus 1. The displacement measuring apparatus 1 may be operated in response to an internal trigger that is generated therein. Thus, the displacement measuring apparatus 1 may have a mode for issuing an internal trigger at regular intervals.

One of the monitor device 5A and the personal computer 5B is connected to the master amplifier 4 via a connection line 5a in a mutually communicable manner. However, both of the monitor device 5A and the personal computer 5B may be connected to the master amplifier 4. The monitor device 5A and the personal computer 5B are controllers for setting various conditions of the displacement measuring apparatus 1 and for controlling the displacement measuring apparatus 1. Simultaneously, the monitor device 5A and the personal computer 5B are display devices for displaying an image imaged by the sensor head 2, a post-processed image, various kinds of measurement values, measurement results, determination results, and other information. The monitor device 5A is a dedicated component, whereas the personal computer 5B can use a general-purpose component. Of course, the monitor device 5A can use a general-purpose component such as a programmable display.

Communication between the sensor head 2 and the slave amplifier 3 or the master amplifier 4, communication between the master amplifier 4 and the monitor device 5A or the personal computer 5B, and communication between the master amplifier 4 and the external device 6 may be performed by wired communication or wireless communication. The master amplifier 4 has a communication unit that uses, but is not limited to, EtherNet/IP, PROFINET, CC-Link, DeviceNet, EtherCAT, PROFIBUS, BCD, RS-232C, or other type of network system.

Monitor Device 5A and Personal Computer 5B

Each of the monitor device 5A and the personal computer 5B has a display 8 constituted of a display device such as a liquid crystal display or an organic EL display. The display 8 displays an image imaged by the sensor head 2, an image generated by the slave amplifier 3 or the master amplifier 4, each type of an interface, and other information.

Figure 7:
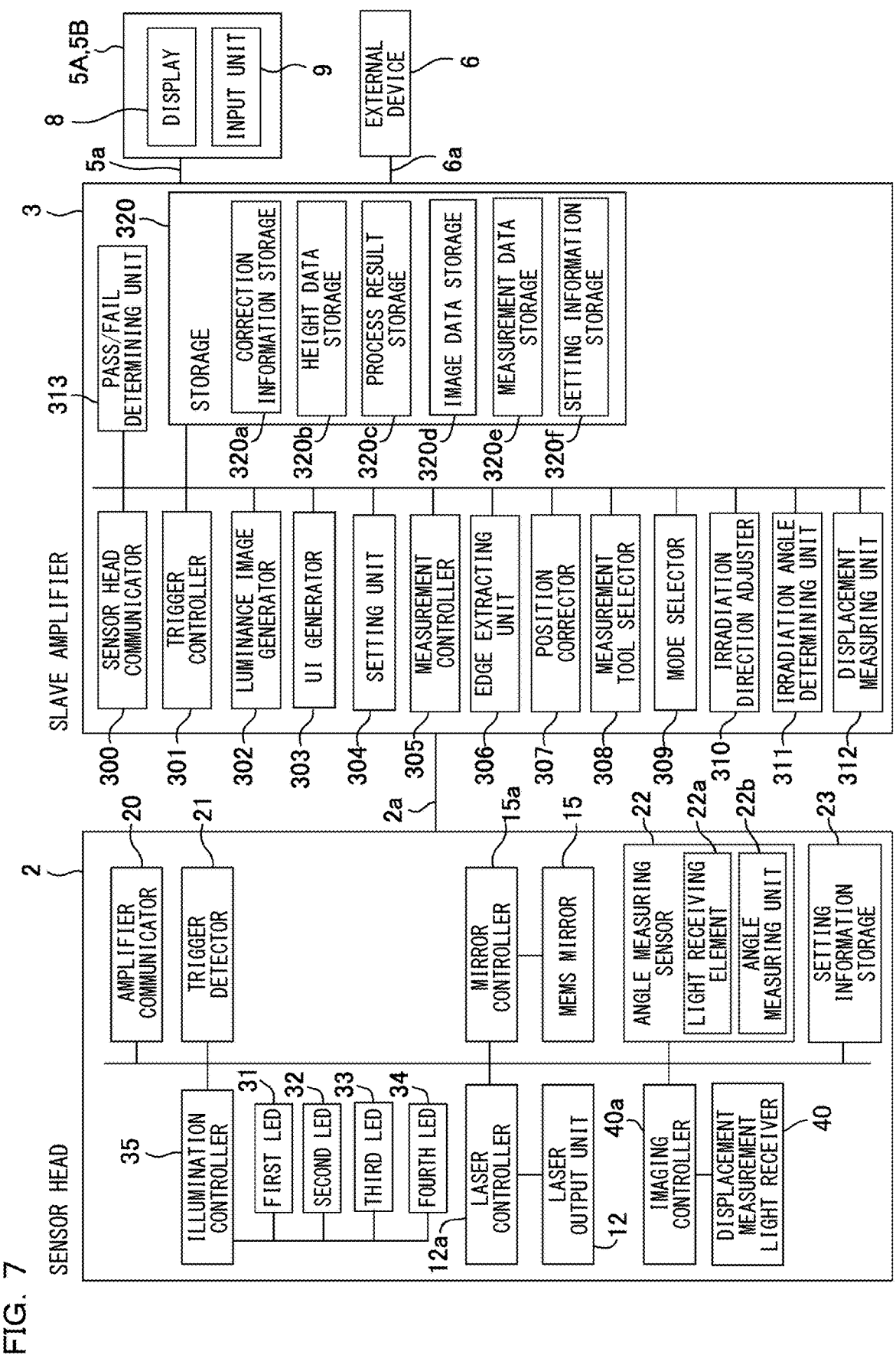
FIG. 7 is a block diagram of the displacement measuring apparatus.

The monitor device 5A includes a touch-panel input unit 9, which is shown in FIG. 7. The monitor device 5A receives input operation that shows the position touched on the display 8 by a user. The personal computer 5B includes an input unit 9 constituted of a keyboard, a mouse, a touch pad, a touch panel, or other unit. This input unit 9 is shown in FIG. 7. As in the case of the monitor device 5A, the personal computer 5B receives input operation. The touch operation may be an operation using a stylus or an operation with a finger, for example.

Structure of Sensor Head 2

Figure 2:
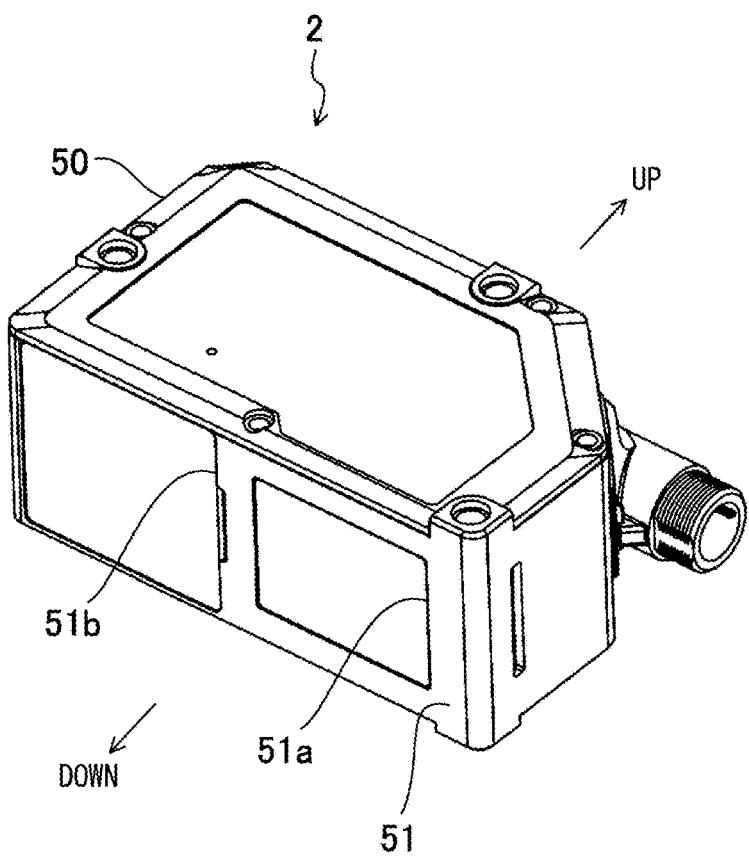
FIG. 2 is a perspective view of a sensor head as viewed from a lower side.
Figure 3:
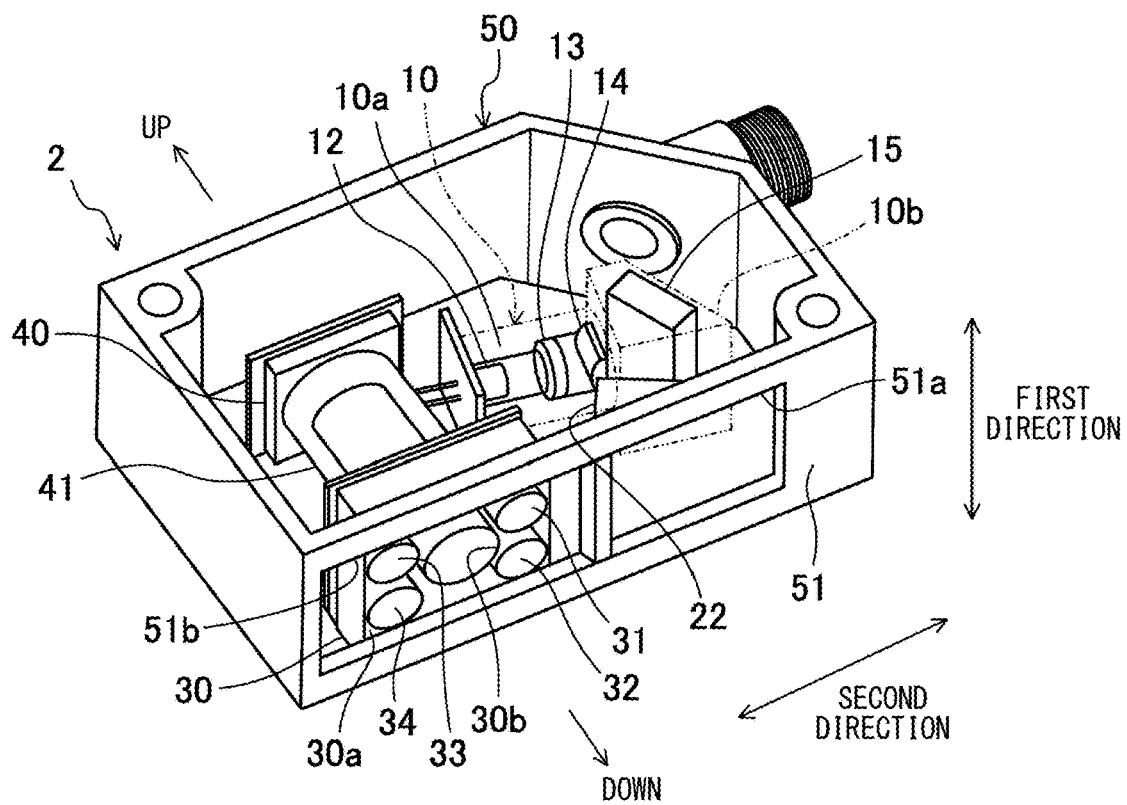
FIG. 3 is a partially transparent view showing an inside structure of the sensor head with a side cover removed.
Figure 4:
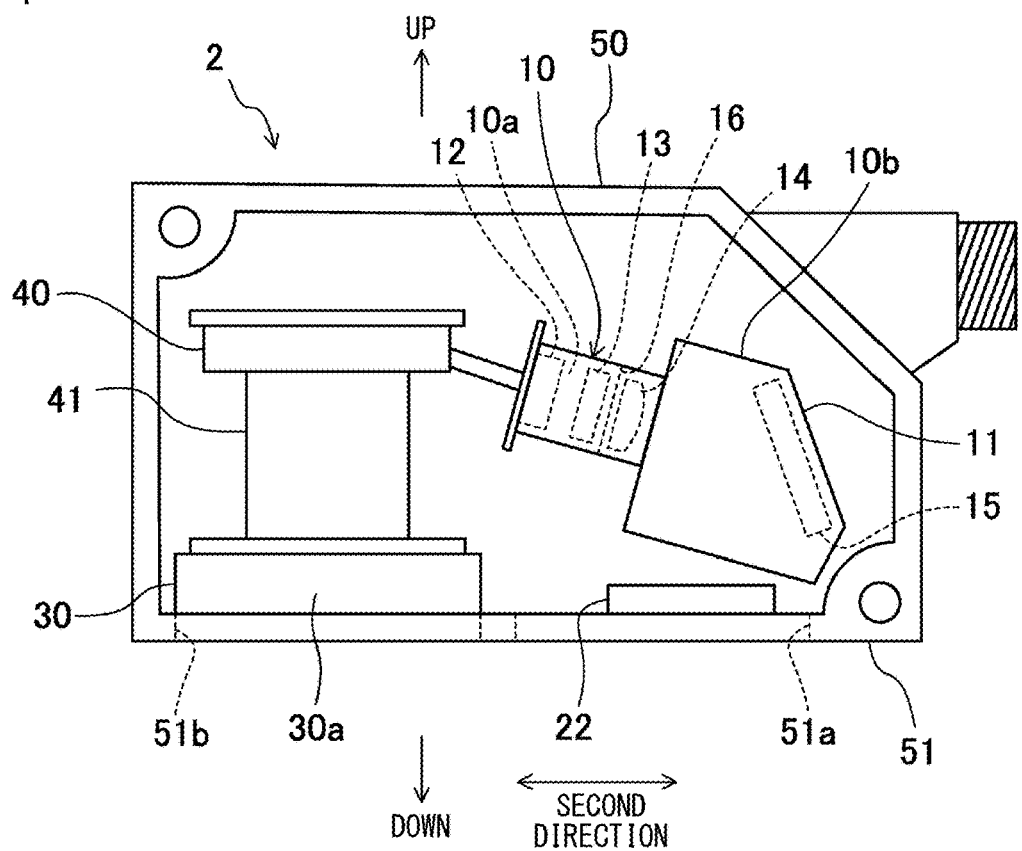
FIG. 4 is a side view of the sensor head with the side cover removed.

As shown in FIGS. 3 and 4, the sensor head 2 includes a light projection module 10, an angle measuring sensor 22, an illuminator 30, a displacement measurement light receiver 40, and a housing 50. The light projection module 10 emits measurement light that irradiates a measurement object W. The illuminator 30 makes uniform illumination light irradiate the measurement object W. The displacement measurement light receiver 40 receives the measurement light that is reflected back from the measurement object W. The light projection module 10, the angle measuring sensor 22, the illuminator 30, and the displacement measurement light receiver 40 are contained in the housing 50. Although the up-down direction of the sensor head 2 is specified in FIGS. 2 to 5, this direction is described merely for convenience of explanation and does not limit the posture of the sensor head 2 during operation, and the sensor head 2 is used in any direction and in any posture.

As shown in FIG. 7, the sensor head 2 includes an amplifier communicator 20 and a trigger detector 21. The amplifier communicator 20 communicates with the slave amplifier 3 and the master amplifier 4 and causes transmission and reception of a signal between the sensor head 2 and the slave amplifier 3 or the master amplifier 4. The trigger detector 21 detects a trigger signal output from the slave amplifier 3 or the master amplifier 4. Upon detecting the trigger signal, the trigger detector 21 outputs a signal to each part of the sensor heads 2 to cause measurement of a displacement. In this embodiment, the sensor head 2 detects the trigger signal output from the slave amplifier 3 or the master amplifier 4. Alternatively, the sensor head 2 may generate the trigger signal automatically, for example, in a line mode described later. In this case, the sensor head 2 may also have a trigger signal generator that generates the trigger signal.

Structure of Housing 50

As shown in FIGS. 2 and 3, the housing 50 is formed into an elongated shape as a whole. The light projection module 10 is fixed to the housing 50 in a condition of being closer to one side in a longitudinal direction in the housing 50. The one side in the longitudinal direction of the housing 50 is a right side in FIG. 4. The illuminator 30 and the displacement measurement light receiver 40 are fixed to the housing 50 in a condition of being closer to the other side in the longitudinal direction in the housing 50. The other side in the longitudinal direction of the housing 50 is a left side in FIG. 4.

As shown in FIG. 2, the housing 50 has an end wall 51 that extends in the longitudinal direction. The end wall 51 is provided with a measurement light projection window 51a and a light reception window 51b. The measurement light projection window 51a passes the measurement light emitted from the light projection module 10. The light reception window 51b receives the illumination light reflected back from a measurement object W. The measurement light projection window 51a and the light reception window 51b are covered with transparent members. Moreover, the light reception window 51b passes the illumination light from the illuminator 30. The "transparent member" may be a transparent or semitransparent band pass filter.

Polarization Filter

Figure 6:
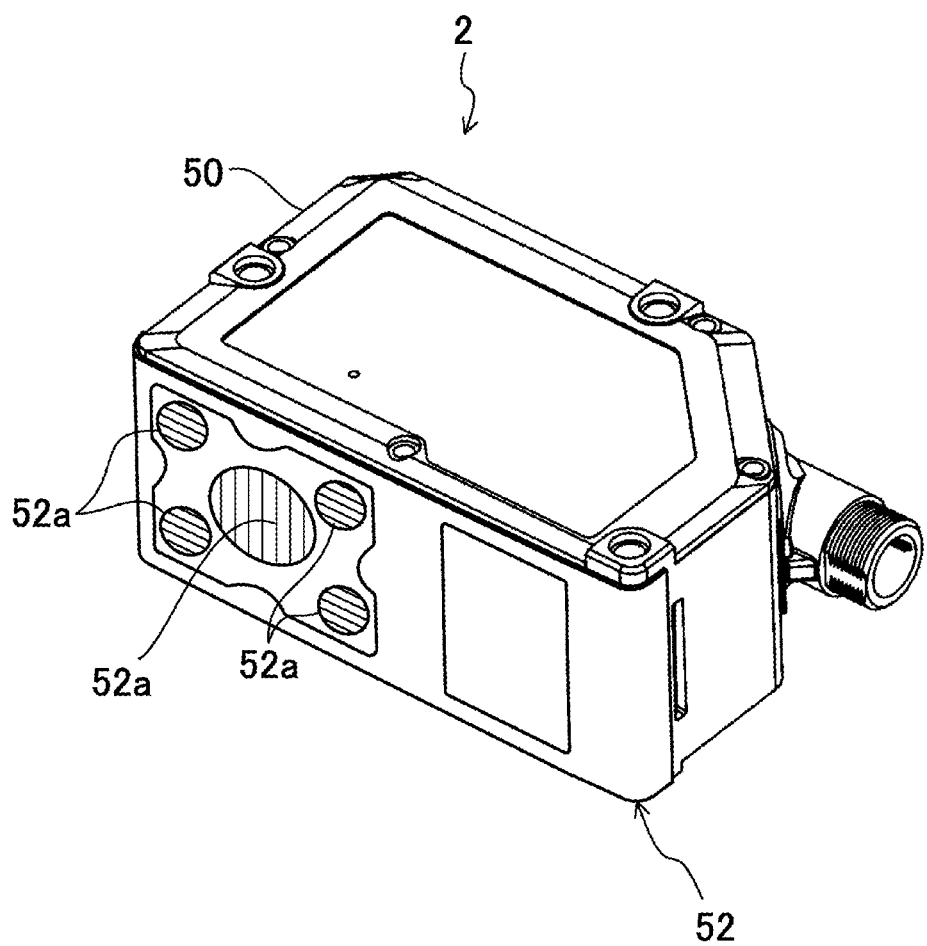
FIG. 6 corresponds to FIG. 2 and shows a state in which a polarization filter attachment is attached.

As shown in FIG. 6, the housing 50 is configured so that polarization filters 52a are attachable to a first region facing a condensing optical system 41 and a second region facing light emitting diodes 31 to 34 at the light reception window 51b while polarization components differ by 90 degrees between in the first region and in the second region. The example shown in FIG. 6 is a case of attaching a polarization filter attachment 52 having polarization filters 52a so as to cover the end wall 51 of the housing 50. The polarization filter attachment 52 is removably attached to the housing 50 by fitting claws, by using a tightening member such as a screw, or by other securing method. The polarization filter attachment 52 may be used depending on surrounding circumstances, a surface state of the measurement object W, and other factors. Specifically, in a case in which halation occurs, using the polarization filter attachment 52 enables removing halation.

The polarization component of the polarization filter 52a to be attached to the first region may be made parallel to a polarization component of the measurement light. This minimizes decrease in quantity of measurement light. Specifically, in the condition in which the measurement light has a uniform polarizing direction, a polarization filter is fitted to the light reception window 51b in the first region, in parallel to the polarizing direction of the measurement light.

Structure of Light Projection Module 10

As shown in FIG. 3, the light projection module 10 includes a light projector 10a, a MEMS mirror 15 being a scanning part, and a modularization member 10b to which the light projector 10a and the MEMS mirror 15 are mounted. The light projector 10a includes a laser output unit 12 as a measurement light source and has a collimator lens 13 and a cylindrical lens 14 that receive light from the laser output unit 12. The light projector 10a generates strip-shaped measurement light that extends in a first direction shown in FIG. 3 and makes the generated measurement light irradiate the measurement object W. The measurement light source may be a light source other than the laser output unit 12.

The laser output unit 12, the collimator lens 13, and the cylindrical lens 14 are fixed to the modularizing member 10b to prevent changing of the relative positional relationship between the laser output unit 12, the collimator lens 13, and the cylindrical lens 14. The collimator lens 13 is disposed closer to the laser output unit 12 than the cylindrical lens 14. The collimator lens 13 collimates rays of the measurement light output from the laser output unit 12. The cylindrical lens 14 is disposed so as to have a major axis in the first direction. The cylindrical lens 14 receives the measurement light emitted from the collimator lens 13 and generates the strip-shaped measurement light extending in the first direction. Thus, the measurement light that is output from the laser output unit 12 is collimated when it passes through the collimator lens 13, and the measurement light then enters the cylindrical lens 14 to be changed to the strip-shaped measurement light extending in the first direction. The collimator lens 13 and the cylindrical lens 14 have a diaphragm 16 that is disposed therebetween. The collimator lens 13 and the cylindrical lens 14 are examples of light projection lens. The structure of the light projection lens is not limited to that described above.

As shown in FIG. 7, the sensor head 2 includes a laser controller 12a. The laser controller 12a executes control of output and stop of laser light from the laser output unit 12. This control will be specifically described later.

Structure of MEMS Mirror 15

The MEMS mirror 15 performs scanning using the measurement light output from the cylindrical lens 14 of the light projector 10a in a second direction crossing the first direction. The second direction is shown in FIG. 3 and other drawings. Although the second direction perpendicularly crosses the first direction in this embodiment, the directional relationship is not limited thereto, and the crossing angle between the first direction and the second direction is freely set. In the case in FIG. 1, the first direction may be a width direction of the belt conveyor B for conveyance, whereas the second direction may be a conveying direction of the belt conveyor B for conveyance, and vice versa.

The MEMS mirror 15 can use a conventionally known component, and therefore, it is not described in detail. The MEMS mirror 15 has a scanning mirror that enables scanning in the second direction by using the measurement light and has a driving unit that moves this scanning mirror. The MEMS mirror 15 is fixed to the modularizing member 10b so that the scanning mirror will face a light emission surface of the cylindrical lens 14. The "MEMS" is an abbreviation of "Micro Electro Mechanical Systems" and is a generally called "micro electro mechanical system". Using the micro electro mechanical system enables rapidly changing an angle of the scanning mirror, that is, a reflection angle or an irradiation angle of the measurement light, by a small pitch, as well as reduction in dimensions. From another point of view, the MEMS mirror 15 can also be described as a component in which one mirror is turnable around one axis. A MEMS mirror having two axes may also be used. In this case, the cylindrical lens 14 may not be used. That is, one of the two axes may be used to perform laser scanning, whereas the other axis may be used to expand the laser light or may be imparted with a function equivalent to the cylindrical lens 14.

The modularizing member 10b has a light transmitting part to allow the measurement light to be emitted to the outside after the measurement light is reflected at the MEMS mirror 15. The light transmitting part of the modularizing member 10b is made to face the measurement light projection window 51a of the housing 5. Thus, the measurement light that is reflected at the MEMS mirror 15 is emitted to the measurement object W after passing through the light transmitting part of the modularizing member 10b and the measurement light projection window 51a of the housing 5.

As shown in FIG. 7, the MEMS mirror 15 includes a mirror controller 15a. The mirror controller 15a executes control of movement of the MEMS mirror 15, that is, control of adjustment and change of the angle of the scanning mirror. This control of the MEMS mirror 15 will be specifically described later.

Instead of the MEMS mirror 15, the scanning part can be constituted of a galvanometer mirror, a mirror that is turned by a stepping motor, or other component and can be any device that is able to scan with the measurement light.

Structure of Displacement Measurement Light Receiver 40

FIG. 3 shows the displacement measurement light receiver 40. The displacement measurement light receiver 40 can be constituted of an image sensor having a two-dimensional light receiving element. This image sensor receives the measurement light that is reflected back from the measurement object W and outputs a received-light quantity distribution for displacement measurement. Furthermore, this image sensor also receives illumination light that is reflected back from the measurement object W and outputs a received-light quantity distribution for luminance measurement. The illumination light is emitted from the illuminator 30. This embodiment uses the condensing optical system 41, and thus, the measurement light and the illumination light reach the light receiving element of the displacement measurement light receiver 40 through the condensing optical system 41. Although the light receiving element of the displacement measurement light receiver 40 is not limited to a specific component, the light receiving element may be a component that converts into an electric signal the intensity of light that is obtained through the condensing optical system 41. An example of the light receiving element includes a charge-coupled device (CCD) image sensor and a complementary metal oxide semiconductor (CMOS) image sensor. The condensing optical system 41 condenses light that enters from the outside and typically has one or more optical lenses. The optical axis of the condensing optical system 41 and the optical axis of the light projector 10a are made to cross each other.

Figure 8A:
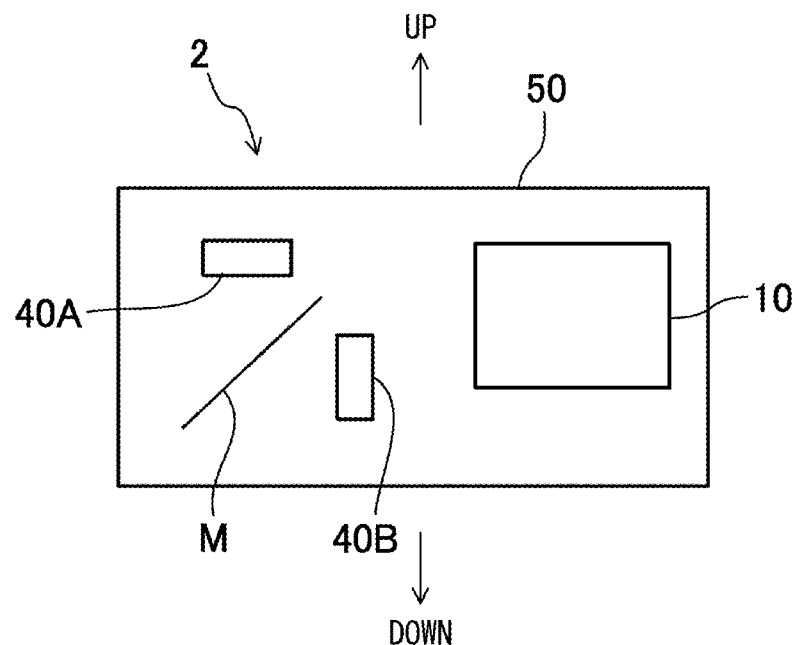
FIG. 8A shows an example of using a half mirror to split light into light for a displacement measurement light receiver and light for a luminance measurement light receiver.

Although the displacement measurement light receiver 40 is configured to output both of the received-light quantity distribution for displacement measurement and the received-light quantity distribution for luminance measurement in this embodiment, the structure is not limited thereto. For example, as shown in FIG. 8A, a displacement measurement light receiver 40A and a luminance measurement light receiver 40B may be disposed in the housing 50, and a half mirror M may also be disposed in the housing 50. In this example, two rays of light, which are measurement light and illumination light, enter the housing 50 and are split by the half mirror M, thereby entering the displacement measurement light receiver 40A and the luminance measurement light receiver 40B, respectively.

Figure 8B:
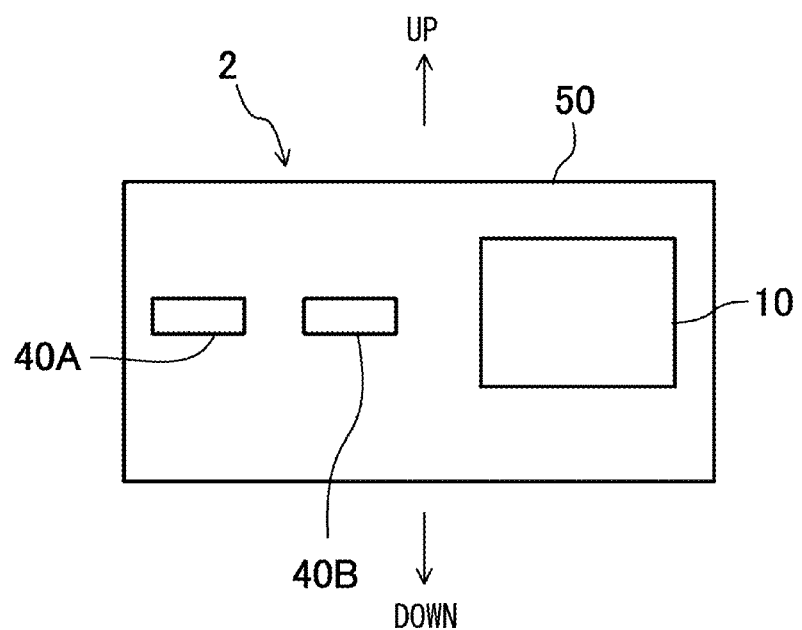
FIG. 8B shows an example of making light enter each of the displacement measurement light receiver and the luminance measurement light receiver.

In another example, as shown in FIG. 8B, a displacement measurement light receiver 40A and a luminance measurement light receiver 40B may be disposed in the housing 50 so as to have respective light incident directions that face the measurement object W. In this case, the measurement light and the illumination light that are reflected back from the measurement object W enter the displacement measurement light receiver 40A and the luminance measurement light receiver 40B, respectively.

As shown in FIG. 7, the displacement measurement light receiver 40 includes an imaging controller 40a. The imaging controller 40a executes control of light reception that is implemented by the displacement measurement light receiver 40. This control performed by the imaging controller 40a will be specifically described later.

Structure of Illuminator 30

The illuminator 30 has multiple light emitting diodes that are disposed separately from each other in the first direction and the second direction, and the illuminator 30 emits light to the measurement object W from different directions.

Figure 5:
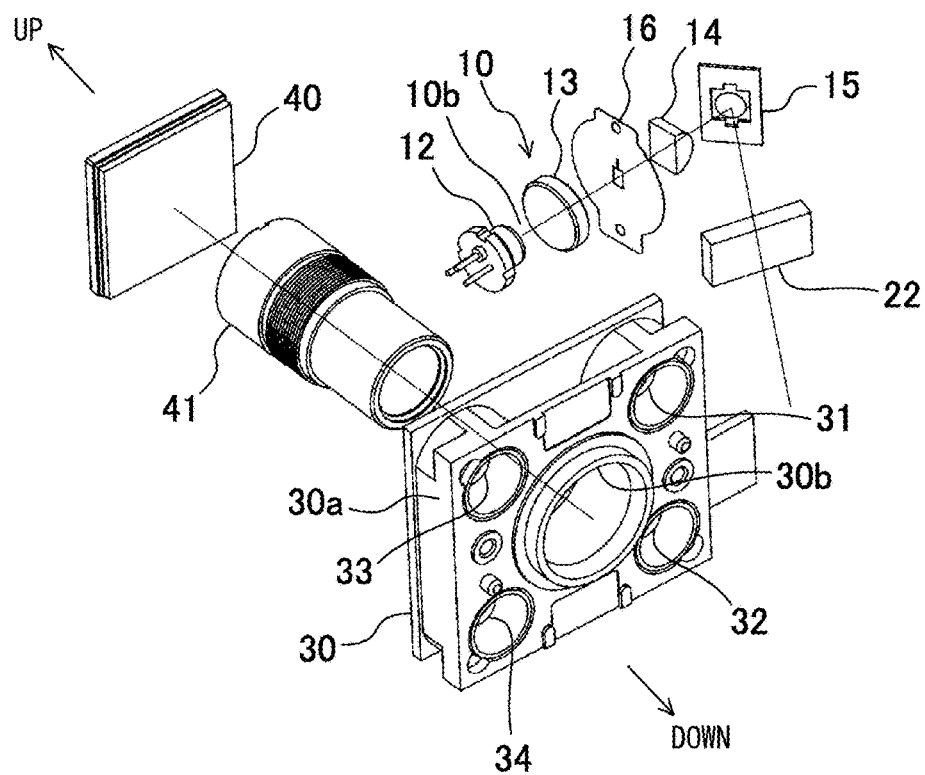
FIG. 5 is an exploded perspective view of an optical system of the sensor head.

Specifically, as shown in FIGS. 3 and 5, the illuminator 30 includes a first light emitting diode 31, a second light emitting diode 32, a third light emitting diode 33, a fourth light emitting diode 34, and a plate-shaped mounting member 30a to which these light emitting diodes 31 to 34 are mounted. The mounting member 30a is disposed along the end wall 51 of the housing 50 so as to face the light reception window 51b. The mounting member 30a has a through hole 30b that is formed at a center. The through hole 30b penetrates through the mounting member 30a in the up-down direction. The incident side of the condensing optical system 41 is disposed so as to correspond to the through hole 30b, whereby the measurement light and the illumination light that are reflected back from the measurement object W enter the condensing optical system 41 by passing through the through hole 30b of the mounting member 30a.

The first to the fourth light emitting diodes 31 to 34 are arranged to surround the through hole 30b of the mounting member 30a and are directed to emit light downwardly. Thus, the light irradiation directions of the first to the fourth light emitting diodes 31 to 34 and the optical axis of the measurement light cross each other.

The first light emitting diode 31 and the second light emitting diode 32 are separated from each other in the first direction, whereas the first light emitting diode 31 and the third light emitting diode 33 are separated from each other in the second direction. The second light emitting diode 32 and the fourth light emitting diode 34 are separated from each other in the second direction, whereas the third light emitting diode 33 and the fourth light emitting diode 34 are separated from each other in the first direction. This arrangement enables emitting the illumination light to the measurement object W from four directions around the optical axis of the condensing optical system 41.

As shown in FIG. 7, the illuminator 30 includes an illumination controller 35. The illumination controller 35 executes control of lighting and extinction of each of the first to the fourth light emitting diodes 31 to 34 and executes brightness adjustment of each of the first to the fourth light emitting diodes 31 to 34. This control of each of the first to the fourth light emitting diodes 31 to 34 will be specifically described later.

Although the illuminator 30 is provided to the sensor head 2 and is integrated with the displacement measurement light receiver 40 in this embodiment, the structure is not limited thereto, and the illuminator 30 may be provided separately from the sensor head 2.

The number of the light emitting diodes is not limited to four and can be any number.

Structure of Angle Measuring Sensor 22

FIG. 5 shows the angle measuring sensor 22 that measures a scanning angle of the measurement light of the MEMS mirror 15 at the time the measurement light is emitted to a region containing a measurement position of the measurement object W. The angle measuring sensor 22 is provided at a position that allows it to receive a ray at an end part in the first direction of the measurement light, which is moved by the scanning mirror of the MEMS mirror 15. The angle measuring sensor 22 has a one-dimensional light receiving element 22a with multiple pixels that are arrayed in the second direction and also has an angle measuring unit 22b that performs arithmetic processing. The ray at the end part in the first direction of the measurement light that enters the light receiving element 22a is received by any of the multiple pixels arrayed in the second direction and by a pixel in proximity to that pixel, thereby generating a clear difference in quantity of the received light between the pixels. A relationship between the pixel that receives light of a highest quantity among the multiple pixels arrayed in the second direction and an irradiation angle of the measurement light from the scanning mirror may be obtained in advance. In this condition, the angle measuring unit 22b can measure the irradiation angle of the measurement light from the scanning mirror on the basis of the received-light quantity distribution output from the light receiving element 22a. Obtaining the irradiation angle of the measurement light from the scanning mirror is equivalent to measuring an irradiation angle of the scanning mirror, and from this point of view, the angle measuring unit 22b also serves for measuring the irradiation angle of the scanning mirror. The light receiving element 22a may be a one-dimensional CMOS sensor or a one-dimensional position sensitive detector (PSD).

The structure of the angle measuring sensor 22 is not limited to the structure described above. In one example, in a condition in which a light source for emitting reference light for measuring an angle is provided separately from the light source for the measurement light, the reference light may be emitted to the scanning mirror, and the reference light reflected at the scanning mirror may be made to enter a position sensitive detector or other unit, whereby angle information may be obtained on the basis of the output from the position sensitive detector. In another example, the angle measuring sensor may be incorporated in the MEMS mirror 15. In this case, an example of the angle measuring sensor includes a counter electromotive force sensor and a piezoelectric signal sensor. Although the MEMS mirror 15 is used as the scanning part in this embodiment, a galvanometer mirror may be used as the scanning part. In this case, the angle measuring sensor 22 can use a sensor that receives feedback of an angle at a real time from the galvanometer mirror.

Structure of Setting Information Storage 23

As shown in FIG. 7, the sensor head 2 is provided with a setting information storage 23 that is constituted of each type of a memory and other component. The setting information storage 23 stores various pieces of setting information sent from the slave amplifier 3 and the master amplifier 4. Specific contents to be stored in the setting information storage 23 will be described later. The setting information storage 23 may be equipped to the slave amplifier 3 or the master amplifier 4 or may be equipped to both of the sensor head 2 and the slave amplifier 3.

Explanation of Measurement Principle

Figure 9A:
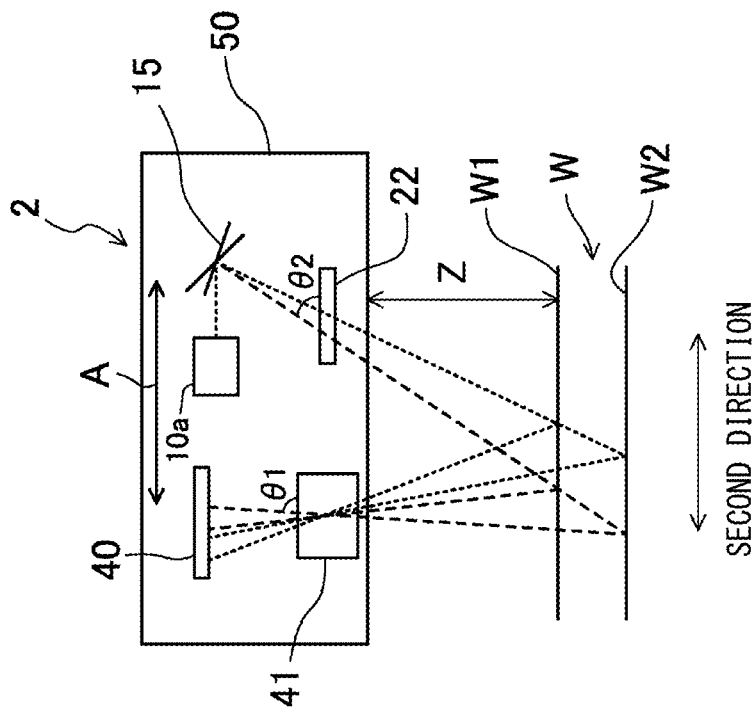
FIGS. 9A and 9B are schematic diagrams for explaining a displacement measurement principle employed by the displacement measuring apparatus.
Figure 9B:
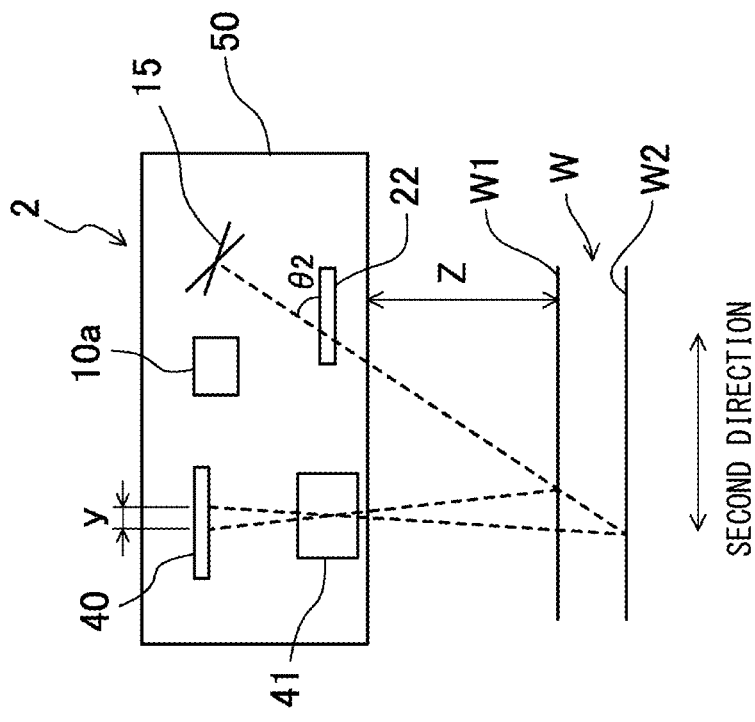

A principle of measuring a displacement at a predetermined position of the measurement object W on the basis of various pieces of information obtained by the sensor head 2 is described herein. Basically, a principle of triangulation is used, and this principle is schematically shown in FIGS. 9A and 9B. FIG. 9A shows a method used in this embodiment, and FIG. 9B shows a method as a modification example. Either of the methods can be used. As shown in FIGS. 9A and 9B, measurement light that is emitted from the light projector 10a is reflected to the second direction by movement of the MEMS mirror 15 and irradiates the measurement object W. The reference symbol W1 denotes a relatively high surface of the measurement object W, and the reference symbol W2 denotes a relatively low surface of the measurement object W. The following describes details of the measurement principle in FIG. 9A and the measurement principle of the modification example in FIG. 9B.

In the case in FIG. 9A, the height of the measurement object W is denoted by Z, and a light projection axis angle is denoted by $\theta 2$. The light projection axis angle $\theta 2$ is measurable by the angle measuring sensor 22. In accordance with the principle of triangulation, in the condition in which a position y in the second direction of the displacement measurement light receiver 40 and the light projection axis angle $\theta 2$ are determined, the value Z is uniquely determined. The position y in the second direction has a Y coordinate in a Y direction. In view of this, each of the values y, $\theta 2$, and Z is measured by experiments of various patterns, and a data set of the combination (y, $\theta 2$, Z) is preliminarily stored in the displacement measuring apparatus 1 as a table. During operation of the displacement measuring apparatus 1, the value Z is obtained by referring to the table on the basis of the values y and $\theta 2$ that are measured. A value that is not contained in the table is obtained by interpolation processing. Instead of preliminarily storing the table in the displacement measuring apparatus 1, an approximation expression for obtaining the value Z on the basis of the values (y, $\theta 2$) may be prepared and be used to calculate the value Z during operation of the displacement measuring apparatus 1.

Although the height Z is calculated on the basis of the measurement position in the second direction at the Y coordinate in the Y direction and the light projection axis angle $\theta 2$ in the case in FIG. 9A, the present invention is not limited to this method. Alternatively, the height Z may be calculated on the basis of a measurement position in the first direction and the second direction at an X coordinate and a Y coordinate and the light projection axis angle $\theta 2$. The first direction is a depth direction of the paper surface showing FIG. 9A. Essentially, it is desirable that measurement light of laser light extending straight in the first direction is completely parallel to the arrayed direction of the light receiving element 22a of the displacement measurement light receiver 40 in the depth direction of the paper surface showing FIG. 9A. However, they may not be parallel to each other due to assembling misalignment in manufacturing, in some cases. Moreover, there may be cases in which the laser light itself may be curved along the first direction due to optical variations. In such cases, it is difficult to accurately measure a displacement by determining the measurement position using only the Y coordinate in the second direction. In consideration of this, the measurement position in the first direction at an X coordinate in the X direction is also used to calculate the height Z. That is, each of the values x, y, $\theta 2$, and Z is measured by experiments of various patterns, and a data set of the combination (x, y, $\theta 2$, Z) is preliminarily stored in the displacement measuring apparatus 1 as a table. Under these conditions, the height Z may be calculated on the basis of the three parameters (x, y, $\theta 2$) during operation. This enables highly accurate displacement measurement. As described above, instead of storing a table, an approximation expression may be used to calculate the value Z in operation. The data set of the combination (x, y, $\theta 2$, Z) corresponds to generally called "calibration data" and may be stored at the time of shipment of products, in advance. Specifically, a value $\theta 2$ at (x, y) is calculated with respect to each height Z of a workpiece for calibration, thereby obtaining calibration data in a form in which the height Z is plotted in a three-dimensional space coordinates having three axes of an x axis, a y axis, and a $\theta 2$ axis. During operation, calculated values (x, y, $\theta 2$) uniquely determine one point in the three-dimensional space coordinates, and resultantly a height Z corresponding to the one point is determined.

Next, the modification example in FIG. 9B is described. In the case in FIG. 9B, the height of the measurement object W is denoted by Z, a distance between a light projection position and a light reception position is denoted by A (refer to a double-headed arrow in the drawing), a light reception axis angle is denoted by $\theta 1$, and a light projection axis angle is denoted by θ2. The light reception axis angle θ1 is measured by using the position of receiving the measurement light of the displacement measurement light receiver 40. The light projection axis angle θ2 is measured by the angle measuring sensor 22. The value A is preliminarily known and is stored in the displacement measuring apparatus 1. The value Z is calculated from a specific calculation formula by using the values A, θ1, and θ2. An example of the specific calculation formula is described below. First, it is assumed that, in a two-dimensional coordinate plane having a +X direction in a right direction in FIG. 9B and having a +Y direction in an upper direction in FIG. 9B, an origin of this coordinate plane is set at a turning axis of the MEMS mirror 15. A straight line of a light projection axis at an angle θ2 in FIG. 9B is expressed by a linear equation: y=tan θ2(gradient of straight line)×x. A straight line of a light reception axis at an angle θ1 in FIG. 9B is expressed by a linear equation: y=tan θ1(gradient of straight line)×x+ Atan θ1(intercept). The value Z corresponds to a y coordinate of an intersection point of both the straight lines. Thus, the y coordinate is calculated by solving the simultaneous linear equations, and as a result, the y coordinate is expressed by −{Atan θ1 tan θ2/(tan θ2−tan θ1)}. That is, the distance from the position of the turning axis of the MEMS mirror 15 to the position denoted by the reference symbol W2 is an absolute value of this y coordinate. The known distance from the turning axis of the MEMS mirror 15 to the housing 50 is subtracted from the absolute value of the y coordinate, whereby the value Z is obtained. The value Z can be calculated by the calculation formulas as described above. Alternatively, each of the values Z, θ1, and θ2 may be measured by experiments of various patterns, the results may be stored in the displacement measuring apparatus 1 as a table, and the value Z may be obtained by referring to the table on the basis of measured values θ1 and θ2 during operation of the displacement measuring apparatus 1. A value that is not contained in the table is obtained by interpolation processing. The value Z may be calculated each time without using the table. The light reception axis angle θ1 shown in FIG. 9B and a peak position in the second direction of the received-light quantity distribution have a one-to-one correspondence relationship.

Structure of Amplifier

FIG. 7 shows a structure of the slave amplifier 3. Although the following describes the slave amplifier 3 that executes each function, all of these functions may be equipped to the slave amplifier 3, or a part or all of these functions may be equipped to the master amplifier 4. In one example, a part or all of the functions of the slave amplifier 3 may be equipped to the sensor head 2. In another example, a part or all of the functions of the slave amplifier 3 may be equipped to the monitor device 5A or the personal computer 5B.

The slave amplifier 3 includes a sensor head communicator 300, a trigger controller 301, and a storage 320. The sensor head communicator 300 communicates with the sensor head 2 and makes transmission and reception of signals between the slave amplifier 3 and the sensor head 2. The trigger controller 301 transmits a trigger signal to the sensor head 2. Upon receiving a measurement start trigger signal that defines a measurement start timing, from the external device 6 via the connection line 6a, the trigger controller 301 generates and transmits a trigger signal. The trigger signal may be a periodic trigger signal.

Structure of Luminance Image Generator 302

In the example shown in FIG. 7, the slave amplifier 3 also includes a luminance image generator 302. The luminance image generator 302 acquires a received-light quantity distribution for luminance measurement and generates a luminance image of the measurement object W based thereon. The received-light quantity distribution for luminance measurement is output from the displacement measurement light receiver 40 when the displacement measurement light receiver 40 of the sensor head 2 receives the illumination light that is reflected back from the measurement object W. In the examples shown in FIGS. 8A and 8B, the luminance image generator 302 generates a luminance image of the measurement object W on the basis of the received-light quantity distribution for luminance measurement, which is output from the luminance measurement light receiver 40B. The generated luminance image may be darker as a luminance value output from the displacement measurement light receiver 40 is lower and may be lighter as the luminance value is higher. The generated luminance image may be a black-and-white image or a color image. The method of generating the luminance image can be any method. For example, the received-light quantity distribution for luminance measurement may be used as it is, as a luminance image. Alternatively, the received-light quantity distribution for luminance measurement may be subjected to preprocessing in the sensor head 2, such as FPN correction or HDR correction, or to preprocessing in the slave amplifier 3, such as composition processing for removing halation.

Figure 10:
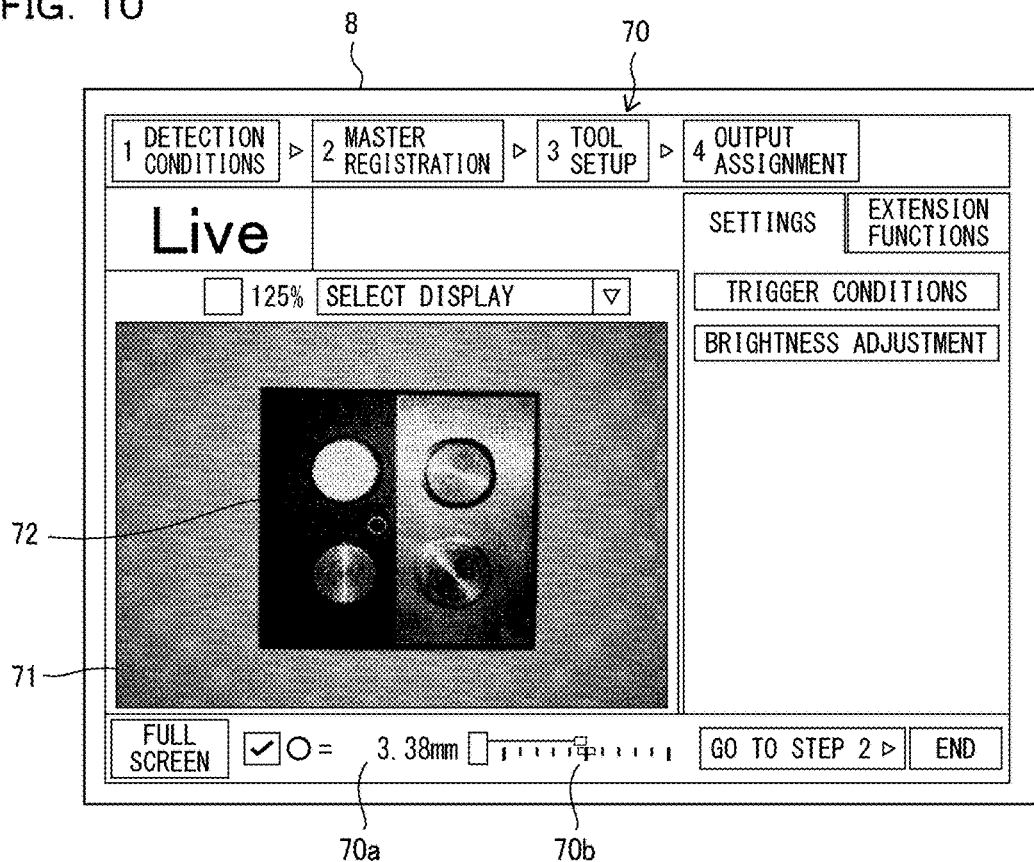
FIG. 10 shows a user interface showing a luminance image.

The luminance image that is generated by the luminance image generator 302 is displayed on the display 8 in a condition of being incorporated in the user interface 70, as shown in FIG. 10. The user interface 70 is generated by a UI generator 303 of the slave amplifier 3, which is shown in FIG. 7. The user interface 70 is provided with an image display region 71, and the luminance image is displayed in this image display region 71. The luminance image that is displayed in the image display region 71 is a photographed image of the current measurement object W and is a generally called "live-view image". Thus, the display 8 displays a luminance image that is generated by the luminance image generator 302.

The display 8 displays a luminance image so that an X coordinate in the luminance image will be a coordinate in a first direction whereas a Y coordinate in the luminance image will be a coordinate in a second direction. The luminance image in a condition of being displayed on the display 8 has an X direction in a lateral direction and has a Y direction in a longitudinal direction.

The UI generator 303 also generates various user interfaces, as described later, in addition to the user interface 70 shown in FIG. 10. Although the UI generator 303 is provided to the slave amplifier 3 in this embodiment, the UI generator 303 may be provided to the monitor device 5A side or the personal computer 5B side.

Structure of Setting Unit 304

Figure 11:
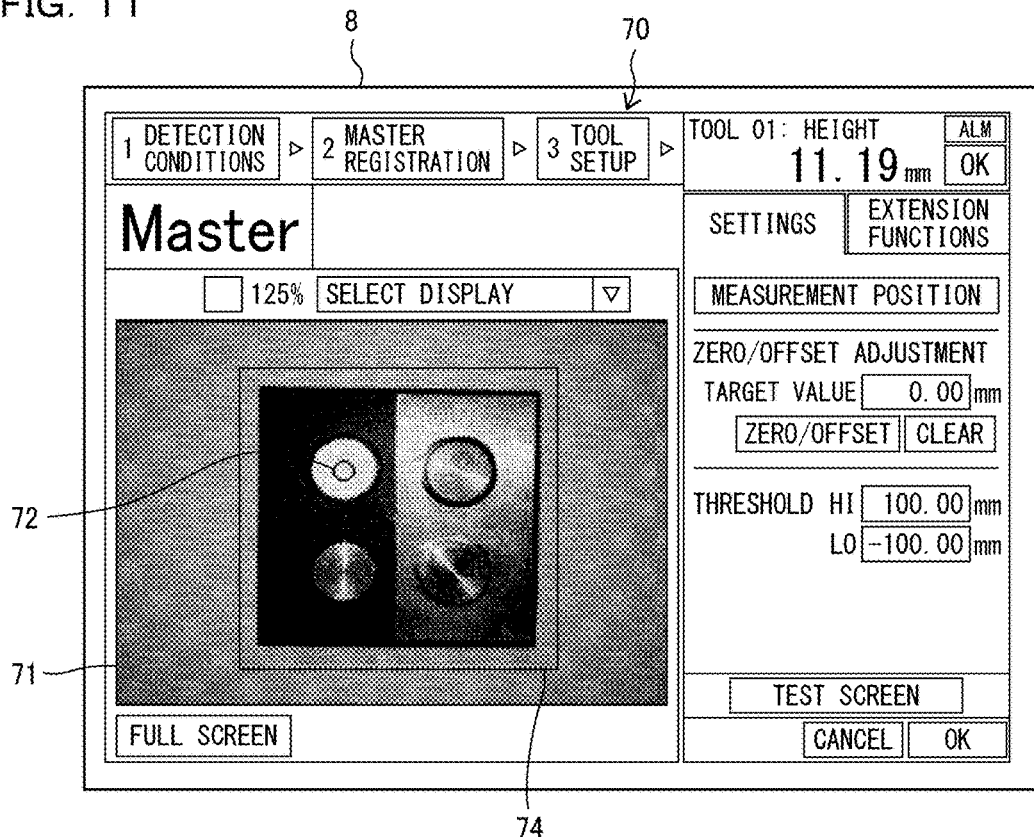
FIG. 11 corresponds to FIG. 10 and shows a state in which a measurement position is set by using a height tool.

As shown in FIG. 7, the slave amplifier 3 also includes the setting unit 304. The setting unit 304 receives setting of a measurement position at which a displacement is to be measured. The measurement position is set in the luminance image displayed on the display 8. When a user touches a part, at which a displacement is to be measured, of a measurement object W in the luminance image displayed on the display 8, the setting unit 304 identifies the touched position in terms of, for example, XY coordinates, and sets the identified position as a measurement position. That is, the setting unit 304 detects an operation of input of the measurement position and identifies the measurement position. This results in reception of the measurement position set by a user. After the measurement position is set, a mark 72 showing the measurement position is displayed in a manner superimposed on the luminance image in the image display region 71 of the user interface 70, as shown in FIG. 11. The mark 72 can also be called a "measurement point". It is possible to move the mark 72 to another part by a drag operation, for example.

Multiple different measurement positions may be set in one luminance image. In this case, the multiple measurement positions may be separated from each other in the first direction or may be separated from each other in the second direction. Multiple positions that differ from each other in the second direction may be set as a first measurement position and a second measurement position, respectively.

The setting of the measurement position may be accepted only when the measurement position is in a scannable range, which is scanned with the measurement light by the MEMS mirror 15. The scannable range, which is scanned with the measurement light by the MEMS mirror 15, may be stored in advance. It is difficult to measure a displacement at a measurement position set outside the scannable range of the measurement light. Thus, it is configured to inhibit setting a measurement position outside the scannable range of the measurement light. When a measurement position is designated outside the scannable range of the measurement light, this operation may not be accepted, or designating a measurement position outside the scannable range of the measurement light may be informed to a user.

Figure 12:
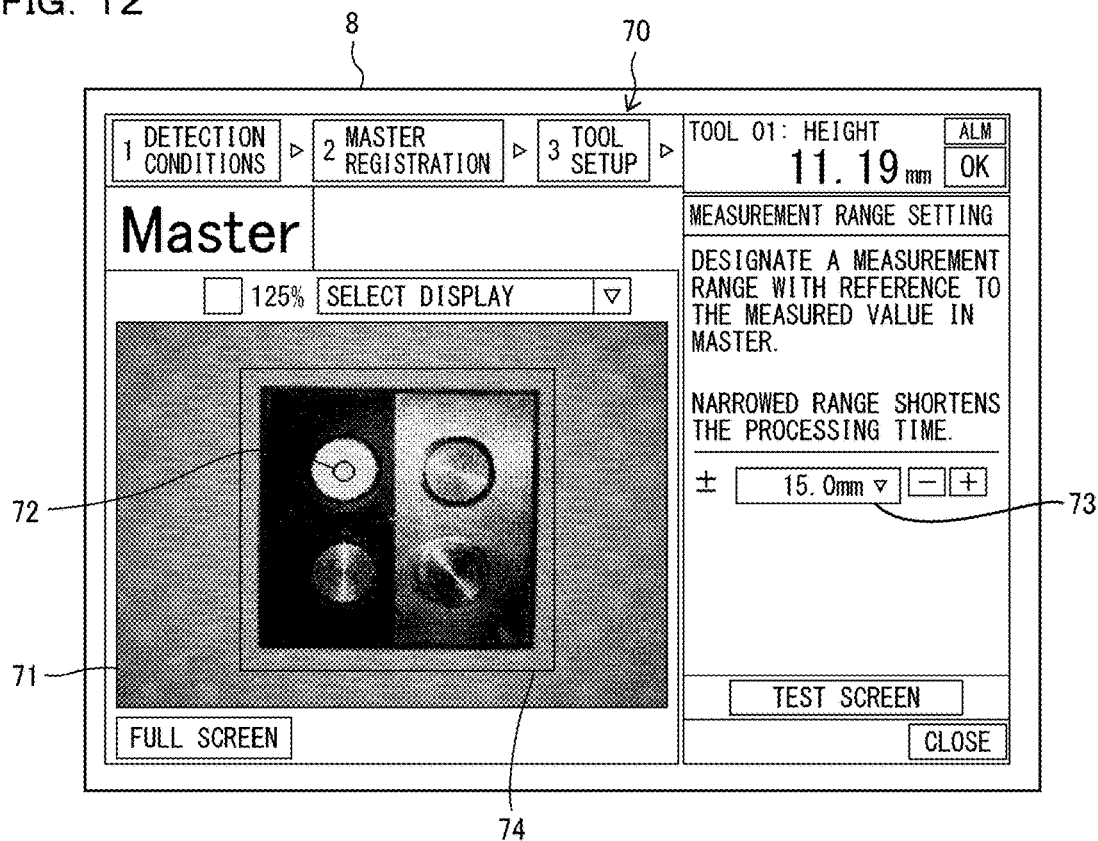
FIG. 12 corresponds to FIG. 10 and shows a state in which a displacement measurement range is set by using the height tool.

The setting unit 304 sets a displacement measurement range in which a displacement at the measurement position is measured. As shown in FIG. 12, an application range setting region 73 may be displayed on a side of the image display region 71 of the user interface 70 to enable setting the displacement measurement range with use of the application range setting region 73. The degree of the range for the displacement measurement range may be set in terms of numerical value (mm). The numerical value is plus in a higher direction and is minus in a lower direction relative to a displacement at the measurement position marked with the mark 72. When a measurement range is narrow, the scanning range of the measurement light is also narrow. Thus, the measurement is performed at a higher speed as the measurement range is narrower. This measurement range may be represented by a Z coordinate.

The setting unit 304 receives setting of a region for correcting the position to be measured, which is set in the luminance image, when the displacement measuring apparatus 1 is set. To shorten a time for measurement performed by the displacement measuring apparatus 1, the scanning range of the measurement light should be narrowed. On the other hand, in an actual site for measuring a measurement object W, the position and the posture of the measurement object W may not be constant and may be changed. Thus, when the position or the posture of the measurement object W is changed in the condition in which the scanning range of the measurement light is set narrow, the measurement object W may not come into the preset scanning range, resulting in failure in the measurement or incorrect measurement due to low accuracy.

Figure 13:
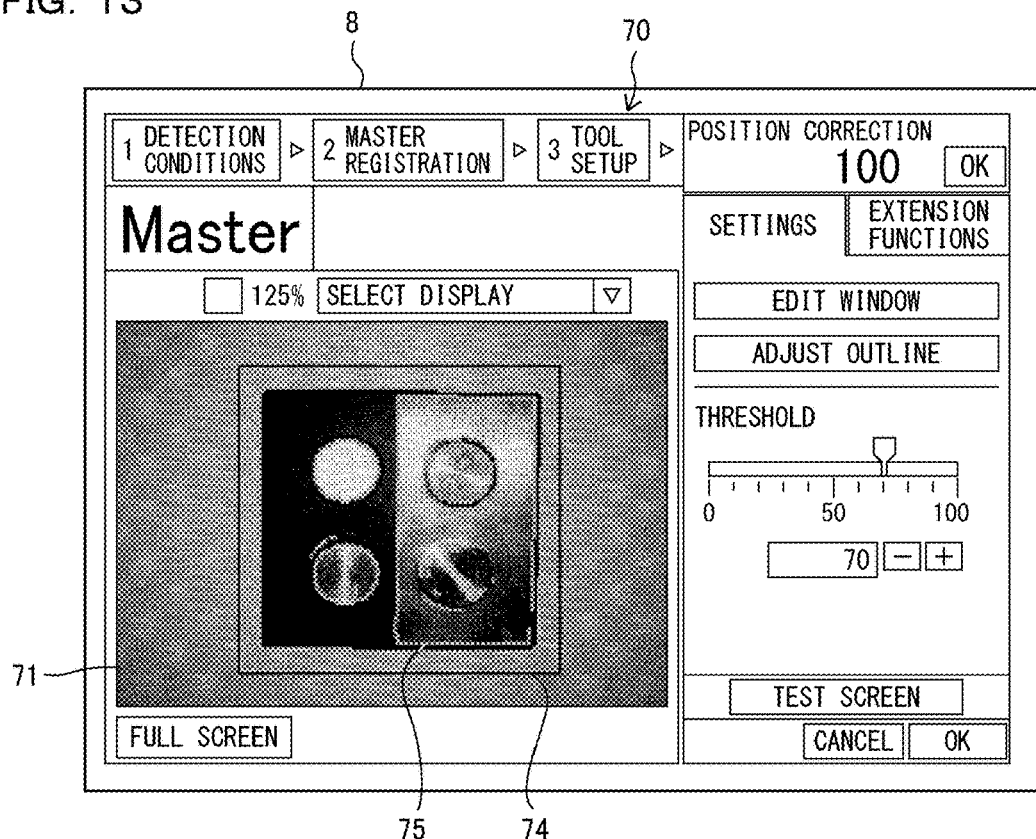
FIG. 13 corresponds to FIG. 10 and shows a state in which edge extraction is performed to the luminance image in a scanning mode.

In this embodiment, when a user sets a region 74 for position correction by operating the input unit 9 shown in FIG. 7 in the state in which a luminance image is displayed in the image display region 71 of the user interface 70, as shown in FIG. 11, this setting is received by the setting unit 304. The region 74 for position correction is set by means of a method such as enclosing the region with a frame line as shown in FIG. 13, coloring the region, or painting the region. The shape of the frame line may be rectangular or circular. In the case of enclosing a region by a rectangular frame line, a tool, such as a stylus, may be moved from an upper corner to a lower corner or from a lower corner to an upper corner of a region to be enclosed.

The region 74 for position correction is basically used for correcting the position. In addition to the region 74 for position correction, a region to be measured by each type of a measurement tool, that is, a measurement tool region is also set. One or multiple measurement tool regions are set in connection with relative positional relationships relative to the region for position correction. During operation, after the position and the posture of a workpiece are determined by using the region 74 for position correction, the relative positional relationship is used to also correct the position and the posture of the measurement tool region. Although the region 74 for position correction and the measurement tool region are set individually herein, the region 74 for position correction may be used also as the measurement tool region, for example.

The setting unit 304 may receive designation of a region covering a measurement position and the vicinity of the measurement position. Instead of designation of a point for a measurement position, designation of a region covering a measurement position and the vicinity of the measurement position may be received to make the region have an area to some extent.

Figure 14:
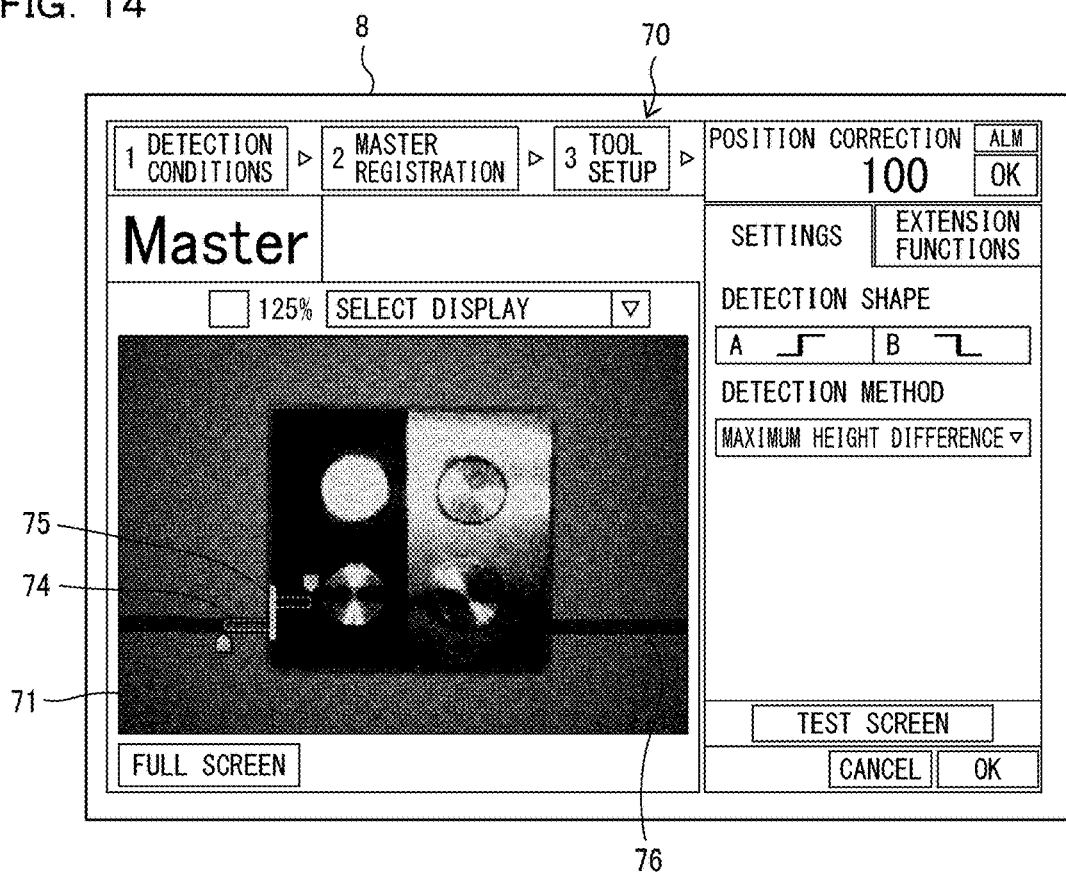
FIG. 14 corresponds to FIG. 10 and shows a state in which the edge extraction is performed with respect to a height profile in a line mode.

The above describes the setting method in the scanning mode for scanning with the measurement light. In a line mode in which scanning using the measurement light is not performed, as shown in FIG. 14, the region 74 for position correction is set by designating a part of a line of measurement light extending in the X direction. The display 8 displays a measurement light position indicating line 76 in a manner superimposed on a luminance image of the measurement object W. The measurement light position indicating line 76 indicates a position of the measurement light that irradiates the measurement object W. Under these conditions, when a user designates two or more positions on the measurement light position indicating line 76, the part between the designated two positions is set as the region 74 for position correction. Also in the case of the line mode, a region covering a measurement position and the vicinity of the measurement position may be received. The measurement light position indicating line 76, which indicates the position of the measurement light, can also be called a "virtual measurement emission line".

Structure of Edge Extracting Unit 306

As shown in FIG. 7, the slave amplifier 3 also includes an edge extracting unit 306. The edge extracting unit 306 extracts an edge of the measurement object W in the luminance image. The edge is defined as an outline or an external line of the measurement object W in a broad sense. The processing of extracting an edge can be performed by a conventionally known method. For example, a pixel value of each pixel of a luminance image is obtained, and a boundary part of a region in which a difference in the pixel value of the luminance image is at or greater than a threshold for detecting an edge is extracted as an edge. The threshold for extracting an edge is adjusted as desired by a user.

Specifically, as shown in FIG. 13, when the region 74 for position correction is set in the state in which a luminance image is displayed in the image display region 71 of the user interface 70, the edge extraction processing is executed in the region 74. A part that is estimated as an outline or an external line of the measurement object W is extracted as an edge. The edge of the measurement object W is shown by an edge indicating line 75. The edge indicating line 75 is, for example, made of a thick line, a dashed line, a line with a conspicuous color, such as red or yellow, but it is not limited thereto. The edge indicating line 75 may be displayed by blinking or other manner. In the case in FIG. 13, an edge that is extracted by the edge extracting unit 306 is displayed in a manner superimposed on the luminance image. The superimposing display processing of the edge may be performed by the luminance image generator 302 or the UI generator 303.

FIG. 13 shows a situation of extracting an edge in the scanning mode for scanning with the measurement light. A situation of extracting an edge from a height profile in the line mode, in which scanning using the measurement light is not performed, is shown in FIG. 14. Similarly, also in the case of the line mode, an edge is extracted from a height profile by the edge extracting unit 306, and an edge indicating line 75 is displayed in the manner superimposed on the luminance image. Thus, the edge extracting unit 306 extracts an edge in the luminance image in the scanning mode for scanning with the measurement light and extracts an edge from a height profile in the line mode, in which scanning using the measurement light is not performed. The present invention is not limited to these functions, and for example, a function of extracting an edge from the measurement light position indicating line 76 in the luminance image may also be employed in the line mode.

Structure of Correction Information Storage 320a

As shown in FIG. 7, the slave amplifier 3 also includes a correction information storage 320a. The correction information storage 320a stores position correction information in the region 74 that is set by the setting unit 304, in conjunction with relative position information between the position correction information and the measurement position set by the setting unit 304. The region 74 is shown in FIG. 11 and other drawings. The correction information storage 320a may be provided as a part of the storage 320 of the slave amplifier 3. The position correction information in the region 74 is necessary for a position corrector 307 to correct the position of the measurement object W and may be used as a reference for correction of the position. The position corrector 307 will be described later. An example of information that is able to be used as a reference for correction of the position includes a part of a luminance image generated by the luminance image generator 302, luminance information of a luminance image, and edge information relating to an edge extracted by the edge extracting unit 306 containing a point cloud of the edge. In the case of using a part of a luminance image for the position correction information, this image can also be called a "template image".

A part of a luminance image may be an image showing a part of the measurement object W, among luminance images generated by the luminance image generator 302. The part of the luminance image is preferably an image containing a region or a position that enables determining the position and the posture of the measurement object W. The luminance information of a luminance image may use a luminance value of each pixel. Also in this case, the luminance information preferably uses a pixel value of a region or a position that enables determining the position and the posture of the measurement object W. The edge information relating to an edge extracted by the edge extracting unit 306 may use data such as a shape or length of an edge line, the number of edge lines, or relative position coordinates of multiple edge lines. Also in this case, edge information that enables determining the position and the posture of the measurement object W is preferable.

The position correction information and the shape or the dimensions of the region 74 are mutually associated and are stored in the correction information storage 320a, and coordinate information showing a relative positional relationship between the position correction information and a measurement position is also stored in the correction information storage 320a. This storing may be performed at the completion of extraction of an edge or at the completion of setting of one program, as described later. The correction information storage 320a may store a template image and edge information in association with each other or may store edge information without storing a template image.

Structure of Position Corrector 307

As shown in FIG. 7, the slave amplifier 3 also includes the position corrector 307. During operation of the displacement measuring apparatus 1 in the scanning mode, the position corrector 307 determines the position and the posture of the measurement object W in a luminance image that is newly generated by the luminance image generator 302, by using the position correction information stored in the correction information storage 320a, to correct the measurement position using the relative position information.

For example, in the case in which a template image is stored as the position correction information, whether the template image is contained in a newly generated luminance image is determined by means of a normalized correlation. When it is determined that the template image is contained, the newly generated luminance image is moved and rotated or is subjected to other processing so as to coincide with the position and the posture of the template image that are specified in advance, whereby the position and the posture of the luminance image are corrected. At the same time, the measurement position in the newly generated luminance image is corrected on the basis of relative position information between the template image and the measurement position.

In the case in which edge information is stored as the position correction information, whether a corresponding edge is contained in a newly generated luminance image is determined. When it is determined that the corresponding edge is contained, the newly generated luminance image is moved and rotated or is subjected to other processing so as to coincide with the position and the posture of the luminance image that are specified in advance, whereby the position and the posture of the luminance image are corrected. At the same time, the measurement position in the newly generated luminance image is corrected on the basis of relative position information between the edge information and the measurement position.

With this structure, measurement is performed in the state in which the position and the posture are corrected to predetermined conditions, when the position or the posture of a measurement object W is changed in an actual site for measuring the measurement object W. There are some methods for the correction. For example, the position and the posture of a luminance image may be corrected by moving or rotating the luminance image, as described above. Alternatively or additionally, a measurement tool region may be moved or rotated to correct the position. During operation of the displacement measuring apparatus 1 in the line mode, the position may be corrected on the basis of relative position information between the measurement position and information of an edge that is extracted from the height profile as described above.

Structure of Measurement Tool Selector 308

Figure 15:
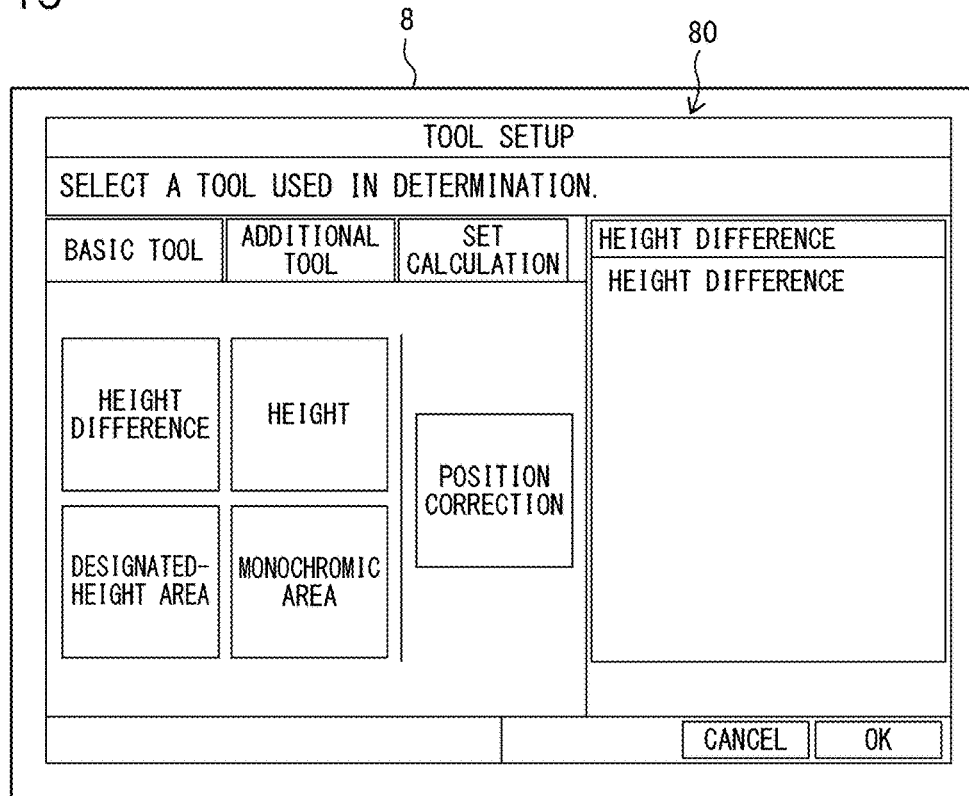
FIG. 15 shows a measurement tool selection interface.

As shown in FIG. 7, the slave amplifier 3 also includes a measurement tool selector 308. The measurement tool selector 308 enables selecting one or multiple measurement tools from among multiple measurement tools. The measurement tool selector 308 makes the UI generator 303 generate a measurement tool selection interface 80 as shown in FIG. 15 and makes the generated measurement tool selection interface 80 display on the display 8. Examples of the measurement tools include a height difference tool for measuring a dimension of a height difference of a measurement object W, a height tool for measuring a height at a predetermined position of a measurement object W, a designated-height area tool described below, a position correction tool for correcting the position of a measurement object W, and a maximum and minimum height tool for measuring the maximum height and the minimum height in a predetermined range of a measurement object W. However, a measurement tool other than these measurement tools may also be provided.

When a measurement tool displayed as an icon in the measurement tool selection interface 80 is selected by operation by a user, the selected measurement tool is stored in the storage 320. Although it is not necessary to designate an application order of the measurement tools during operation of the displacement measuring apparatus 1, the application order may be designated and be also stored in the storage 320.

Figure 16:
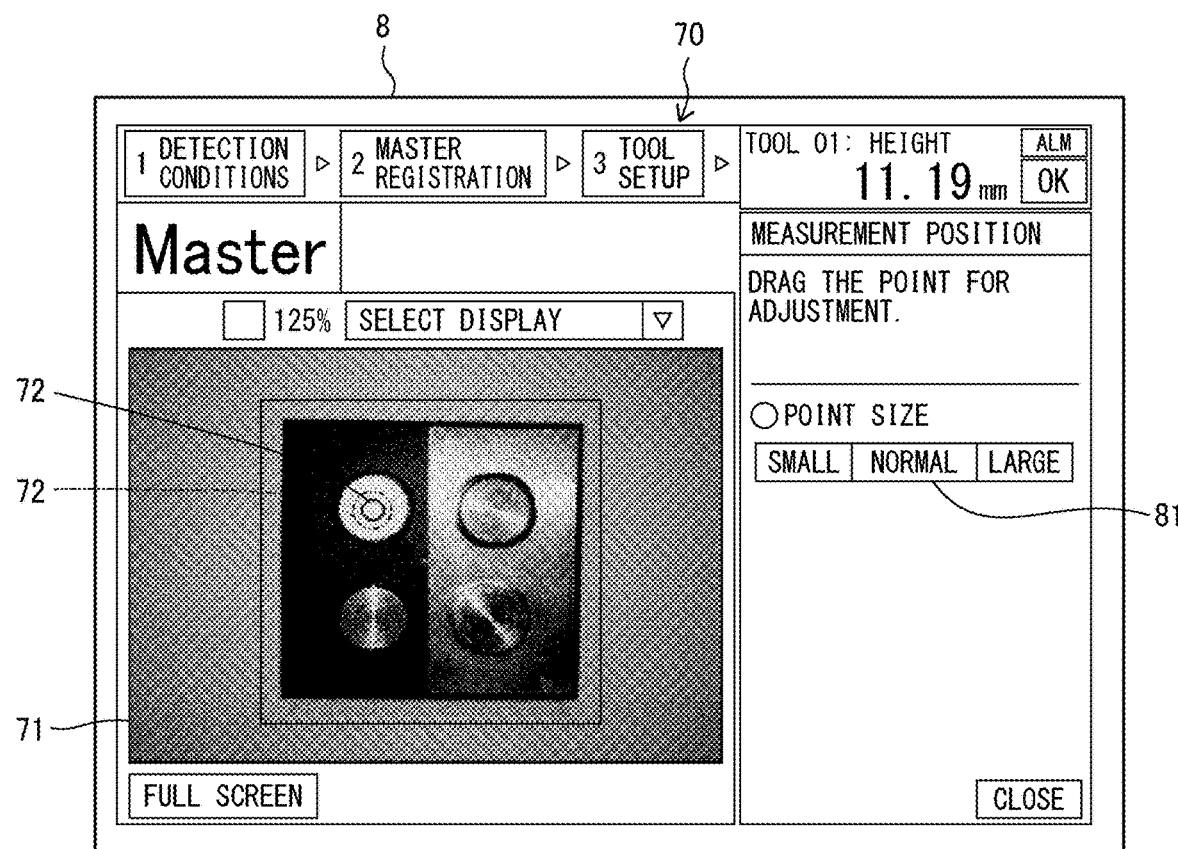
FIG. 16 corresponds to FIG. 15 and illustrates a case of selecting one of measurement tools in which measurement regions differ from each other.

The measurement tool also includes multiple measurement tools in which the dimensions of displacement measurement regions differ from each other. For example, as shown in FIG. 16, a size selector 81 may be provided on a side of the image display region 71 as the measurement tool selector 308 for selecting a size of the displacement measurement region. Upon operation of the size selector 81, selection of a desired measurement tool from among the multiple measurement tools, in which the dimensions of the displacement measurement regions differ from each other, is received. In this case, the "Point" corresponds to the mark 72 indicating the measurement position. When "Normal" is selected, a circle with a size shown by a solid line in FIG. 16 is displayed, and the inner part of this circle serves as the displacement measurement region. On the other hand, when "Large" is selected, a circle with a size shown by the virtual line in FIG. 16 is displayed, and the inner part of this circle serves as the displacement measurement region. Although not shown in the drawing, a circle that is smaller than the "Normal" circle is displayed, and the inner part of this circle serves as the displacement measurement region, when "Small" is selected. The region may be enclosed by a mark with a shape other than circle, and the dimensions of the measurement region may be varied continuously.

Structure of Measurement Controller 305

A measurement controller 305 controls the light projector 10*a* and the MEMS mirror 15 to cause the measurement light to be emitted to a measurement position and a displacement measurement range that are set by the setting unit 304. The measurement controller 305 may be configured to control the light projector 10*a* and the MEMS mirror 15 to cause the measurement light to be emitted only to a region received by the setting unit 304. The measurement controller 305 may change a scanning range of the measurement light of the MEMS mirror 15 on the basis of the Y coordinate of the measurement position in the luminance image. Specifically, on the basis of the Y coordinate of the measurement position and the displacement measurement range in which a displacement is measured, the range to be scanned by the MEMS mirror 15 is set narrower than the range that is scannable by the MEMS mirror 15.

This function is described in detail by using FIGS. 17 and 18. FIGS. 17A to 17D show a situation in which measurement is performed by arranging the sensor head 2 above a measurement object W, as viewed from a side. The range B that is indicated by the oblique lines is a range of a visual field of a luminance image and also a range in which height is measurable by the displacement measuring apparatus 1. The range B is able to be irradiated with the measurement light, and thus, the range B can also be understood as a scannable range that is able to be scanned by the MEMS mirror 15. FIGS. 17A and 17B show a case of disposing the measurement object W at a first position that is at the center in a Y direction. FIGS. 17C and 17D show a case of disposing the measurement object W at a second position that is separated from the first position toward the minus side in the Y direction.

Figure 17A:
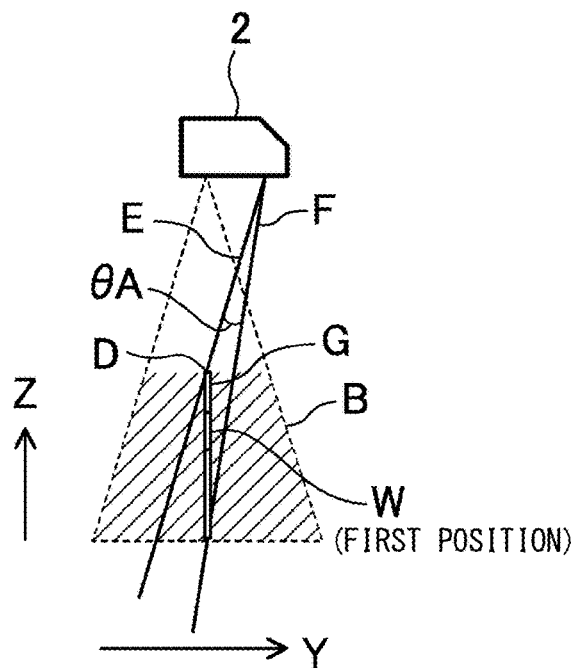
FIGS. 17A to 17D are diagrams for explaining change of a scanning range of measurement light.

The reference symbol D in FIG. 17A denotes a measurement position that is set by the setting unit 304 and that is obtained from a Y coordinate. The lines E and F represent an irradiation range of the measurement light. The measurement controller 305 controls the MEMS mirror 15 to cause the measurement light to irradiate the measurement position D set by the setting unit 304. As a result, a measurement time is made shorter than that in the case of scanning the whole range B, in which the height is measurable, by using the measurement light.

Figure 17B:
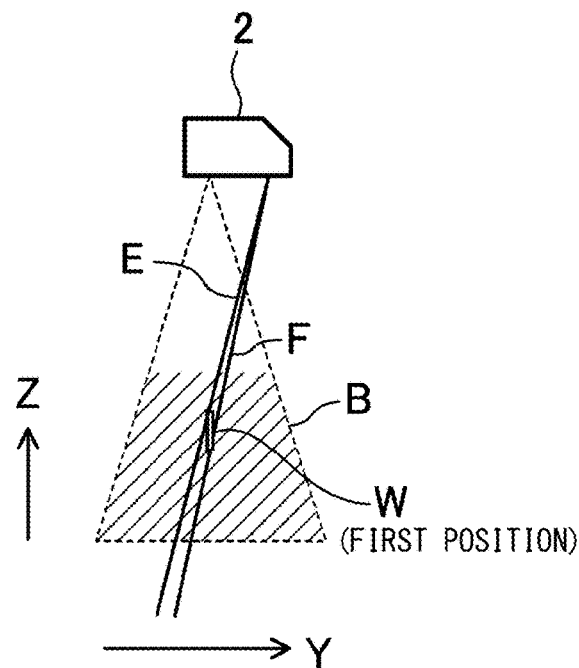

In a case in which the height of the disposed measurement object W is unknown, it is necessary to scan the range B, in which the height is measurable, in the whole Z direction, as indicated by the line G extending in the up-down direction. In this case, a range OA between the lines E and F in FIG. 17A is scanned by the measurement light. Even in the case of scanning the range OA by the measurement light, the measurement time is shorter than that in the case of scanning the whole range B, in which the height is measurable, by using the measurement light. However, this embodiment enables further high-speed measurement by specifying the measurement range in the Z direction of the measurement object W. The measurement range in the Z direction of the measurement object W may be set by the setting unit 304, as described above, and an upper end and a lower end of the measurement range are represented by Z coordinates, respectively. The measurement range in the Z direction of the measurement object W may be a range in which the measurement object W exists or may be a variation range of the measurement position. Specifying the measurement range in the Z direction of the measurement object W makes, as shown in FIG. 17B, the angle between the lines E and F smaller than that in the case shown in FIG. 17A. The small angle between the lines E and F represents a narrow scanning range of the measurement light, thereby enabling increase in the speed of the measurement.

Figure 17C:
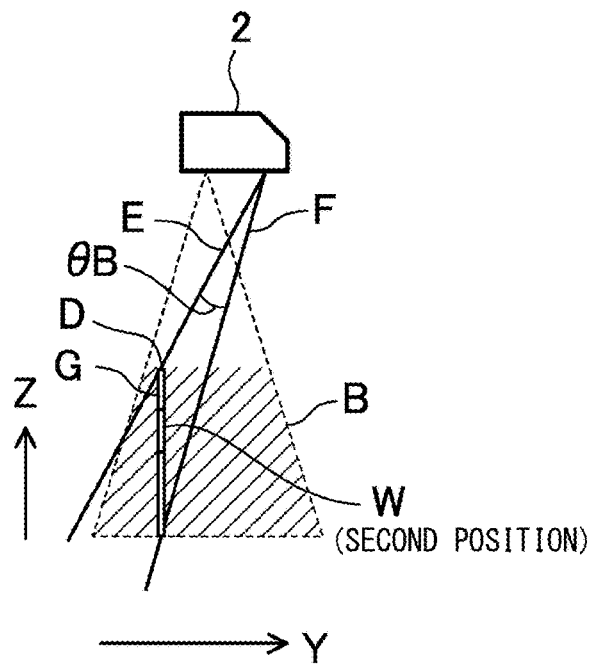
Figure 17D:
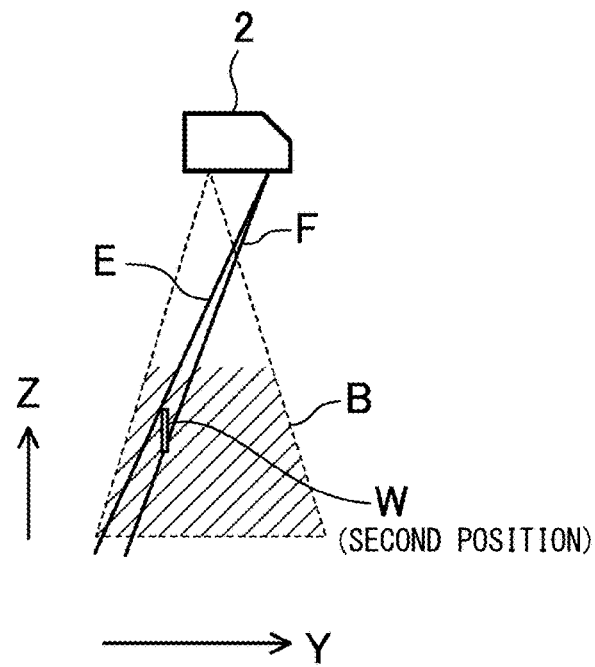

FIG. 17C shows a case in which a measurement object W is at a second position. Also in this case, it is possible to narrow the irradiation range of the measurement light on the basis of the measurement position set by the setting unit 304, thereby making the measurement time shorter than that in the case of scanning the whole range B, in which the height is measurable, by using the measurement light. As shown in FIG. 17D, specifying the measurement range in the Z direction of the measurement object W makes the angle between the lines E and F smaller than that in the case shown in FIG. 17C, thereby narrowing the scanning range of the measurement light and enabling further increase in the speed of the measurement.

Figure 18A:
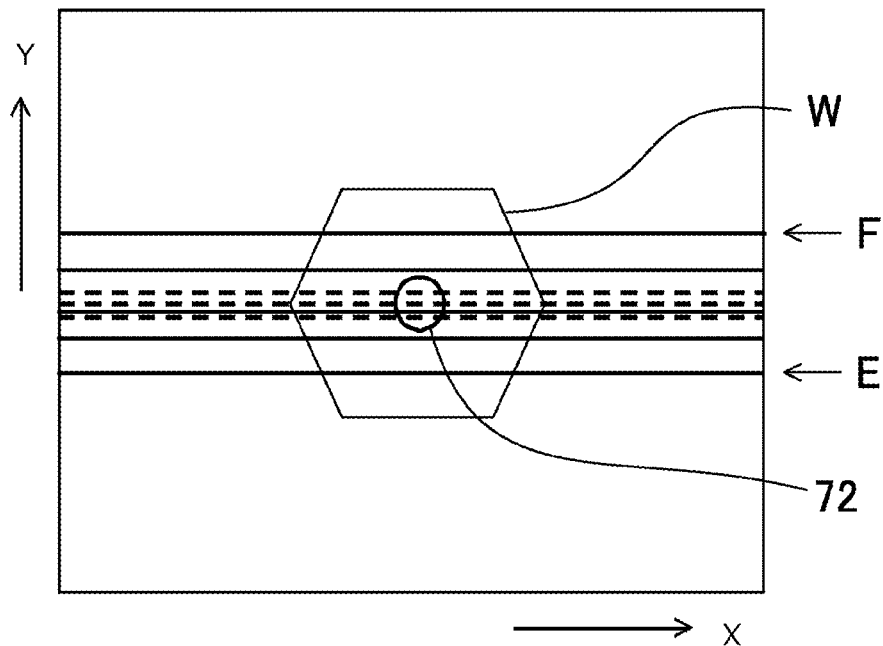
FIGS. 18A and 18B show situations in which scanning is performed with the measurement light, as viewed from above.

FIG. 18A shows a situation in which scanning is performed with the measurement light in the condition in FIG.

17B, as viewed from above. The extending direction of the measurement light is an X direction in the right-left direction in the drawing. The scanning direction of the measurement light is a Y direction in the up-down direction in the drawing. The measurement position that is set by the setting unit 304 is indicated by a circle of a mark 72. The measurement light is emitted between the lines E and F at intervals in the Y direction multiple times so as to irradiate the inner part of the circle of the mark 72, as shown by the solid lines. This scanning process is a first scanning process in which the measurement object W is scanned at a relatively large pitch by the measurement light. During the first scanning process, the angle of scanning performed by the MEMS mirror 15 at the time the measurement light is emitted to a region containing the measurement position is measured by the angle measuring unit 22*b*.

Thereafter, the measurement controller 305 performs a second scanning process in which scanning is performed at a relatively small pitch at an irradiation angle around the scanning angle measured by the angle measuring unit 22*b*. The measurement light that is emitted in the second scanning process is shown by the dashed lines in FIG. 18A. The intervals in the Y direction of the measurement light are shorter than those in the first scanning process, which are shown by the solid lines. The intervals in the Y direction are set so that at least one, or preferably, at least two, rays of the measurement light will irradiate the circle of the mark 72. The first scanning process can be called an "approximate searching processing" for searching for the measurement position. On the other hand, the second scanning process can be called "precise measurement processing" for precisely measuring the measurement position that is searched for in the approximate searching.

Figure 18B:
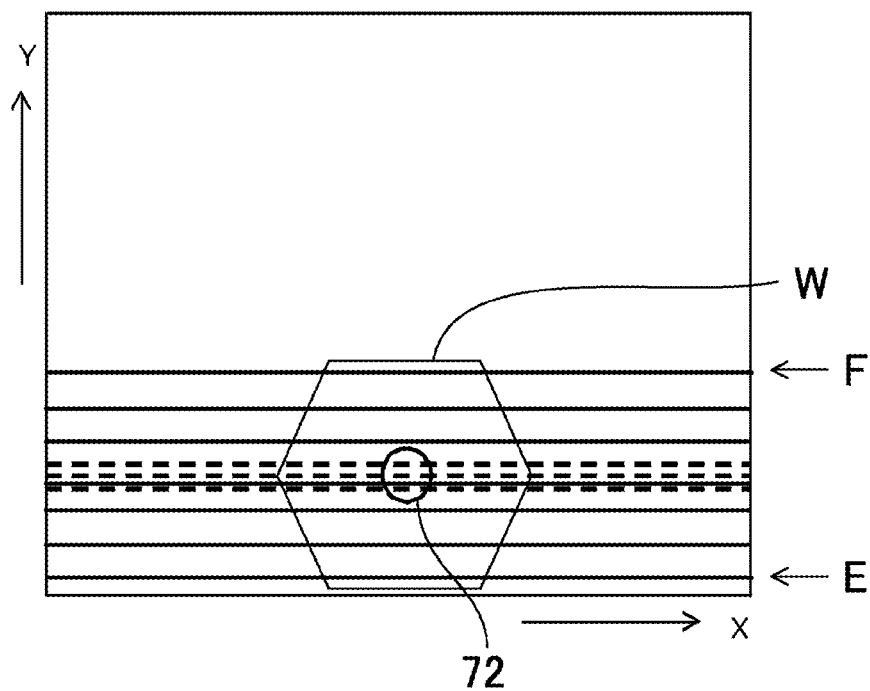

FIG. 18B shows a situation in which scanning is performed with the measurement light in the condition in FIG. 17D, as viewed from above. Also in the case in which the measurement object W is at the second position, the precise measurement processing is performed after the approximate searching processing for searching for the measurement position is performed. In the case in which the measurement object W is at the second position, the scanning range of the measurement light is wider than that in the case in which the measurement object W is at the first position, that is, θA<θB, and the number of the rays of the measurement light in the approximate searching processing is increased. In this example, the number of the rays of the measurement light is increased from five to seven. That is, the scanning range of the measurement light is varied in accordance with the Y coordinate. From this point of view, the measurement controller 305 individually sets the scanning ranges of the measurement light with respect to corresponding measurement positions set by the setting unit 304.

As shown in FIGS. 17A to 17D, the measurement controller 305 moves the scanning mirror of the MEMS mirror 15 in a first scanning range that is narrower than the scannable range so that the measurement light will irradiate at least the measurement position set by the setting unit 304. Then, the measurement controller 305 acquires a first irradiation angle of the scanning mirror, which is measured by the angle measuring unit 22*b* at the time the measurement light is emitted to the measurement position. These operations are performed in the approximate searching processing. The measurement controller 305 also cause the scanning mirror to move in a second scanning range that covers the first irradiation angle and that is narrower than the first scanning range. Then, the measurement controller 305 acquires a second irradiation angle of the scanning mirror, which is measured by the angle measuring unit 22*b* at the time the measurement light is emitted to the measurement position. These operations are performed in the precise measurement processing. The measurement controller 305 causes the measurement light to irradiate the measurement position in the first scanning range and in the second scanning range, in this order. The first irradiation angle and the second irradiation angle are stored in the storage 320.

In a case of setting multiple measurement positions, the measurement controller 305 causes the measurement light to irradiate each of the measurement positions in the first scanning range and in the second scanning range, in this order. In the case of setting a first measurement position and a second measurement position, the measurement controller 305 may cause the measurement light to irradiate the first measurement position in the first scanning range and in the second scanning range, in this order, and then irradiate the second measurement position in the first scanning range and in the second scanning range, in this order. Alternatively, in the case of setting the first measurement position and the second measurement position, the measurement controller 305 may cause the measurement light to irradiate the first measurement position and the second measurement position in the first scanning range and then irradiate the first measurement position and the second measurement position in the second scanning range.

Figure 19A:
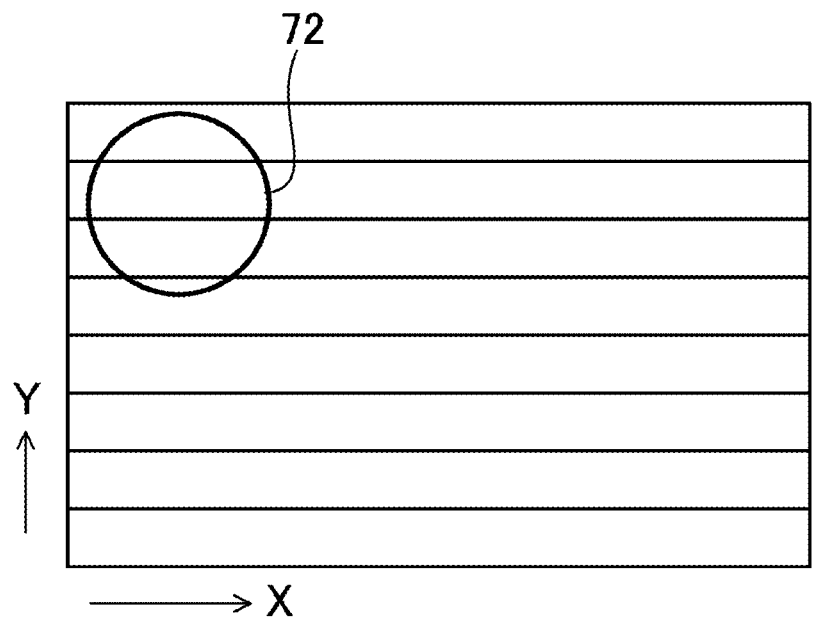
FIGS. 19A and 19B are diagrams for explaining change of a tool size of the height tool.
Figure 19B:
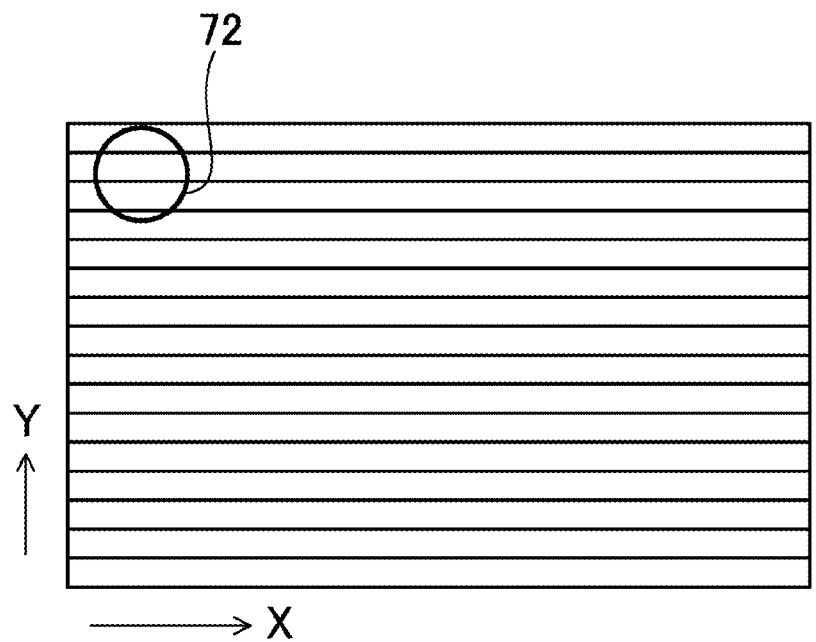

The measurement controller 305 varies the pitch of the measurement light for scanning the measurement position, in accordance with the dimensions of the measurement region of the measurement tool selected by the measurement tool selector 308. FIGS. 19A and 19B show a situation of changing the tool size of the height tool. The mark 72 with a large size causes a large pitch of the measurement light, as shown in FIG. 19A, whereas the mark 72 with a small size causes a small pitch of the measurement light, as shown in FIG. 19B. The pitch of the measurement light may be set by three or more steps, and the pitch of the measurement light may be set so that three to five rays of the measurement light will enter the inner part indicated by the mark 72. That is, the measurement controller 305 moves the scanning mirror to cause the measurement light to irradiate the measurement region of the measurement tool selected by the measurement tool selector 308. Specifically, the measurement controller 305 moves the scanning mirror to cause the measurement light to irradiate the measurement region of the measurement tool selected by the measurement tool selector 308, at intervals in the Y direction or the second direction multiple times. The scanning mirror may be moved to make the measurement light irradiate the measurement region only once.

After the position is corrected, the scanning range and the scanning position of the measurement light are changed. That is, the measurement controller 305 controls the light projector 10*a* and the MEMS mirror 15 to cause the measurement light to irradiate the position corrected by the position corrector 307. At this time, the light projector 10*a* and the MEMS mirror 15 may be controlled to cause the measurement light to irradiate only the measurement position corrected by the position corrector 307. The measurement controller 305 may change a scanning range of the measurement light of the MEMS mirror 15 on the basis of the Y coordinate of the measurement position corrected by the position corrector 307, in the luminance image. Specifically, on the basis of the Y coordinate of the measurement position corrected by the position corrector 307 and the displacement measurement range in which a displacement is measured, the range to be scanned by the MEMS mirror 15 is set narrower than the range that is scannable by the MEMS mirror 15.

Figure 20:
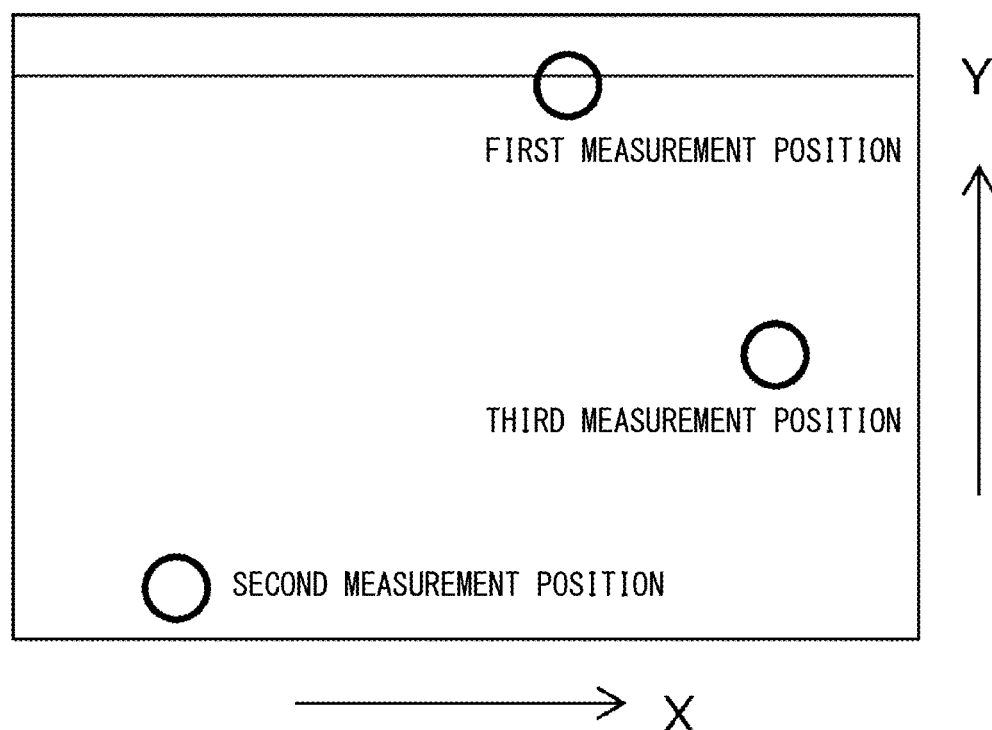
FIG. 20 is a drawing for explaining a scanning order of set multiple measurement positions.

As shown in FIG. 20, a first measurement position, a second measurement position, and a third measurement position may be set, and each may be scanned with the measurement light. In this case, for example, after the first measurement position is scanned, the MEMS mirror 15 is preferably controlled to scan the third measurement position at the measurement position close to the first measurement position in a Y direction, instead of the second measurement position, and then scan the second measurement position. This procedure increases the scanning speed of the MEMS mirror 15 in the case of measuring all of the first measurement position, the second measurement position, and the third measurement position.

Structure of Mode Selector 309

As shown in FIG. 7, the slave amplifier 3 also includes a mode selector 309. The mode selector 309 enables selecting a mode of operation of the displacement measuring apparatus 1 and enables a user to select the line mode or the scanning mode. The line mode makes the measurement light to irradiate the measurement object W while scanning is not performed by the MEMS mirror 15. The scanning mode makes the MEMS mirror 15 scan the measurement object W by using the measurement light. In the case in which a displacement is measurable in the line mode, the measurement is finished for a short time due to not scanning with the measurement light. On the other hand, a wide range may be measured in the scanning mode. For example, a means for selecting between the line mode and the scanning mode may be generated in a form of a mode selection user interface (not shown) by the UI generator 303. This mode selection user interface may be displayed on the display 8, and selection may be received through operation in this user interface by a user.

In the case in which the scanning mode is selected by the mode selector 309, the measurement controller 305 controls the light projector 10*a* and the MEMS mirror 15 to cause the measurement light to successively irradiate different positions in the Y direction or the second direction of the measurement object W. On the other hand, in the case in which the line mode is selected by the mode selector 309, the measurement controller 305 controls the light projector 10*a* and the MEMS mirror 15 to cause the measurement light to irradiate the same positions in the second direction of the measurement object W. Switching of the modes is thus executed.

In the case in which the line mode is selected by the mode selector 309, the measurement controller 305 causes the measurement light to irradiate the same positions in the second direction of the measurement object W without moving the scanning mirror. Moreover, in the case in which the line mode is selected by the mode selector 309, the measurement controller 305 causes the measurement light to irradiate multiple positions that are adjacent to each other in the second direction, by moving the scanning mirror.

The result of the selection between the scanning mode and the line mode is stored in a setting information storage 320*f* of the storage 320.

Structure of Irradiation Direction Adjuster 310

As shown in FIG. 7, the slave amplifier 3 also includes an irradiation direction adjuster 310. The irradiation direction adjuster 310 adjusts the irradiation direction of the measurement light in the second direction in the case in which the line mode is selected by the mode selector 309. The adjustment of the irradiation direction is performed on a user interface by a user, for example.

Structure of Irradiation Angle Determining Unit 311

As shown in FIG. 7, the slave amplifier 3 also includes an irradiation angle determining unit 311. The irradiation angle determining unit 311 continuously acquires a quantity of light received at a pixel position of a light receiving element corresponding to the measurement position. This quantity is output from the displacement measurement light receiver 40. Moreover, the irradiation angle determining unit 311 determines an irradiation angle of the scanning mirror at the time the measurement light is emitted to the measurement position. The scanning angle of the measurement light of the MEMS mirror 15 at the time the measurement light is emitted to a region containing the measurement position of the measurement object W is obtained by the angle measuring sensor 22. The output value of this angle from the angle measuring sensor 22 is used to calculate the irradiation angle of the scanning mirror at the time the measurement light is emitted to the measurement position. The obtained irradiation angle of the scanning mirror is determined as an irradiation angle of the scanning mirror at the time the measurement light is emitted to the measurement position. The determined irradiation angle of the scanning mirror is stored in the storage 320. In determining the irradiation angle of the measurement light, an approximate irradiation angle may be determined on the basis of a drive signal to the MEMS mirror 15, without using the angle measuring sensor 22. However, in consideration of variations in temperature characteristics and changes with time, the angle is preferably measured by the angle measuring sensor 22 or other appropriate unit, in order to know an accurate irradiation angle.

Structure of Displacement Measuring Unit 312

As shown in FIG. 7, the slave amplifier 3 also includes a displacement measuring unit 312. The displacement measuring unit 312 employs the principle of triangulation as a measurement principle. The displacement measuring unit 312 measures a displacement at the measurement position on the basis of the received-light quantity distribution for displacement measurement. The displacement measurement light receiver 40 outputs the received-light quantity distribution for displacement measurement upon receiving the measurement light that is emitted to and is reflected back from the measurement position set by the setting unit 304. The displacement measuring unit 312 may also measure a displacement on the basis of the measurement light that is reflected back from a region containing the measurement position, instead of the measurement light reflected back from the measurement position. That is, the displacement measuring unit 312 may measure a displacement at a measurement position on the basis of the received-light quantity distribution for displacement measurement, which is output from the displacement measurement light receiver 40 at the time the measurement light is emitted to a region containing the measurement position set by the setting unit 304. The measurement result may be stored in a measurement data storage 320*e* shown in FIG. 7. The functions of the displacement measuring unit 312 may be separated to the sensor head 2 and the slave amplifier 3.

After the first scanning process for scanning the measurement object W at a relatively large pitch by using the measurement light is performed, the displacement measuring unit 312 measures a displacement at the measurement position on the basis of the received-light quantity distribution that is acquired when the measurement light irradiates a region containing the measurement position, in the second scanning process for scanning at a relatively small pitch by using the measurement light.

The display 8 shows the displacement at the measurement position measured by the displacement measuring unit 312 by displaying a relative positional relationship between the measured displacement and a maximum displacement measurement range in which the displacement measuring unit 312 is able to measure. Specifically, in one example as shown by the user interface 70 in FIG. 10, after a displacement at the measurement position indicated by the mark 72 is measured, the measured value is displayed in a measured value display region 70a provided at a lower part of the user interface 70. A maximum displacement measurement range display region 70b is provided on a side of the measured value display region 70a. The maximum displacement measurement range display region 70b shows that the height at the part indicated by the mark 72 is higher as the indication approaches a right side and is lower as the indication approaches a left side, thereby enabling visual understanding of the degree of the height at the part indicated by the mark 72 in the maximum displacement measurement range. Thus, the degree of a margin of the measurement position indicated by the mark 72 within the maximum displacement measurement range is known.

In the case in which the position is corrected, measurement light that irradiates a measurement position corrected by the position corrector 307 is reflected back from this measurement position and is received by the displacement measurement light receiver 40. Also in the case in which the position is corrected, the displacement measuring unit 312 measures a displacement of the measurement position on the basis of the received-light quantity distribution for displacement measurement, which is output from the displacement measurement light receiver 40.

The displacement measuring unit 312 acquires the received-light quantity distribution for displacement measurement output from the displacement measurement light receiver 40. In this condition, the displacement measuring unit 312 employs the principle of triangulation to measure a displacement at the measurement position on the basis of the angle of the scanning mirror or the second irradiation angle, which is measured by the angle measuring unit 22b at the time the measurement light is emitted to the measurement position, as well as the position in the Y direction or the second direction of the measurement position. Moreover, as described above, a displacement at the measurement position may also be measured on the basis of the position in the X direction or the first direction as well as the position in the Y direction or the second direction. Specifically, this can be implemented by storing calibration data at the time of shipment of products. For example, while the measurement light is emitted, a calibration plate is disposed at a freely selected height Z, and a luminance image is imaged to recognize the extending direction of the measurement light at that time. If the extending direction is not parallel to a longitudinal direction of the light receiving element 22a or is curved, the deviated amount is stored as calibration data. In addition, a luminance image is imaged each time the calibration plate is disposed at each position with a height different from the freely selected height Z, to recognize the extending direction of the measurement light each time. Thus, calibration data at each height Z is obtained and is stored. During operation, an accurate displacement at the measurement position may be measured by using the calibration data on the basis of a position represented by an X coordinate in the X direction or the first direction of the measurement position.

The displacement measuring unit 312 acquires the received-light quantity distribution for displacement measurement, which is output from the displacement measurement light receiver 40. This acquisition is performed while scanning is performed in the first scanning range in the approximate searching processing, at intervals longer than the intervals of the acquisition performed while scanning is performed in the second scanning range that is narrower than the first scanning range. The reason for this is that the pitch of the measurement light at the time of scanning in the first scanning range is larger than the pitch of the measurement light at the time of scanning in the second scanning range. When the pitch is narrow, the irradiation interval of the measurement light is short, and the interval of acquiring the received-light quantity distribution is shortened accordingly.

The displacement measuring unit 312 may also measure a displacement at the measurement position on the basis of the received-light quantity distribution that is acquired when the measurement light irradiates a region containing the measurement position, in the second scanning process. The displacement measuring unit 312 may measure a displacement at the measurement position multiple times by acquiring the received-light quantity distribution for displacement measurement, which is output from the displacement measurement light receiver 40 each time the measurement light is emitted, and the displacement measuring unit 312 may average the obtained multiple displacements.

Figure 21A:
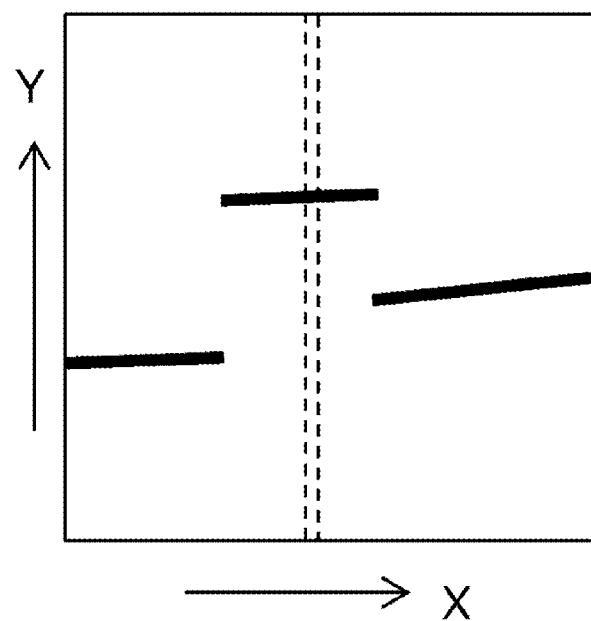
FIGS. 21A and 21B show a distribution of quantity of light that is received by the displacement measurement light receiver.
Figure 21B:
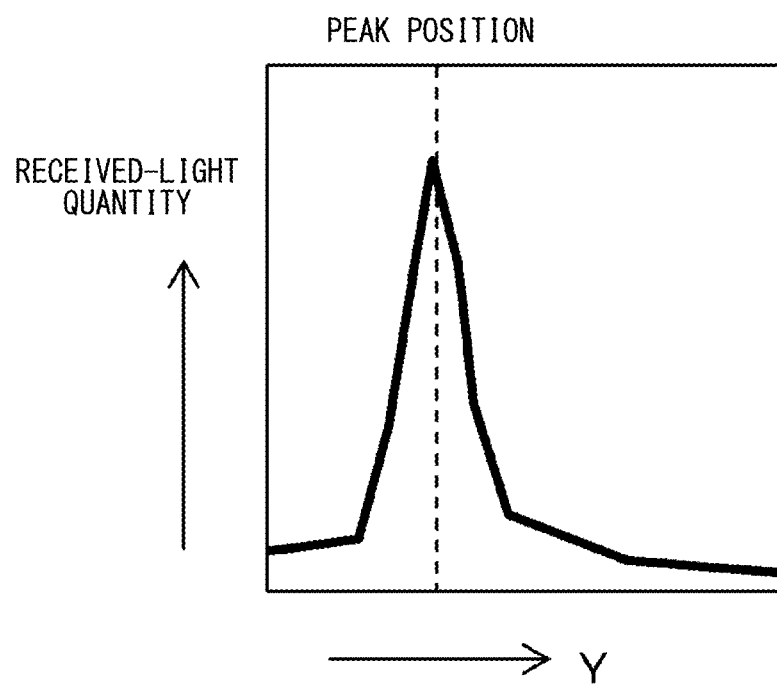

The displacement measuring unit 312 may also measure a displacement at the measurement position on the basis of the irradiation angle that is determined by the irradiation angle determining unit 311 as well as a peak position in the received-light quantity distribution acquired when the measurement light is emitted to the measurement position. FIG. 21A shows a distribution of light quantity that is output from the displacement measurement light receiver 40 when the measurement light extending in an X direction is emitted to a measurement object W. The center part is higher than each side part because the height of the center part is high. The range between the two dashed lines is extracted from FIG. 21A, and an enlarged range is shown in FIG. 21B. As shown in FIG. 21B, a peak position is obtained on the basis of the received-light quantity distribution. Details of the process for obtaining the peak position will be described later.

The displacement measuring unit 312 may estimate a peak position on the basis of the received-light quantity distribution acquired when the measurement light irradiates a measurement position. More specifically, in a case in which the received-light quantity distribution is not continuously obtained in the Y direction, a peak position is estimated on the basis of the received-light quantity distribution obtained from the surroundings of the measurement position.

The displacement measuring unit 312 may determine a peak position by selecting one from among multiple peaks in a case in which the multiple peaks exist in the received-light quantity distribution acquired when the measurement light irradiates a measurement position. A highest peak among multiple peak positions that exist at intervals in the Y direction may be used as a peak position. Of course, instead of using the highest peak as the peak position, an optimal peak position may be estimated on the basis of the multiple peak positions.

The displacement measuring apparatus 1 may be set to make the measurement controller 305 control the light projector 10*a* and the MEMS mirror 15 so that the measurement light will scan the whole measurement object W at a first pitch and then scan the whole measurement object W at a second pitch different from the first pitch. In this case, the displacement measuring unit 312 generates first height data of the whole measurement object W on the basis of the received-light quantity distribution for displacement measurement that is sequentially output from the displacement measurement light receiver 40 in scanning at the first pitch. Moreover, the displacement measuring unit 312 generates second height data of the whole measurement object W on the basis of the received-light quantity distribution for displacement measurement that is sequentially output from the displacement measurement light receiver 40 in scanning at the second pitch.

The first height data and the second height data are master data and constitute three-dimensional data that is stored in conjunction with luminance images. Holding the first height data and the second height data enables obtaining a displacement from the first height data or the second height data without emitting the measurement light to a measurement position and immediately displaying the displacement, in measuring using the measurement tool at the time of setting. In a case in which the position of the measurement tool is finely adjusted after the setting is once performed, a displacement at the measurement position after this adjustment is retrieved without preparing a measurement object W as a master again.

Although the height data may be one piece of information, the first height data and the second height data in which the pitch of the measurement light differ from each other may be held. In this case, a displacement is read from the corresponding height data with respect to each measurement tool and each size of the measurement tool, and the read data is displayed. For example, one master data that is obtained by measurement at a small pitch may be held and be used by reducing data contained in the master data. However, the master data that is generated by reducing data therein may not completely correspond to a final process, and therefore, it is preferable to hold multiple pieces of height data in which pitches of the measurement light differ from each other. The height data is stored in a height data storage 320*b* of the storage 320.

In the case in which the line mode is selected by the mode selector 309, the displacement measuring unit 312 may measure a displacement of the measurement object W multiple times by acquiring the received-light quantity distribution for displacement measurement, which is output from the displacement measurement light receiver 40 each time the measurement light is emitted. Moreover, the displacement measuring unit 312 may average the obtained multiple displacements. The word "average", which is described in this specification, refers to a broad concept including use of, for example, trimmed mean, a median filter, and various kinds of filters, in addition to mean in a narrow sense.

Structure of Pass/Fail Determining Unit 313

As shown in FIG. 7, the slave amplifier 3 also includes a pass/fail determining unit 313. The pass/fail determining unit 313 determines pass/fail of the measurement object W by combining a result of determining the condition of the measurement object W on the basis of a luminance image, which is generated by the luminance image generator 302, and a result of determining the condition of the measurement object W on the basis of the displacement, which is measured by the displacement measuring unit 312. For example, whether a part is missed is detected in a luminance image, and the measurement object W is determined as being a defective product in a case in which the displacement measured by the displacement measuring unit 312 does not satisfy a reference value even though no part is missed. In contrast, the measurement object W may be determined as being a defective product in a case in which missing of a part is determined in a luminance image even though the displacement measured by the displacement measuring unit 312 satisfies the reference value. These process results may be stored in a process result storage 320*c* shown in FIG. 7.

Structure of Setting Information Storage 320*f*

The setting information storage 320*f* stores programs as shown in FIGS. 22 to 24. The program is composed of multiple pieces of setting information, and multiple programs may be stored. The setting information that is contained in each of the programs includes information such as a result of selection between the scanning mode and the line mode, setting relating to a trigger, setting relating to imaging such as brightness and sensitivity, existence of master data, correction of tilt of a head, a measurement tool to be applied, and parameters for the measurement tool. A user is allowed to select a desired program from among the programs stored in the setting information storage 320*f* and to use the selected program in operating the displacement measuring apparatus 1.

Specific Examples of Setting and Operation

Figure 25:
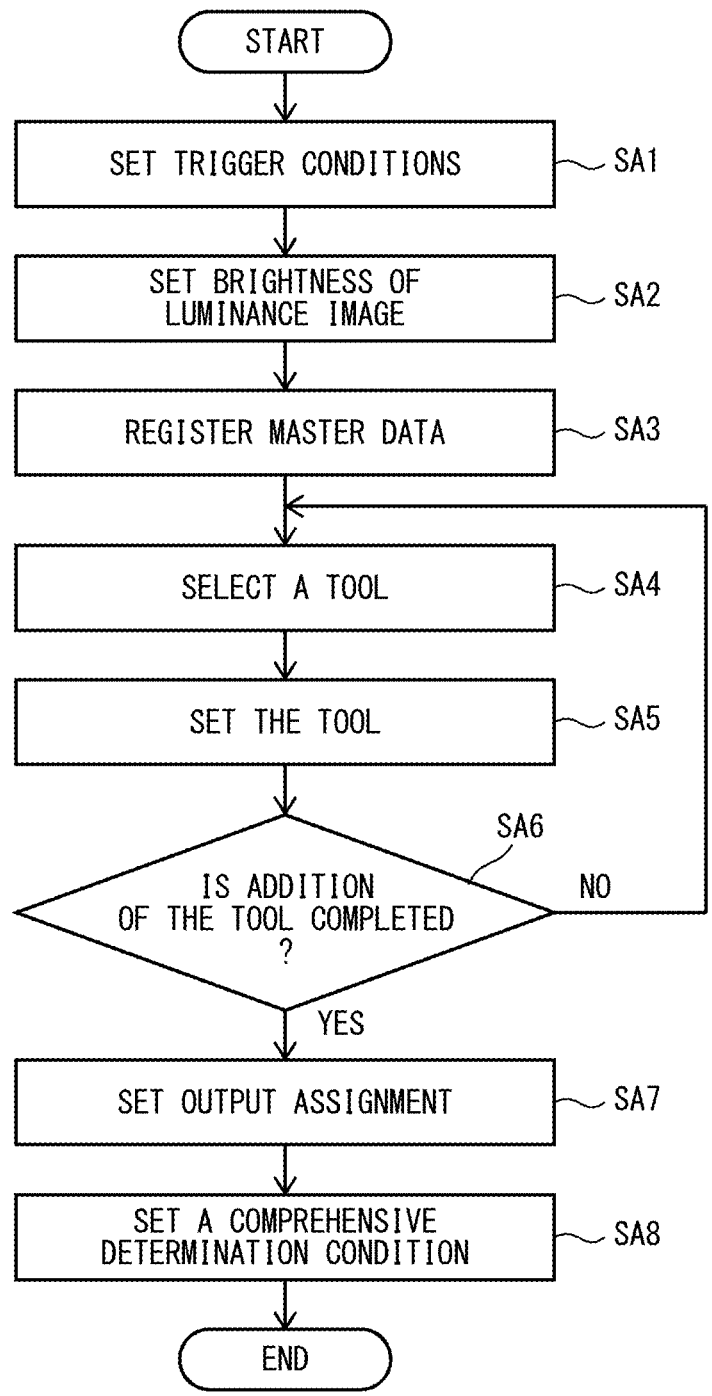
FIG. 25 is a flowchart in the scanning mode.

Next, specific examples of setting and operation of the displacement measuring apparatus 1 are described. FIG. 25 is a flowchart showing a procedure in the scanning mode of the displacement measuring apparatus 1.

Procedure in Scanning Mode

In step SA1 in the flowchart in the scanning mode, an external trigger, an internal trigger, and other conditions are set, whereby what manner of movement is activated by what kind of a trigger signal is set. After the trigger conditions are set, the setting information is sent to the slave amplifier 3 and the sensor head 2, and the sensor head 2 moves following these conditions.

Figure 26:
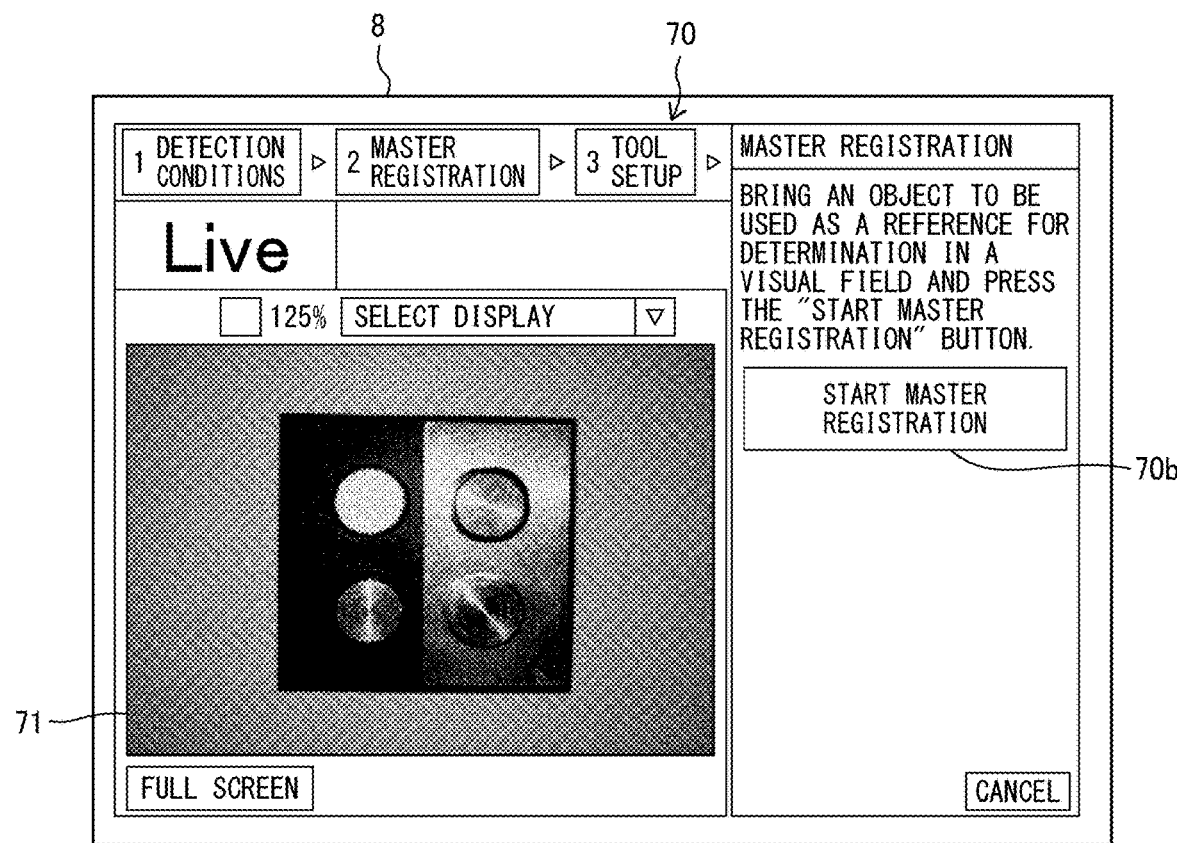
FIG. 26 shows a luminance image that is obtained in the scanning mode.

In step SA2, brightness of a luminance image is set. The brightness is set by setting an exposure time, a quantity of illumination light, an imaging mode or existence of HDR, and other parameters. The "HDR" represents a high dynamic range process. The brightness may be set automatically or manually. A luminance image of the measurement object W obtained at this time is shown in FIG. 26.

In step SA3, master data is registered. The master data is three-dimensional data or height data of a luminance image and of the whole field of view. The sensor head 2 obtains a luminance image of a measurement object W and measures a displacement by scanning the whole measurement object W by using the measurement light, thereby obtaining height data. The luminance image and the height data are made to correspond to each other and are stored in the height image storage 320*b* shown in FIG. 7. In step SA3, scanning may be performed at different pitches by using the measurement light to obtain multiple pieces of height data. The multiple pieces of the height data are obtained by each type of a method. For example, scanning is performed at the predetermined smallest pitch by using the measurement light to obtain first height data, and height data for a pitch that is rougher than the smallest pitch or for a pitch of low resolution may be generated by reducing data contained in the first height data. Moreover, the master registration may be omitted.

In step SA4, for example, the measurement tool selection interface 80 as shown in FIG. 15 is displayed on the display 8, to allow selection of the measurement tool. In response to selection of the measurement tool, the procedure advances to step SA5, and setting of each tool is performed. The order of setting the measurement tools is not specified, but setting of the position correction tool is performed first. One position correction tool may be set for all of the other measurement tools, or a position correction tool may be set individually with respect to each of the other measurement tools.

Whether addition of the measurement tool is completed is determined in step SA6. If addition of the measurement tool is still not completed, the measurement tool is added through steps SA4 and SA5. After addition of the measurement tool is completed, the procedure advances to step SA7. In step SA7, output assignment is set. Thereafter, a comprehensive determination condition is set in step SA8.

Master Registration in Scanning Mode

Figure 27:
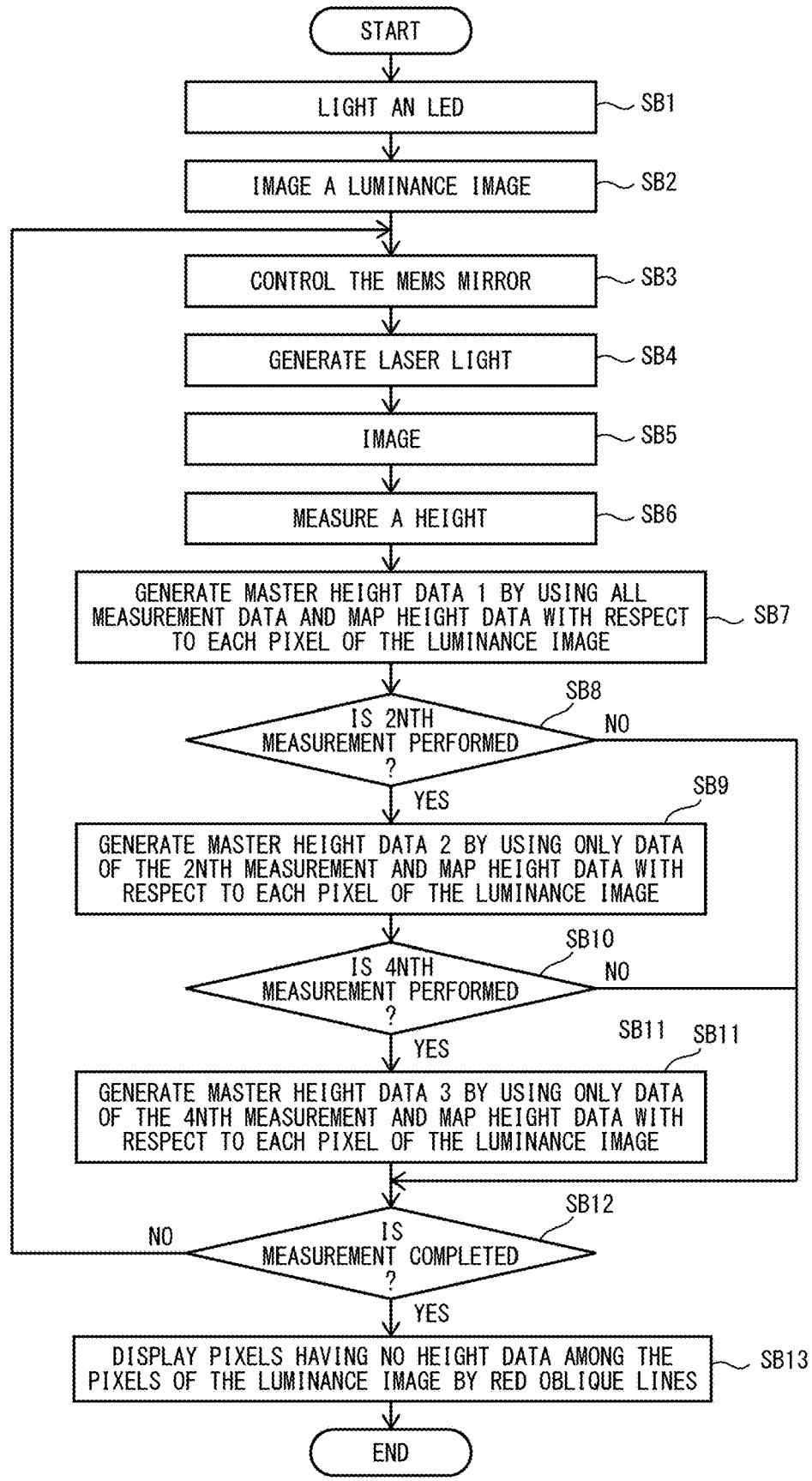
FIG. 27 is a master registration flowchart in the scanning mode.

Next, details of the master registration in the scanning mode are described. In response to pressing a master registration start button 70b of the user interface 70 as shown in FIG. 26, master registration starts. In step SB1 in a master registration flowchart shown in FIG. 27, the first to the fourth light emitting diodes 31 to 34 of the illuminator 30 are lighted. In step SB2, a luminance image is imaged. The image data is stored in, for example, an image data storage 320d of the slave amplifier 3. The image data storage 320d is shown in FIG. 7.

In step SB3, the MEMS mirror 15 is controlled so as to be able to measure displacements of the whole measurement object W in the luminance image. In step SB4, strip-shaped measurement light is emitted from the laser output unit 12 to irradiate the measurement object W. An image is obtained in step SB5, and a displacement is measured in step SB6. The displacement may be measured by the sensor head 2 without transferring the image obtained at that time, to the slave amplifier 3. The processes until the process for calculating a coordinate of a peak position from the image imaged in step SB5 may be performed by the sensor head 2, and calculation of an actual measurement value from the peak position may be performed by the slave amplifier 3.

In step SB7, master height data 1 is generated by using all pieces of the measurement data, and height data is mapped with respect to each pixel of the luminance image. In step SB8, whether 2N-th measurement is performed is determined. If the 2N-th measurement is performed, the procedure advances to step SB9, and otherwise, if the 2N-th measurement is not performed, the procedure advances to step SB12. In step SB9, master height data 2 is generated by using only the data of the 2N-th measurement, and height data is mapped with respect to each pixel of the luminance image. In step SB10, whether 4N-th measurement is performed is determined. If the 4N-th measurement is performed, the procedure advances to step SB11, and otherwise, if the 4N-th measurement is not performed, the procedure advances to step SB12. In step SB11, master height data 3 is generated by using only the data of the 4N-th measurement, and height data is mapped with respect to each pixel of the luminance image. The processes in steps SB7, SB9, and SB11 may be performed in parallel.

Figure 28:
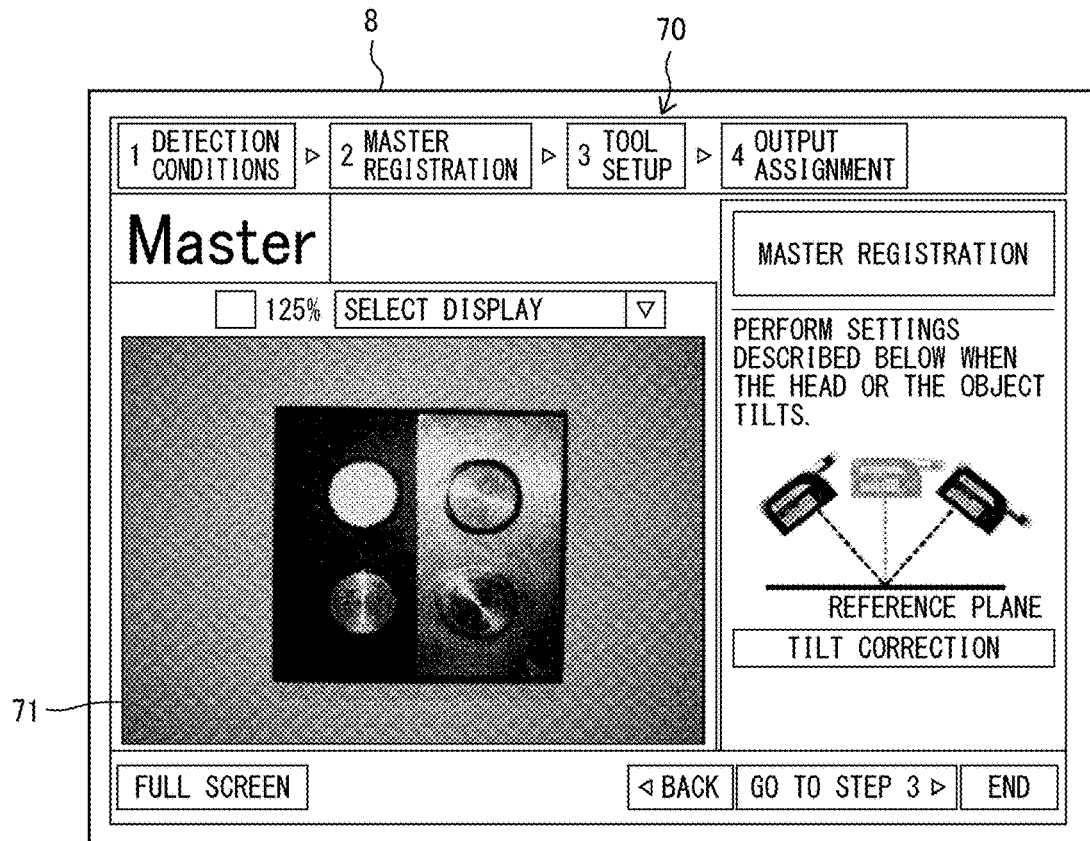
FIG. 28 shows an image displayed on a display in master registration in the scanning mode.

Whether the measurement is completed is determined in step SB12. If the measurement is still not completed, the procedure advances to step SB3, and the steps of the procedure are performed again. If the measurement is completed, the procedure advances to step SB13. Height data at a blind spot is not generated in the measurement using triangulation. In view of this, each pixel of the luminance image in which the height data is not obtained is shown on the display 8 by red oblique lines. These pixels are shown in FIG. 28 by the oblique lines. The master height data 1 to 3 may be stored in the height data storage 320b shown in FIG. 7.

Use of Master Height Data

Figure 29:
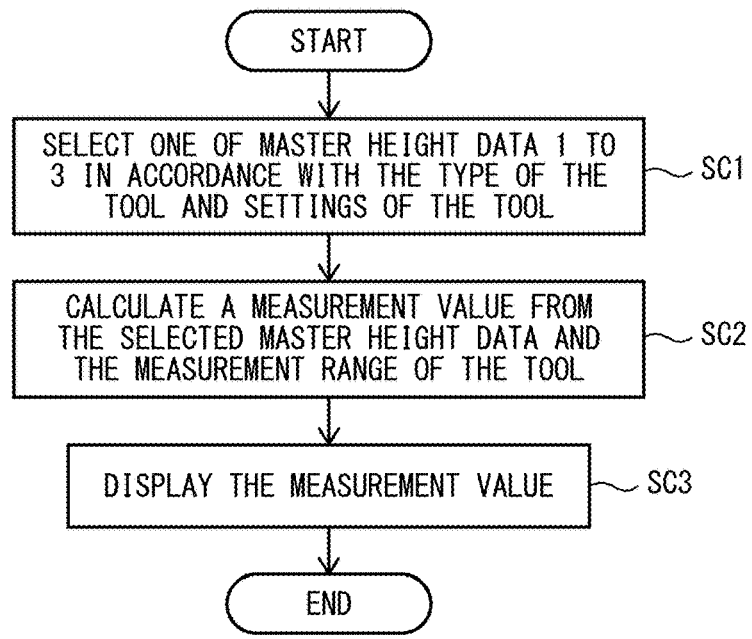
FIG. 29 is a flowchart in a case of using master height data.

Next, use of the master height data 1 to 3 is described with reference to a flowchart shown in FIG. 29. The master height data 1 to 3 are used in selecting the measurement tool. In step SC1, master height data to be used is selected from among the master height data 1 to 3 in accordance with the type of the measurement tool and setting of the measurement tool. In step SC2, a measurement value is calculated from the selected master height data, and the measurement position and the measurement range of the measurement tool. In step SC3, the value measured in step SC2 is displayed on the display 8.

Figure 30:
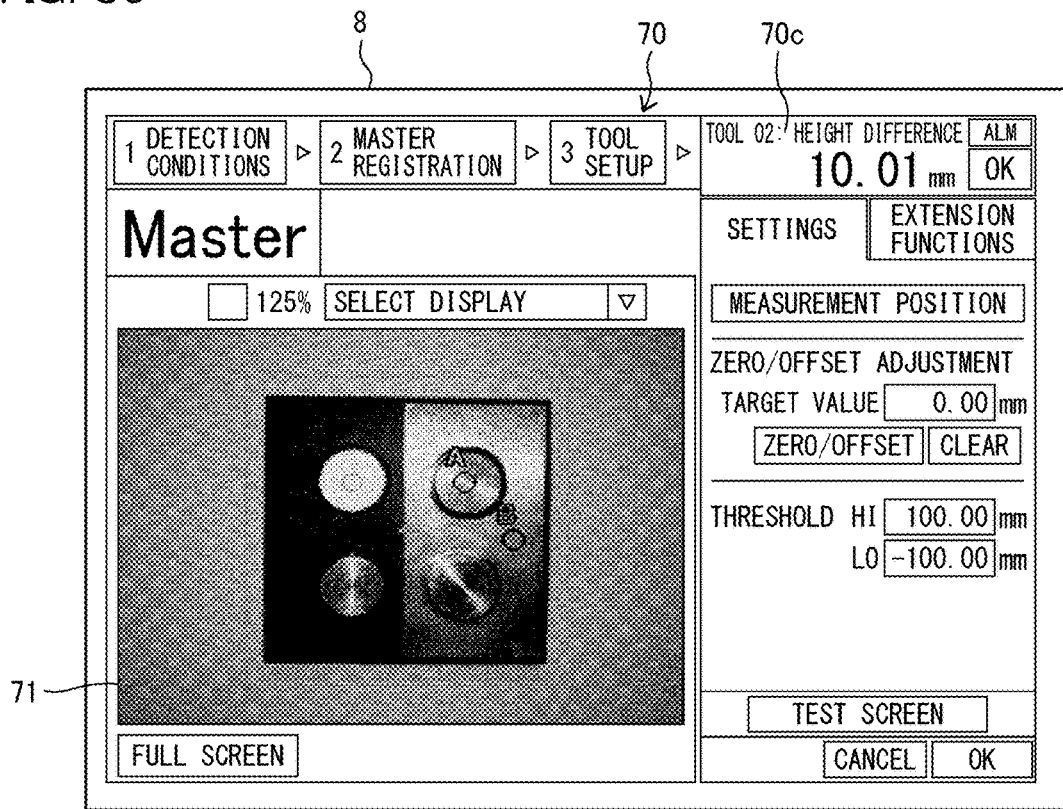
FIG. 30 shows an image displayed on the display in a case of selecting a height difference tool.
Figure 31:
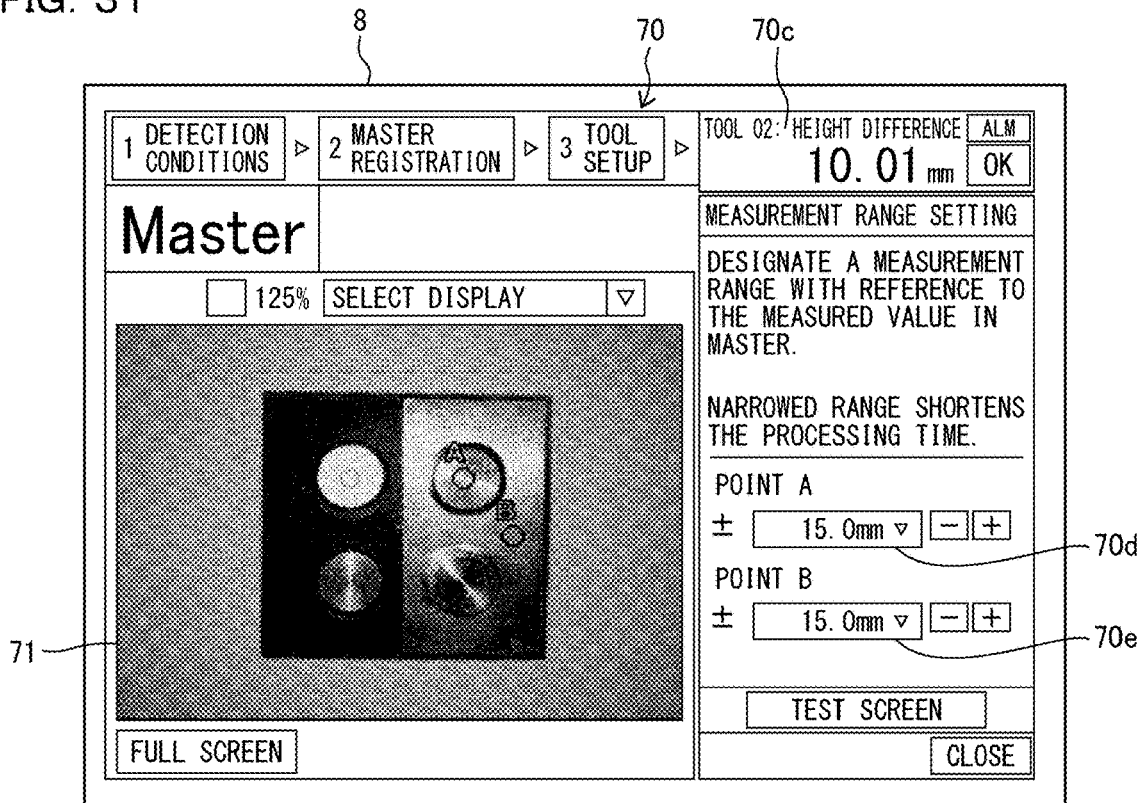
FIG. 31 shows an image displayed on the display in a case of setting a displacement measurement range of the height difference tool.

In the case of using the height difference tool, as shown in FIG. 30, in response to designation of two positions, for example, a point A and a point B, a height difference between the two points is displayed in terms of numerical value in a measured value display part 70c that is provided at an upper part of the user interface 70. After the two positions are designated, a displacement measurement range of each of the two positions may be set, as shown in FIG. 31. A region 70d for setting a displacement measurement range of the point A and a region 70e for setting a displacement measurement range of the point B are displayed in the user interface 70, thereby enabling individually setting the displacement measurement ranges of the points A and B.

Figure 32:
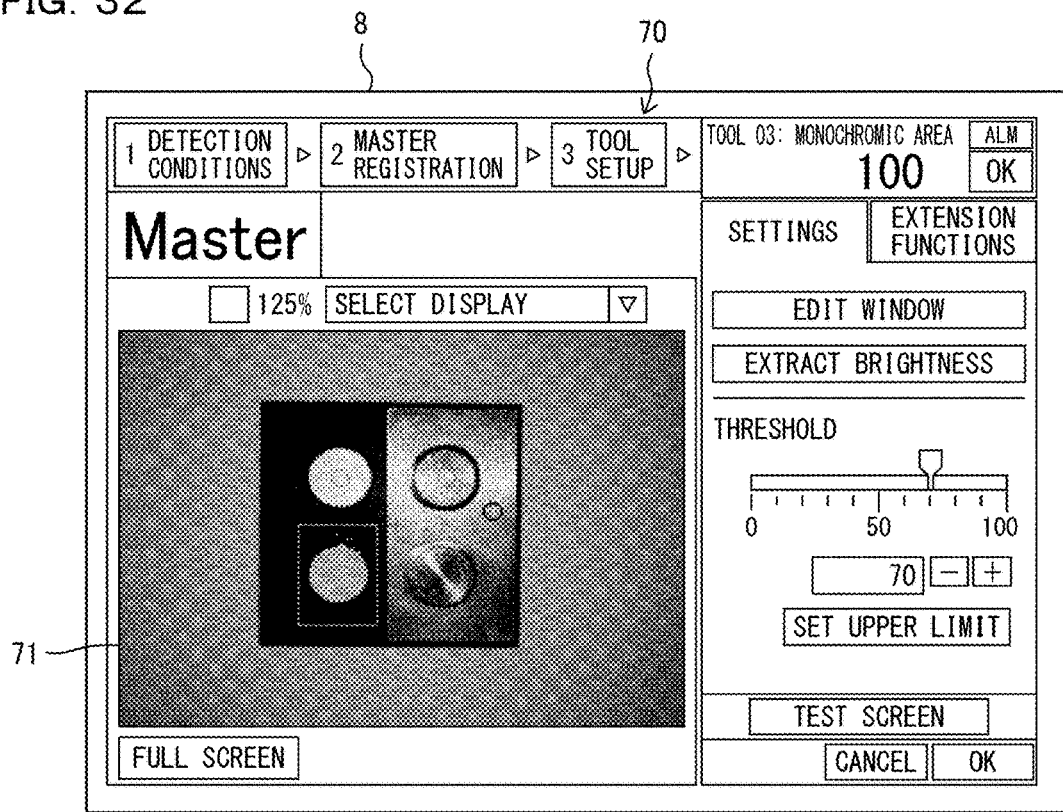
FIG. 32 shows an image displayed on the display in a case of selecting an area tool.

In the case of using an area tool, as shown in FIG. 32, surfaces that are in a predetermined color range are colored in the same color and are displayed. The area tool is a measurement tool for extracting a feature from the luminance image and is an example of a generally called image processing tool. In the case in FIG. 32, whether a surface is in the predetermined color range is determined by the area tool. In addition, an edge tool for extracting an edge from a luminance image to measure the edge width may be used. It is possible to set both of such an image processing tool and the displacement measurement tool for measuring a displacement, in one luminance image in this embodiment.

Figure 33:
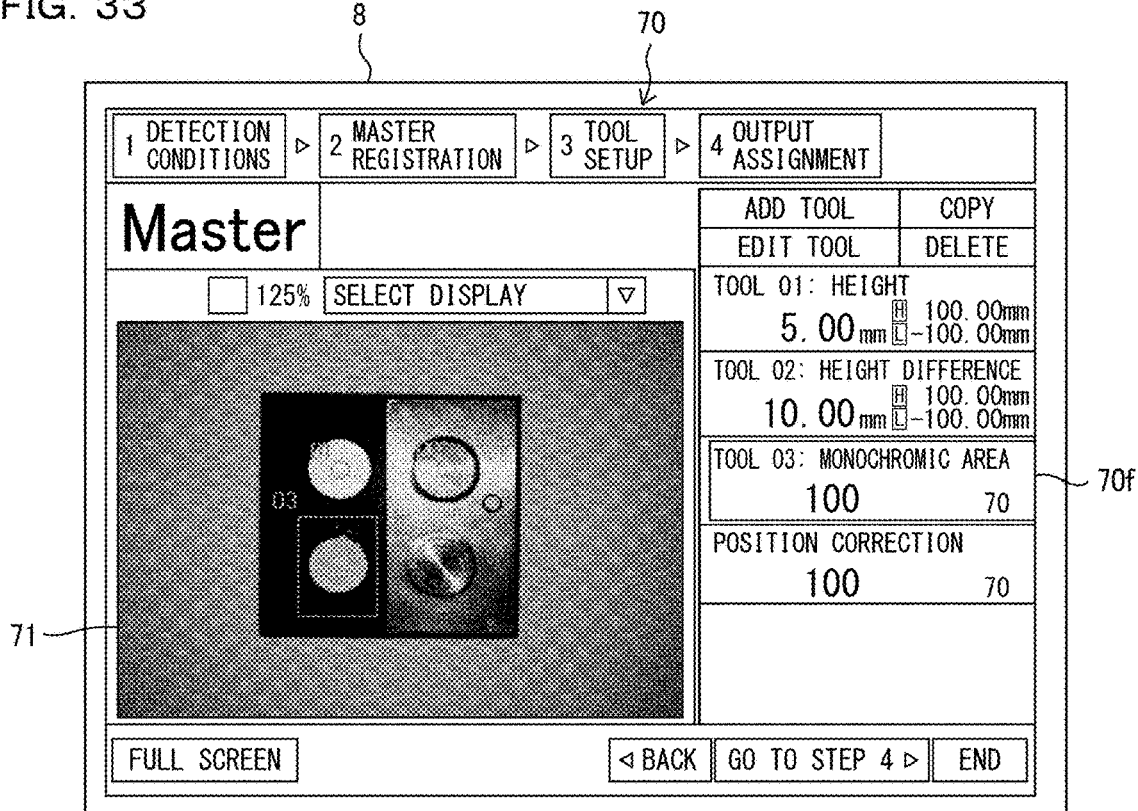
FIG. 33 shows an image displayed on the display when settings of measurement tools are finished.

After setting of the measurement tool is completed in the scanning mode, as shown in FIG. 33, a list of the selected measurement tools is displayed in a measurement tool display region 70f that is provided on a side of the user interface 70.

Setting of Output Assignment

Figure 34:
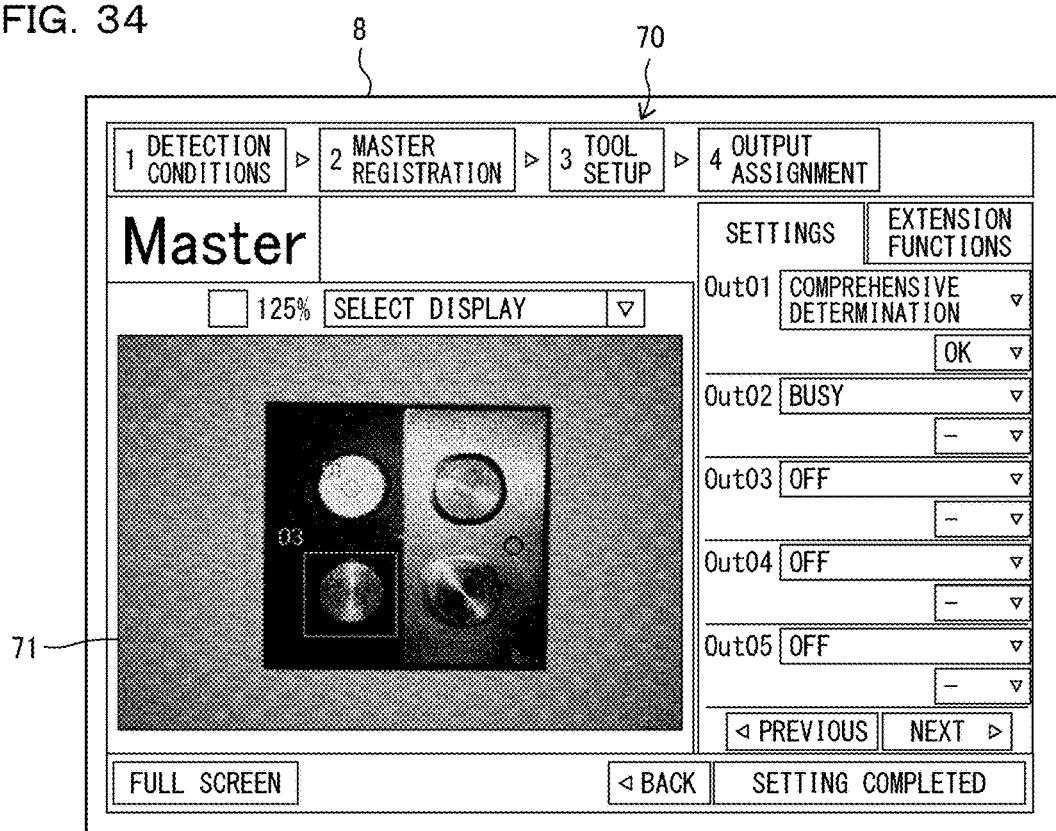
FIG. 34 shows a setting screen for output assignment in the scanning mode.

In setting the output assignment, assigning of data to output pins for outputting the data to the outside is set, as shown in FIG. 34. Information such as "OFF", "Comprehensive determination", "Busy", "Error", and "Result of tool 1" may be selected, but other information may also be selected.

Setting of Comprehensive Determination Condition

Figure 35:
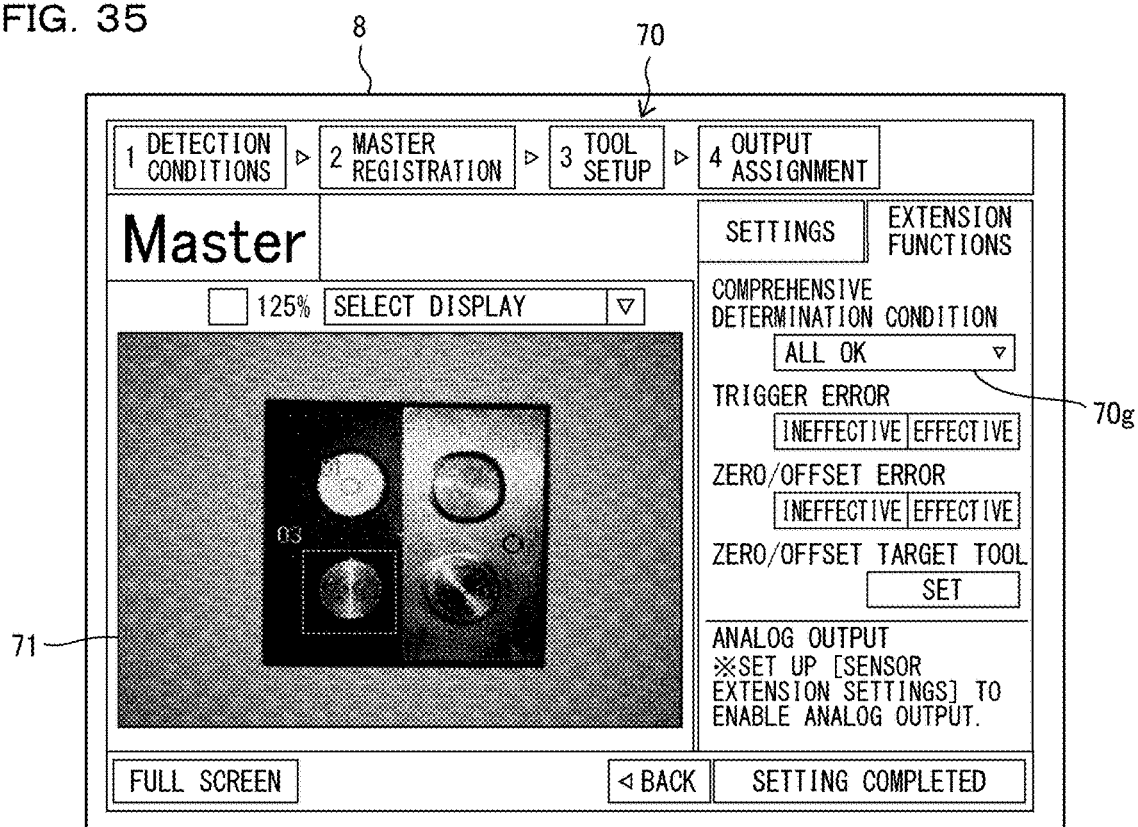
FIG. 35 shows a setting screen for a comprehensive determination condition in the scanning mode.

As shown in FIG. 35, "All OK" or "Any one is OK" relating to the results of the measurement tools is selected in a determination condition setting region 70g. In another case, a combination pattern by which the comprehensive determination result is OK when a result of a measurement tool 1 is OK although a result of a measurement tool 2 is NG may be set.

After these settings are finished, the displacement measuring apparatus 1 shifts from the setting mode to the operation mode and starts operation. Setting information is output to the sensor head 2, and only RAM values of a volatile memory are rewritten, until the settings are finished. After the settings are finished, the setting information is written as ROM values of a nonvolatile memory. The word "operation" represents operating the displacement measuring apparatus 1 in a measurement site.

Halation Reducing Function

The displacement measuring apparatus 1 has a halation reducing function for reducing white areas in a luminance image. That is, imaging of a luminance image by using a light emitting diode may cause halation in a case of using a measurement object W that reflects regularly. This problem may be solved by attaching the polarization filter attachment 52, but the fitted polarization filter 52*a* can decrease a quantity of received measurement light. Alternatively, halation may be reduced by using a dome light, but the dome light tends to be large in dimensions and can disturb measurement.

From these points of view, instead of fitting the polarization filter 52*a* or using the dome light, a halation reducing function for reducing halation is equipped in this embodiment. The polarization filter 52*a* and the dome light may also be used. One or both of the polarization filter 52*a* and the dome light and the halation reducing function may be used in combination.

The halation reducing function may be equipped to the slave amplifier 3 or the sensor head 2. First, the measurement controller 305 controls to individually light the light emitting diodes 31 to 34 of the illuminator 30. The displacement measurement light receiver 40 outputs multiple received-light quantity distributions that are obtained by the individual lighting of the light emitting diodes 31 to 34. The luminance image generator 302 generates a composite luminance image in which effects of halation are reduced, on the basis of the multiple received-light quantity distributions. In more detail, multiple images that are obtained by emitting illumination light from different directions are composited, thereby reducing or removing halation.

Figure 36:
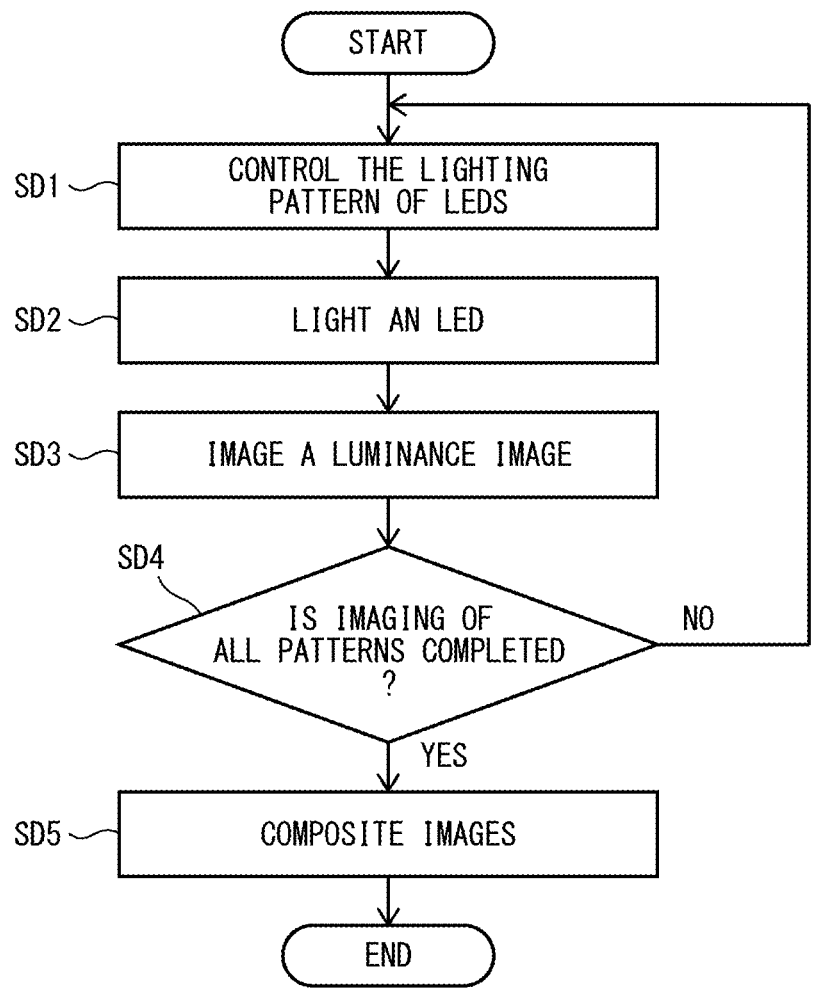
FIG. 36 is a flowchart showing a processing procedure for decreasing halation.

FIG. 36 shows a flowchart of a halation reduction process. In step SD1, lighting pattern of the first to the fourth light emitting diodes 31 to 34 is controlled. The lighting pattern is controlled to sequentially light the first to the fourth light emitting diodes 31 to 34. In step SD2, only the first light emitting diode 31 is lighted, only the second light emitting diode 32 is lighted, only the third light emitting diode 33 is lighted, and then only the fourth light emitting diode 34 is lighted. In step SD3, the displacement measurement light receiver 40 outputs a received-light quantity distribution, for example, while only the first light emitting diode 31 is lighted, and this received-light quantity distribution is temporarily stored. In step SD4, whether the displacement measurement light receiver 40 outputs a received-light quantity distribution with respect to each of the first to the fourth light emitting diodes 31 to 34 is determined. The displacement measurement light receiver 40 also outputs a received-light quantity distribution while only the second light emitting diode 32 is lighted, and this received-light quantity distribution is temporarily stored. The displacement measurement light receiver 40 also outputs a received-light quantity distribution while only the third light emitting diode 33 is lighted, and this received-light quantity distribution is temporarily stored. The displacement measurement light receiver 40 further outputs a received-light quantity distribution while only the fourth light emitting diode 34 is lighted, and this received-light quantity distribution is temporarily stored. Thus, data constituting four luminance images are obtained.

Thereafter, the procedure advances to step SD5. In this embodiment, four luminance images are obtained by emitting illumination light from respective four directions, whereby four kinds of data are generated. Thus, four luminance values exist in each pixel. The brightest value among the four luminance values highly possibly represents halation. In view of this, the brightest value is excluded, and the second to the fourth brightest values are used to generate a composite image in step SD5. This provides a luminance image in which halation is reduced or removed.

Obtaining of Peak Position

Figure 37:
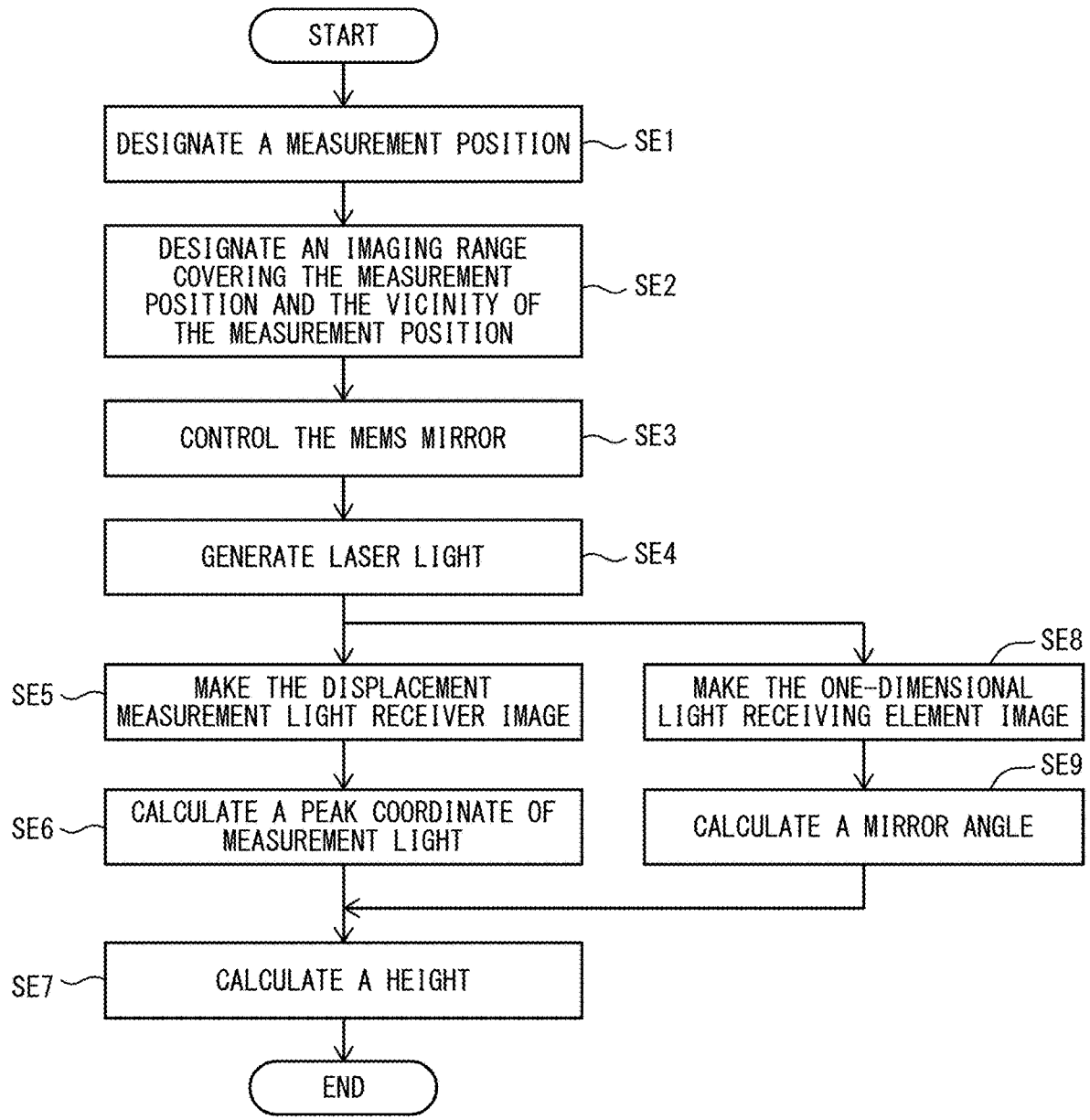
FIG. 37 is a flowchart showing a processing procedure for obtaining a peak position.

FIG. 37 is a flowchart showing a procedure for obtaining a peak position in a received-light quantity distribution acquired when the measurement light irradiates a measurement position of the measurement object W. In step SE1, designation of a measurement position of a measurement object W is received. This is performed by the setting unit 304. In step SE2, an imaging range covering the measurement position and the vicinity of the measurement position, that is, a displacement measurement range is designated. In step SE3, the MEMS mirror 15 is controlled to enable measurement of a displacement in the displacement measurement range containing the measurement position. In step SE4, strip-shaped measurement light is emitted from the laser output unit 12 to irradiate the measurement object W.

In step SE5, the displacement measurement light receiver 40 performs imaging. In step SE6, a coordinate of the peak position of the measurement light is calculated from the received-light quantity distribution output from the displacement measurement light receiver 40. In step SE8, imaging is performed by the one-dimensional light receiving element 22*a*. The imaging that is performed by the displacement measurement light receiver 40 and the imaging that is performed by the one-dimensional light receiving element 22*a* are executed at approximately the same time. This reduces a measurement error. In step SE9, the angle of the scanning mirror is calculated by the angle measuring unit 22*b*, as described above. Thereafter, in step SE9, a height or a displacement is calculated by using the principle of triangulation on the basis of the peak position of the measurement light and the angle of the scanning mirror, which is an irradiation angle of the measurement light from the scanning mirror. As described above, the height or displacement may be calculated by using calibration data on the basis of the X coordinate at the peak position of the measurement light. This enables more accurate calculation of height in consideration of variations in temperature characteristics and changes with time.

Tilt Correction Function

Figure 38:
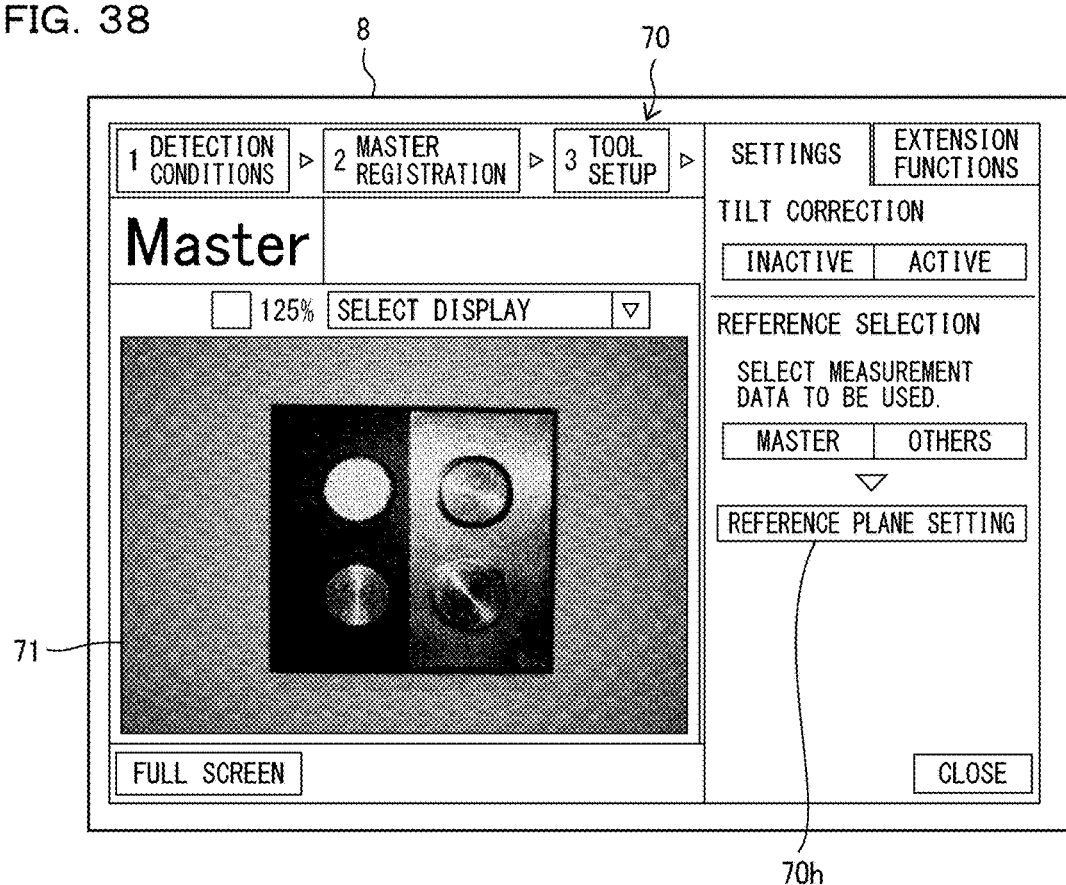
FIG. 38 shows a reference plane setting screen in correcting inclination.
Figure 39:
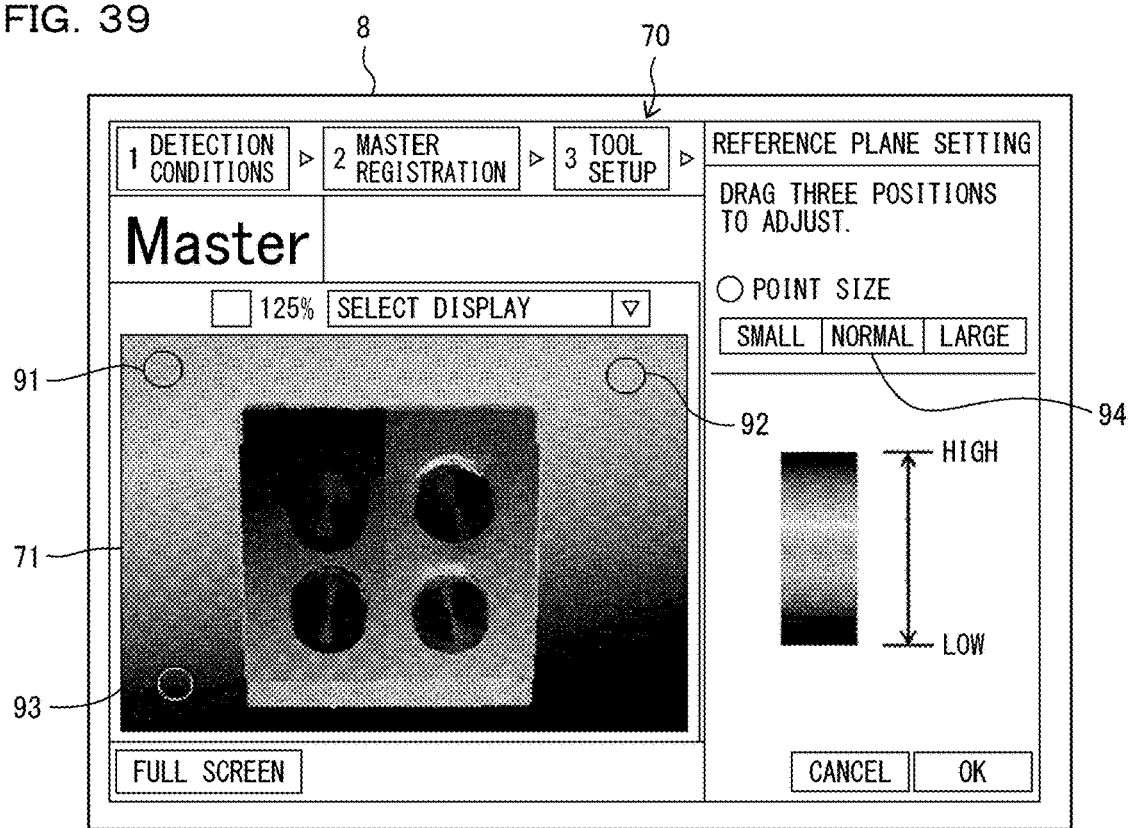
FIG. 39 shows a screen after the reference plane is set.

The displacement measuring apparatus 1 has a tilt correction function for correcting a tilt of a flat reference plane. The tilt correction function may be equipped to the slave amplifier 3 or the sensor head 2. In response to pressing a reference plane setting button 70*h* in a state in which a luminance image is displayed in the user interface 70 as shown in FIG. 38, a height image is displayed in the user interface 70 as shown in FIG. 39. The height image is an image that is colored depending on height. For example, an image may be made to contain a part that is lighter as the height is higher and a part that is darker as the height is lower, or an image may be made to contain a part that is redder as the height is higher and a part that is bluer as the height is lower. A height image shown in FIG. 39 tilts such that the reference plane is lower as it goes downward in the display 8.

A user sets a reference plane in the height image as shown in FIG. 39. The reference plane is specified by designating three points. In this example, a first point 91, a second point 92, and a third point 93 are designated by operating the input unit 9. The size of each of the points 91 to 93 is changeable by operating a size setting part 94, and for example, it may be small, normal, or large.

Figure 40:
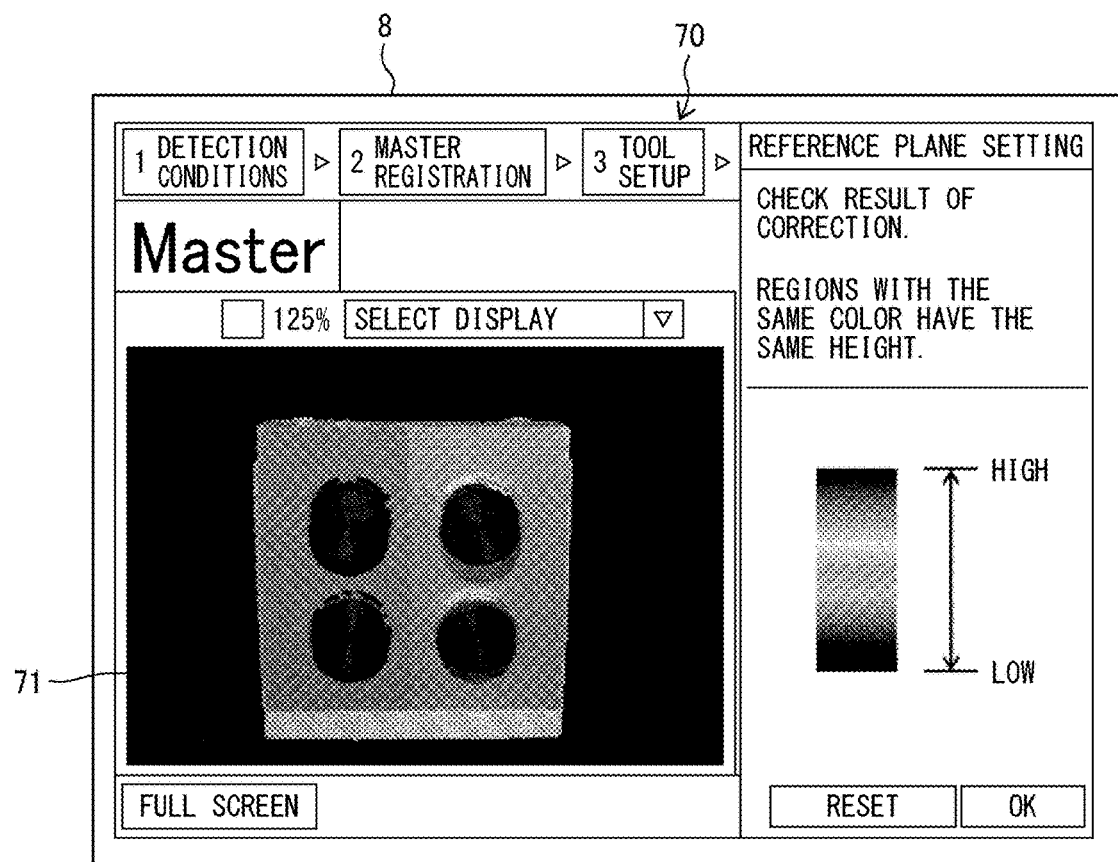
FIG. 40 shows a screen after the inclination is corrected.

After the first to the third points 91 to 93 are designated, a signal processor of the slave amplifier 3 or the sensor head 2 calculates a displacement at each pixel so that the first to the third points 91 to 93 will have the same height. This calculation results in making the designated points have the same height as shown in FIG. 40.

Optimization of Pitch of Measurement Light

Figure 41A:
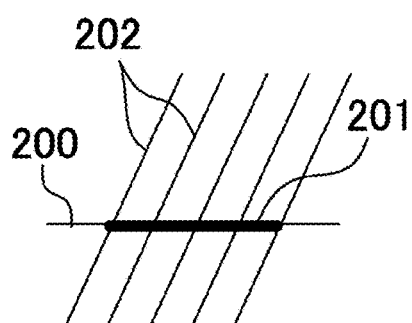
FIGS. 41A to 41C are diagrams for explaining a method of optimizing an irradiation pitch of the measurement light in accordance with a direction of the reference plane.
Figure 41B:
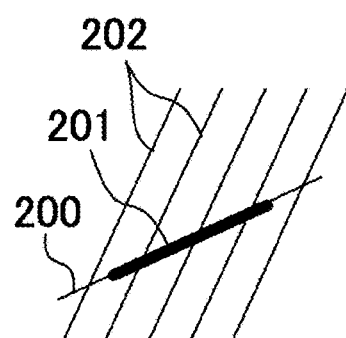
Figure 41C:
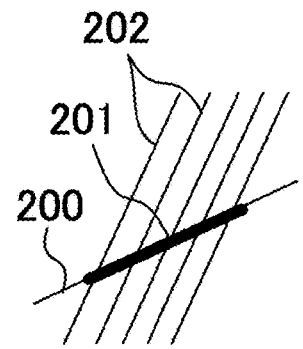

FIGS. 41A to 41C are diagrams for explaining a method of optimizing an irradiation pitch of the measurement light in accordance with a direction of a reference plane. The reference symbol 200 denotes a reference plane, the reference symbol 201 denotes a displacement measurement range, and the reference symbol 202 denotes measurement light.

FIG. 41A shows a situation in which five rays of the measurement light 202 are emitted to a horizontal reference plane 200 in the displacement measurement range 201. FIG. 41B shows a situation in which the reference plane 200 tilts upward to the right. In this situation, if the pitch of the measurement light 202 is the same as that in the case in FIG. 41A, only three rays of the measurement light 202 are emitted in the displacement measurement range 201, which can cause decrease in measurement accuracy. In this example, pitch changing control is performed to change the pitch of the measurement light 202 in accordance with the tilt of the reference plane 200. As shown in FIG. 41C, in the case in which the reference plane 200 tilts, the pitch of the measurement light 202 is narrowed so that the displacement measurement range 201 will be irradiated with the same number of rays of the measurement light 202 as the number of rays in the case in which the reference plane 200 is horizontal. This suppresses decrease in measurement accuracy. This process may be performed after the reference plane is determined by the tilt correction.

Correction of Height of Reference Plane

Figure 42A:
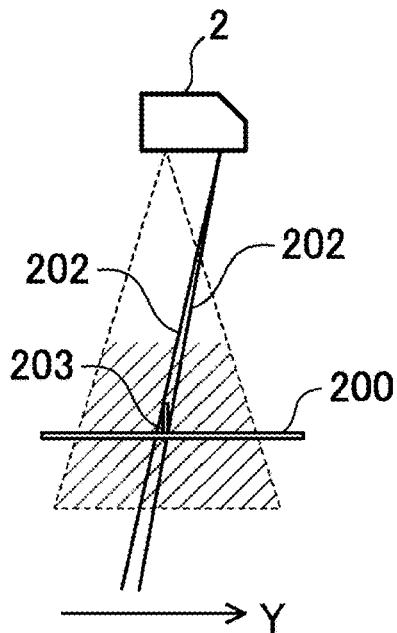
FIGS. 42A and 42B are diagrams for explaining an overview of correcting a height of a reference plane.
Figure 42B:
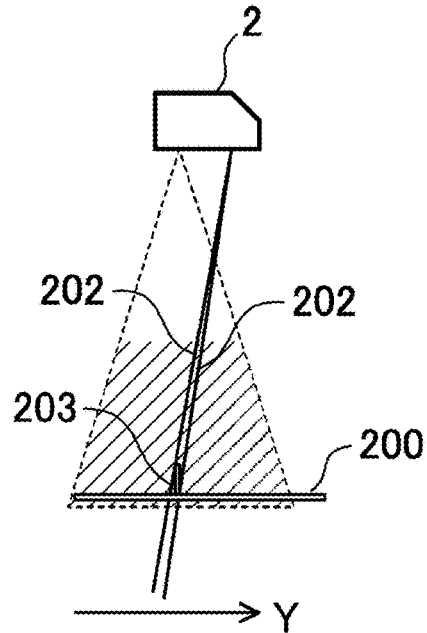

FIGS. 42A and 42B are drawings for explaining an overview of correcting a height of a reference plane. The reference symbol 200 denotes a reference plane, the reference symbol 201 denotes a displacement measurement range, the reference symbol 202 denotes measurement light, and the reference symbol 203 denotes a measurement range. It is assumed that a measurement object W is placed on a pedestal. In measuring a top surface of the measurement object W, a height variation of the measurement object W relative to the pedestal in each of upper and lower directions may be small and may be, for example, 5 mm. However, in a case in which the height variation of the pedestal in each of the upper and lower directions is, for example, 20 mm, the measurement range of 25 mm in each of the upper and lower directions should be set in total, which can cause increase in measurement time.

In this example, after the tilt is corrected by using the pedestal as a reference plane, it is enough to measure only the measurement range 203 relative to the reference plane 200, and measurement is performed for only a height of 5 mm in each of the upper and lower directions. This shortens measurement time.

Designated-Height Area Tool

The designated-height area tool measures a height in a measurement tool region, extracts a part with the height within a designated height range as an area, and displays the result. In measuring a height in the measurement tool region, a scanning range of the measurement light tends to be wide, thereby increasing the measurement time. On the other hand, the designated-height area tool dispenses with measurement of every height in the measurement tool region and checking whether the every height is in the designated height range, and the designated-height area tool enables measurement only in the designated height range and extraction of the measured part as an area. With this tool, the measurement speed is increased by performing measurement only in the designated height range.

Figure 43:
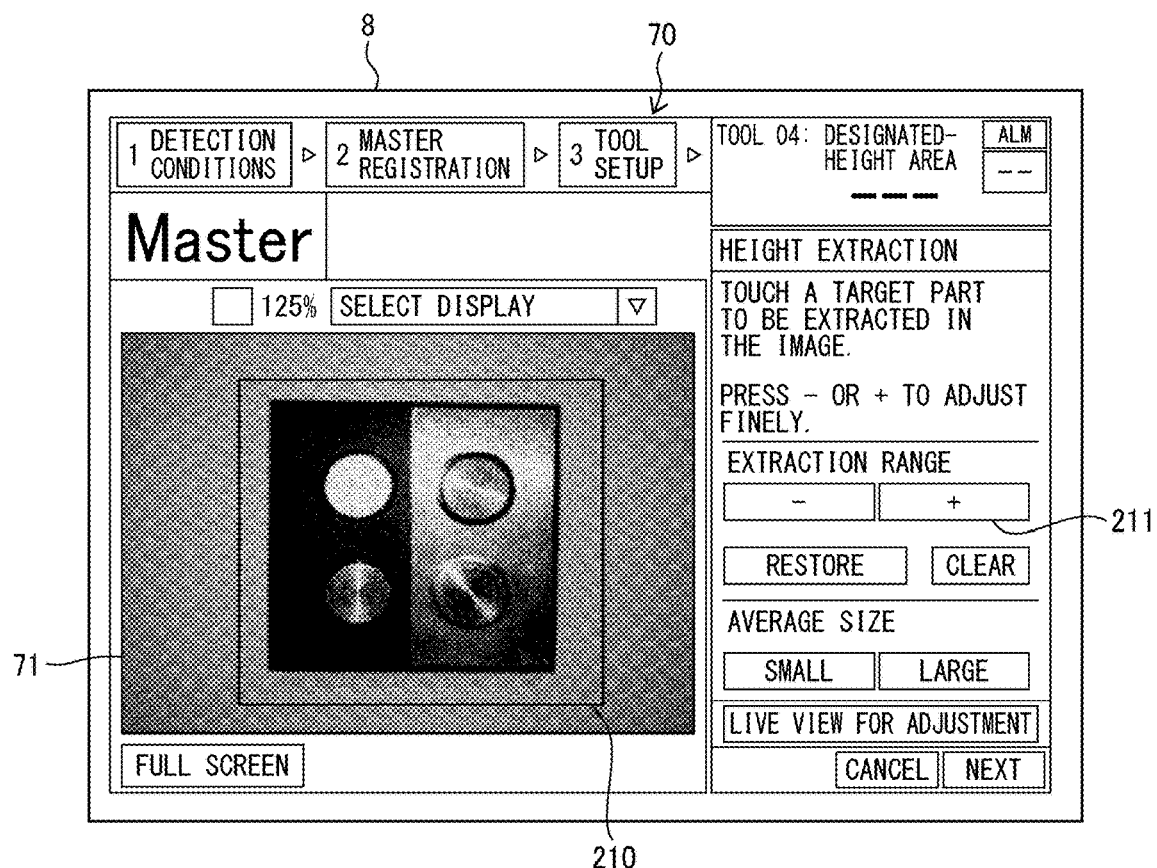
FIG. 43 shows a setting screen of a designated-height area tool.

A specific example is described with reference to images shown in FIGS. 43 to 45 and a flowchart shown in FIG. 46. In step SF1 of the flowchart shown in FIG. 46, a luminance image is displayed in the user interface 70 as shown in FIG. 43. In step SF2 in FIG. 46, designation of a position of a measurement tool region 210 is received, whereby the measurement tool region 210 is set as shown in FIG. 43. The measurement tool region 210 is set in a manner similar to that for setting the region 74 for position correction.

Figure 45:
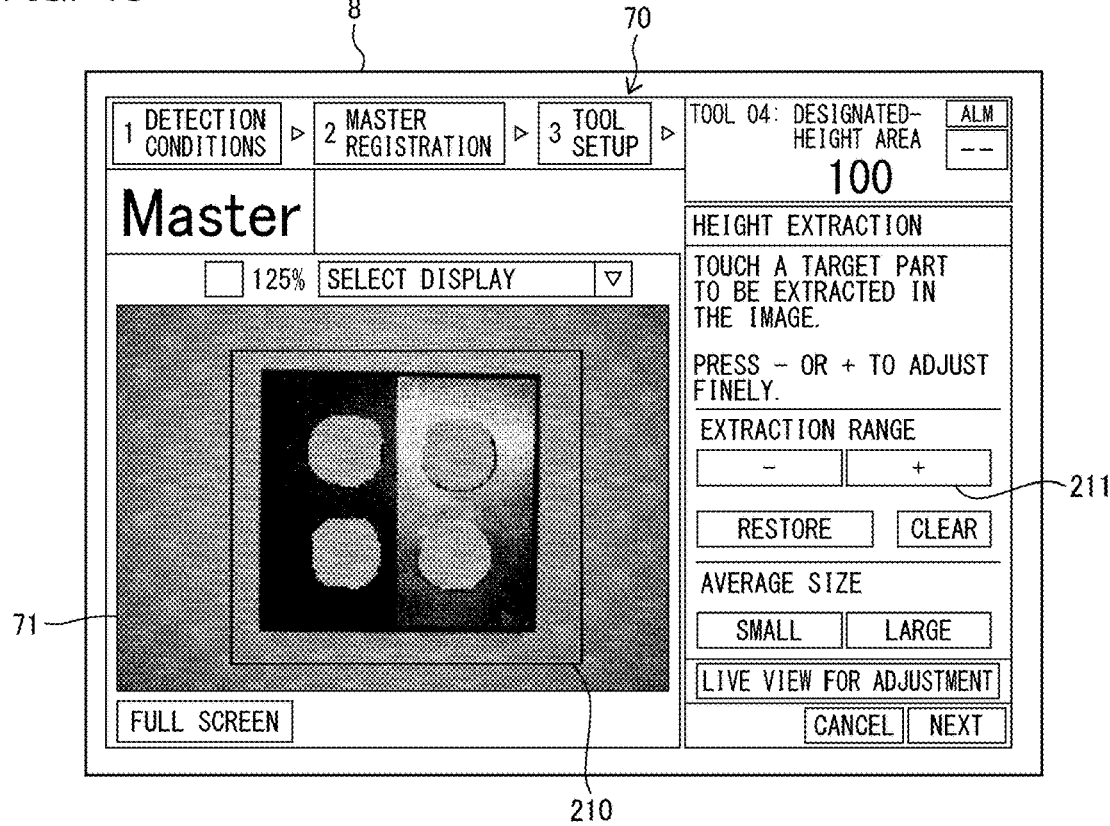
FIG. 45 shows a state in which second designation of an extraction part is received.
Figure 46:
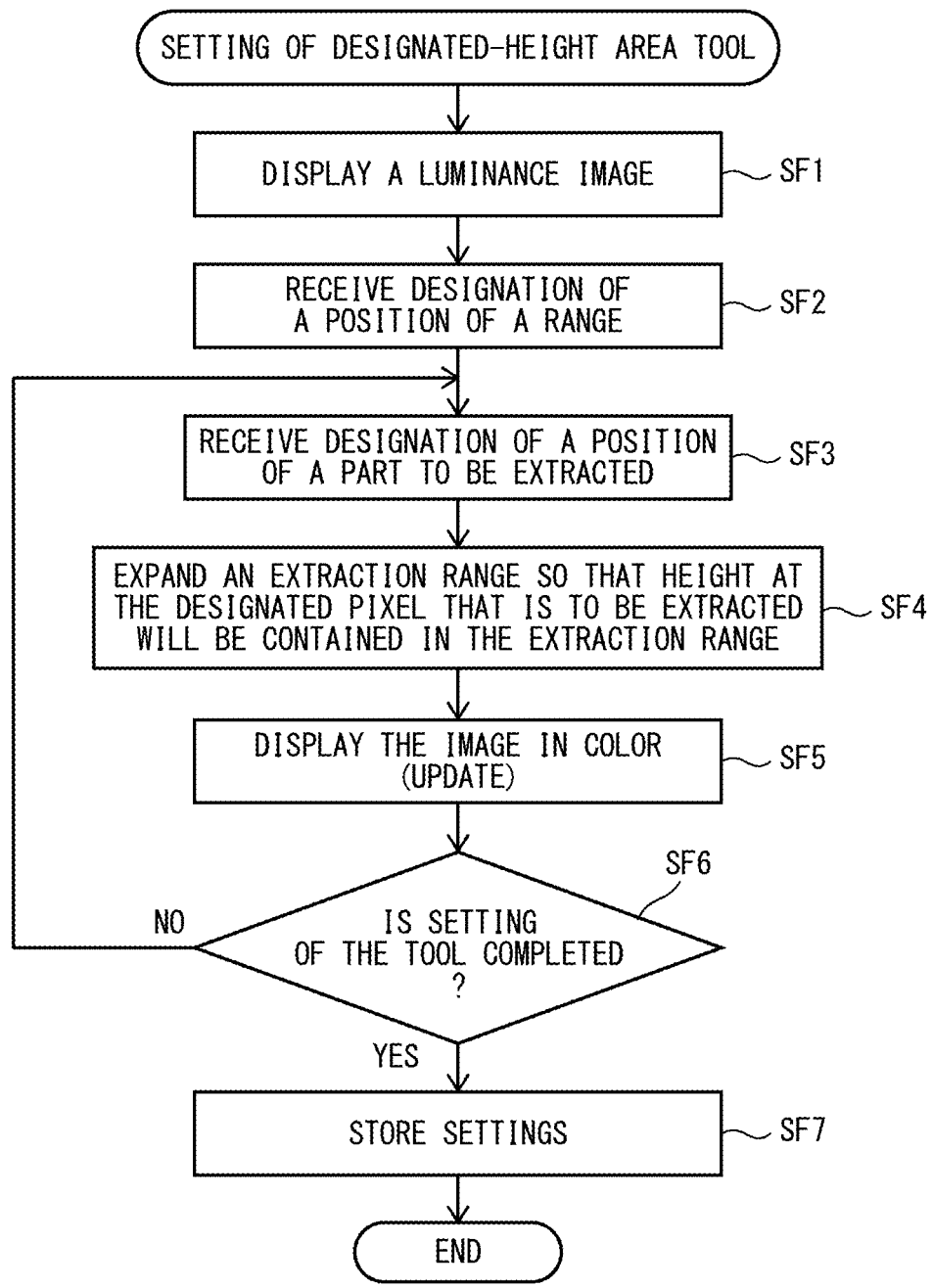
FIG. 46 is a flowchart showing a processing procedure for setting the designated-height area tool.

In step SF3 in FIG. 46, designation of a position of a part to be extracted as an area is received. This may be performed by the setting unit 304. More specifically, a user designates a part to be extracted as an area by using a stylus 211 or other tool, as shown in FIG. 44. In step SF4, an extraction range is expanded so as to cover a height at the designated pixel that is to be extracted. In step SF5, pixels in the extraction range are displayed in color. In step SF6, whether setting of the designated-height area tool is completed is determined. If setting of the designated-height area tool is still not completed, the procedure returns to step SF3, designation of a position of apart to be extracted is received for a second time. Thereafter, the procedure advances to step SF4, and the extraction range is expanded. Furthermore, the procedure advances to step SF5, pixels in the expanded extraction range are displayed in color. As a result, the pixels that are displayed in color are increased in FIG. 45, compared with those in the image in FIG. 44. The designation of the position of a part to be extracted may be performed three or more times. After setting of the designated-height area tool is completed, the setting content is stored in step SF7. This makes an upper limit value and a lower limit value of the extraction range be stored as setting values of the program. During operation, the stored upper limit value and the stored lower limit value are read, and an angle of the MEMS mirror 15 to be controlled is determined.

Figure 44:
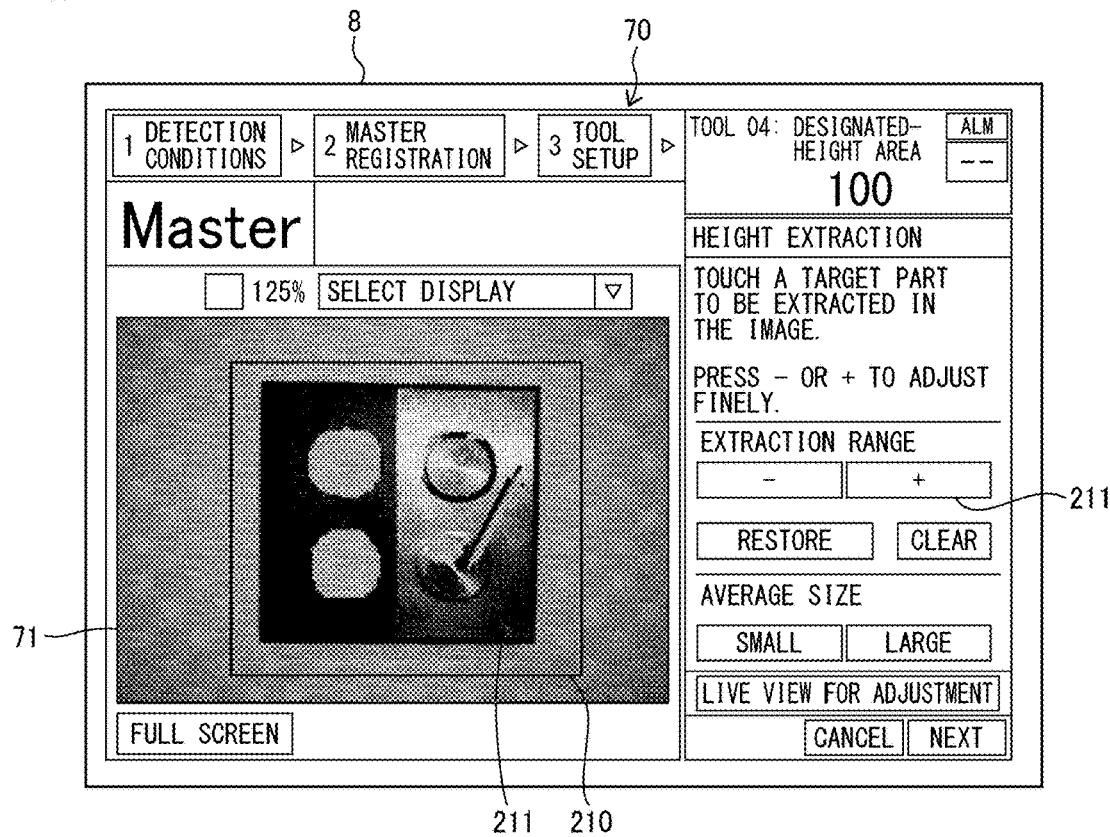
FIG. 44 shows a state in which first designation of an extraction part is received.

The method of setting the extraction range is not limited to the method using the stylus 211, and the extraction range may be set by operating an extraction range setting part 211 as shown in FIG. 44 or 45. The extraction range is expanded in response to pressing the "plus" button and is reduced in response to pressing the "minus" button.

Operation in Scanning Mode

Figure 47:
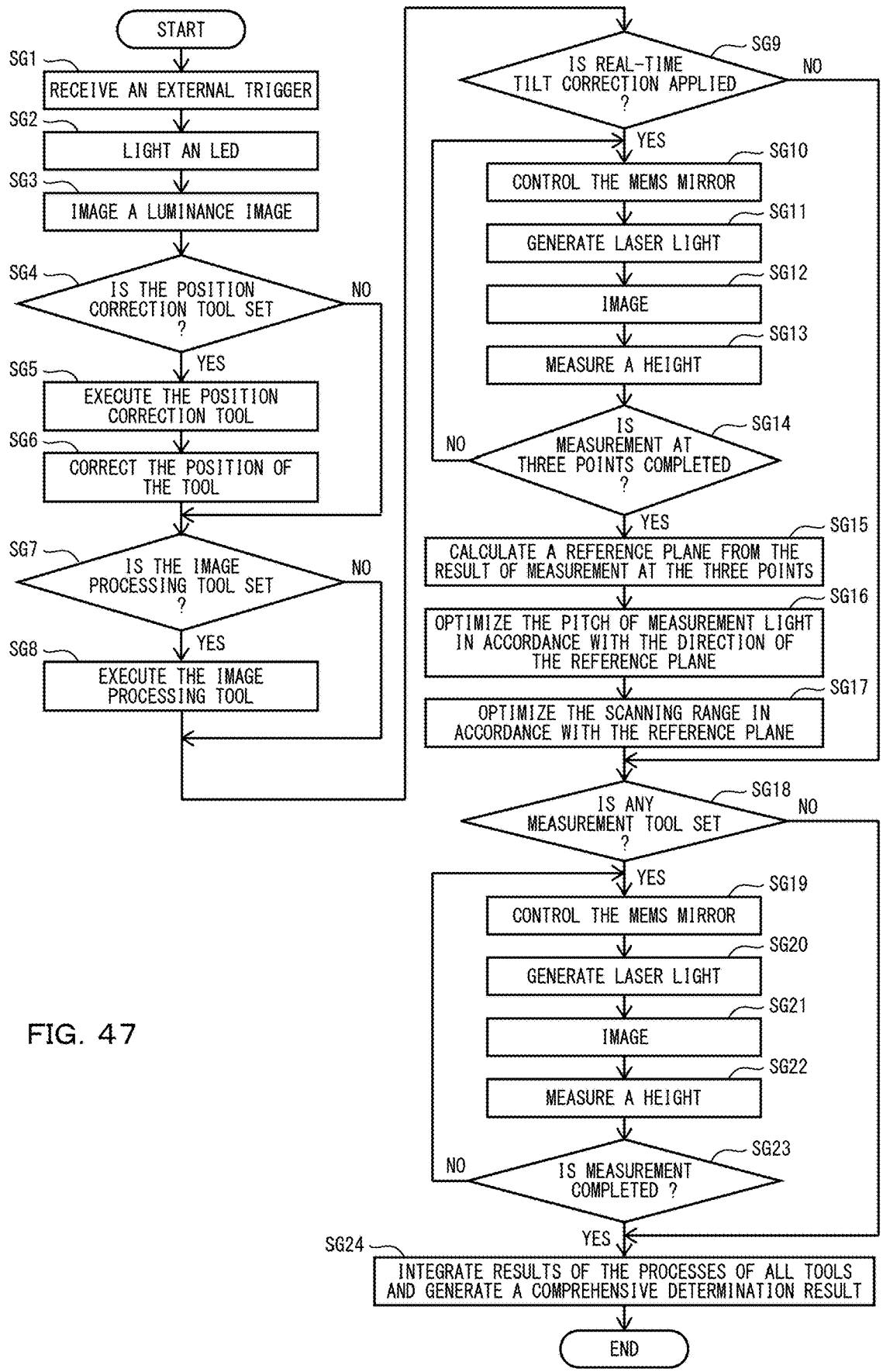
FIG. 47 is a flowchart of operation in the scanning mode.

FIG. 47 is a flowchart showing a procedure in operating the scanning mode of the displacement measuring apparatus 1. In step SG1 of the flowchart of operation in the scanning mode, an external trigger is received from the external device 6 or other device. In step SG2, the first to the fourth light emitting diodes 31 to 34 of the illuminator 30 are lighted. In step SG3, a luminance image is imaged. The image data is stored in, for example, the image data storage 320d of the slave amplifier 3. The image data storage 320d is shown in FIG. 7.

In step SG4, whether the position correction tool is applied is determined. If the position correction tool is selected at the time of setting, the procedure advances to step SG5, and if the position correction tool is not selected at the time of setting, the procedure advances to step SG7. The position correction tool is executed in step SG5, and the position of the measurement tool, that is, the measurement position is corrected in step SG6. The processes in steps SG5 and SG6 are performed by the position corrector 307.

In step SG7, whether the image processing tool is applied is determined. If the image processing tool is selected at the time of setting, the procedure advances to step SG8, and if the image processing tool is not selected at the time of setting, the procedure advances to step SG9. In step SG8, each type of image processing is executed. An example of the image processing includes one that is conventionally known.

In step SG9, whether real-time tilt correction is applied is determined. If execution of the tilt correction function is selected at the time of setting, the procedure advances to step SG10, and if execution of the tilt correction function is not selected at the time of setting, the procedure advances to step SG18. In step SG10, the MEMS mirror 15 is controlled to enable measurement of a displacement in the displacement measurement range containing the measurement position. In step SG11, strip-shaped measurement light is emitted from the laser output unit 12 to irradiate a measurement object W. Imaging is performed in step SG12, and a displacement is measured in step SG13.

In step SG14, whether measurement at each of the first to the third points 91 to 93 shown in FIG. 39 is completed is determined. If not all of the measurements at the first to the third points 91 to 93 are completed, the previous processes are repeated until measurements at the three points are completed. After all measurements at the first to the third points 91 to 93 are completed, the procedure advances to step SG15, and a reference plane is calculated by using the first to the third points 91 to 93. Thereafter, the procedure advances to step SG16, an irradiation pitch of the measurement light in the displacement measurement range is optimized in accordance with the direction of the reference plane. In step SG17, a scanning range of the measurement light is optimized in accordance with the height of the reference plane.

In step SG18, whether the measurement tool is applied is determined. If the measurement tool is selected at the time of setting, the procedure advances to step SG19, and if the measurement tool is not selected at the time of setting, the procedure advances to step SG24. In step SG19, depending on the type of the measurement tool, the MEMS mirror 15 is controlled to enable measurement of a displacement in the displacement measurement range containing the measurement position. In step SG20, strip-shaped measurement light is emitted from the laser output unit 12 to irradiate the measurement object W. Imaging is performed in step SG21, and a displacement is measured in step SG22. If all measurements are completed in step SG23, the procedure advances to step SG24, and if not all of the measurements are completed, the previous measurement is repeated. In step SG24, all results of the processes of the measurement tools are integrated to generate a comprehensive determination result. The generated comprehensive determination result is output.

Approximate Searching and Precise Measurement Processing

Figure 48:
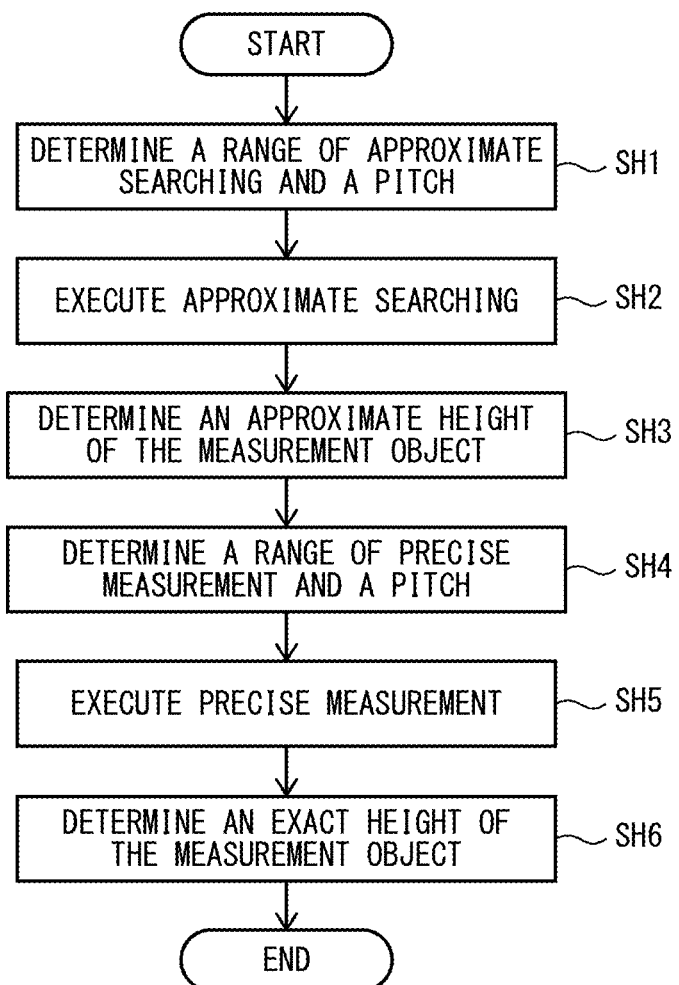
FIG. 48 is a basic flowchart of approximate searching and precise measurement processing.

FIG. 48 is a basic flowchart of approximate searching and precise measurement processing. After the approximate searching processing is performed by using the measurement light represented by the solid lines shown in FIG. 18A or 18B, precise measurement is performed by using the measurement light represented by the dashed lines shown in FIG. 18A or 18B.

In step SH1, a range of the approximate searching and a pitch of the measurement light are determined. In this embodiment, this pitch is greater than a pitch in the precise measurement and differs depending on the size of the displacement measurement range. The precise measurement will be described later. In step SH2, the approximate searching in which the pitch of the measurement light is large is executed. In step SH3, an approximate height of the measurement object W is determined. In step SH4, a range of the precise measurement and a pitch of the measurement light are determined. The range of the precise measurement covers the displacement measurement range. The pitch of the measurement light is set to cause multiple rays of the measurement light to irradiate the displacement measurement range. In step SH5, the precise measurement is executed. In step SH6, an exact height of the measurement object W is determined.

Figure 49:
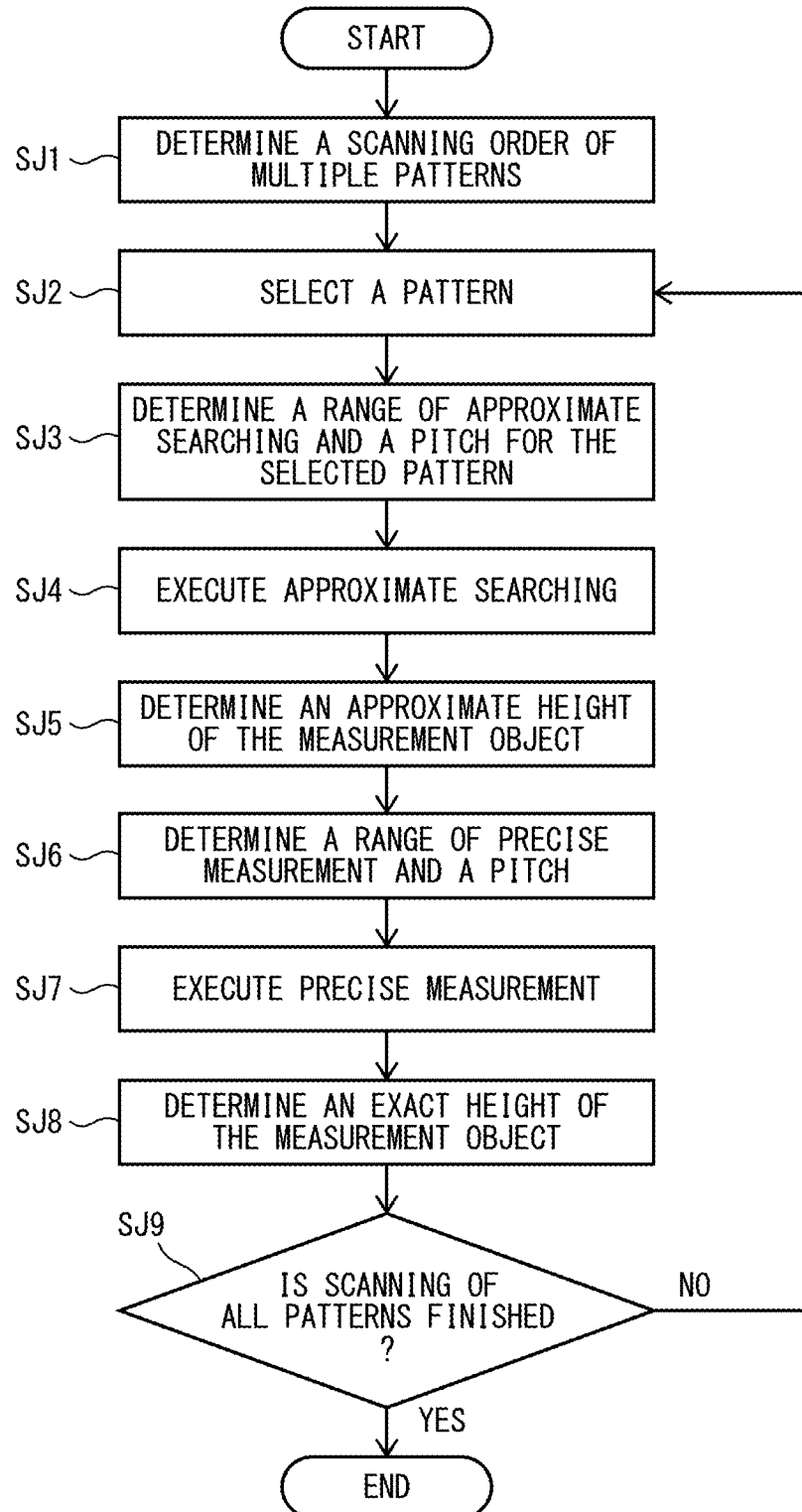
FIG. 49 is a flowchart of the approximate searching and the precise measurement processing in which multiple patterns are executed alternately.

FIG. 49 is a flowchart of the approximate searching and the precise measurement processing in which multiple patterns are executed alternately. In step SJ1, a scanning order of multiple patterns, for example, a pattern A, a pattern B, and . . . , is determined. In step SJ2, one pattern is selected from among the multiple patterns. In step SJ3, a range of the approximate searching and a pitch of the measurement light of the selected pattern are determined. In step SJ4, the approximate searching in which the pitch of the measurement light is large is executed. In step SJ5, an approximate height of the measurement object W is determined. In step SJ6, a range of the precise measurement and a pitch of the measurement light are determined. In step SJ7, the precise measurement is executed. In step SJ8, an exact height of the measurement object W is determined. In step SJ9, whether scanning of all of the patterns is finished is determined, and the previous processes are repeated until scanning of all of the patterns is finished.

Figure 50:
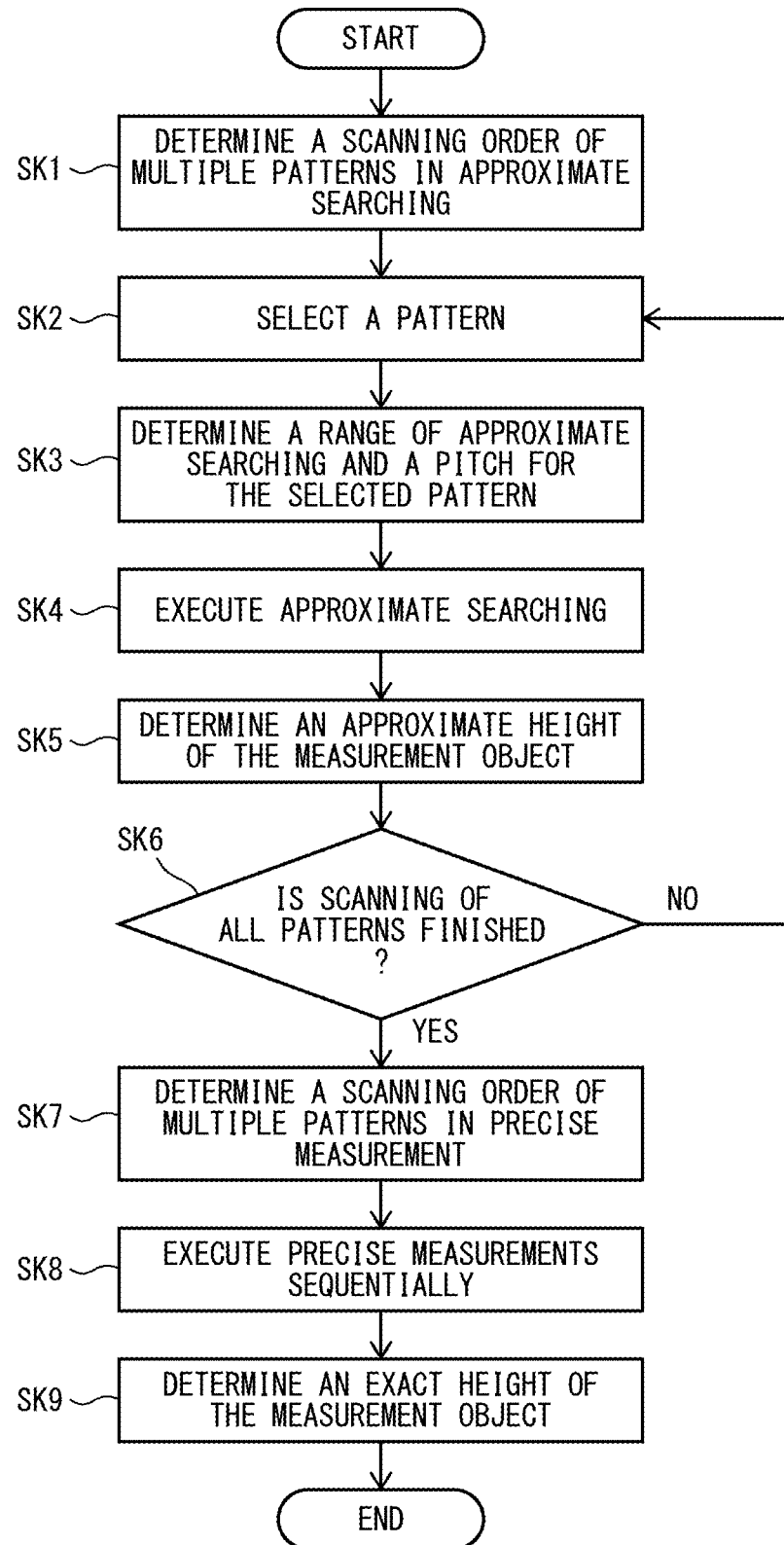
FIG. 50 is a flowchart of the approximate searching and the precise measurement processing in which multiple patterns are executed in the approximate searching prior to the precise measurement processing.

FIG. 50 is a flowchart of the approximate searching and the precise measurement processing in which multiple patterns are executed in the approximate searching prior to the precise measurement processing. In step SK1, a scanning order of the multiple patterns in the approximate searching is determined. In step SK2, one pattern is selected from among the multiple patterns. In step SK3, a range of the approximate searching and a pitch of the measurement light for the selected pattern are determined. In step SK4, the approximate searching in which the pitch of the measurement light is large is executed. In step SK5, an approximate height of the measurement object W is determined. In step SK6, whether all of the patterns in the approximate searching are finished is determined, and the previous processes are repeated until all of the patterns in the approximate searching are finished.

After all of the patterns in the approximate searching are finished, the procedure advances to step SK7, and a scanning order of the multiple patterns in the precise measurement is determined. In step SK8, the precise measurements are executed in the determined scanning order. In step SK9, an exact height of the measurement object W is determined.

Figure 51:
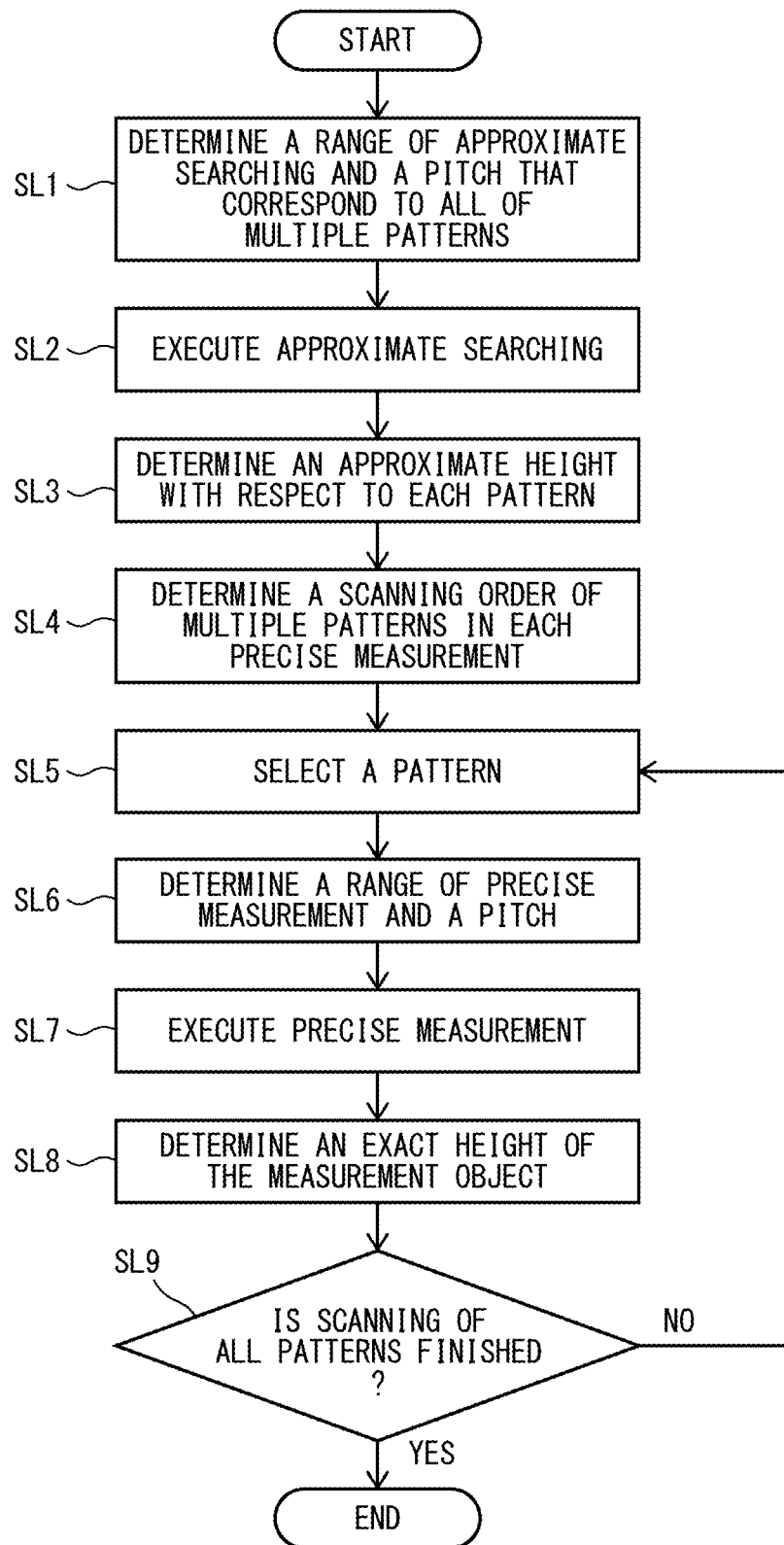
FIG. 51 is a flowchart of the approximate searching and the precise measurement processing in which multiple patterns are executed simultaneously in the approximate searching.

FIG. 51 is a flowchart of the approximate searching and the precise measurement processing in which multiple patterns are executed simultaneously in the approximate searching. In step SL1, a range of the approximate searching and a pitch of the measurement light that correspond to all of the multiple patterns are determined. In step SL2, the approximate searching in which the pitch of the measurement light is large is executed. In step SL3, an approximate height is determined with respect to each of the patterns. In step SL4, a scanning order of the multiple patterns in the precise measurement is determined. In step SL5, one pattern is selected from among the multiple patterns. In step SL6, a range of the precise measurement and a pitch of the measurement light are determined. In step SL7, the precise measurement is executed. In step SL8, an exact height of the measurement object W is determined. In step SL9, whether scanning of all of the patterns is finished is determined, and the previous processes are repeated until scanning of all of the patterns is finished.

Figure 52:
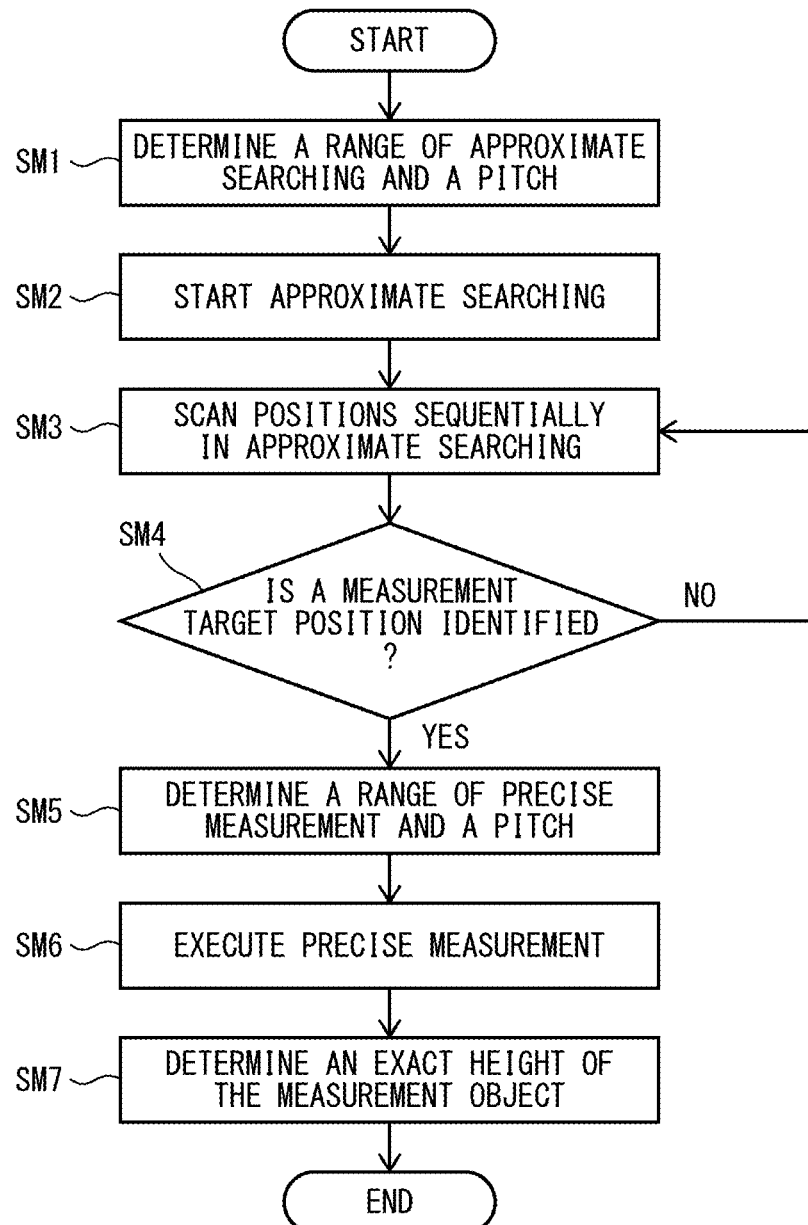
FIG. 52 is a flowchart of the approximate searching and the precise measurement processing in which the procedure advances to the precise measurement at the time height information of a measurement object is obtained during the approximate searching.

FIG. 52 is a flowchart of the approximate searching and the precise measurement processing in which the procedure advances to the precise measurement at the time height information of the measurement object W is obtained during the approximate searching. In step SM1, a range of the approximate searching and a pitch of the measurement light are determined. In step SM2, the approximate searching in which the pitch of the measurement light is large is started. In step SM3, positions for the approximate searching are sequentially scanned. In step SM4, whether the measurement position is identified is determined. If the measurement position is not identified, the procedure returns to step SM3, and the positions for the approximate searching are sequentially scanned. If the measurement position is identified, the procedure advances to step SM5, and a range of the precise measurement and a pitch of the measurement light with respect to the identified measurement position are determined. In step SM6, the precise measurement is executed. In step SM7, an exact height of the measurement object W is determined.

Figure 53:
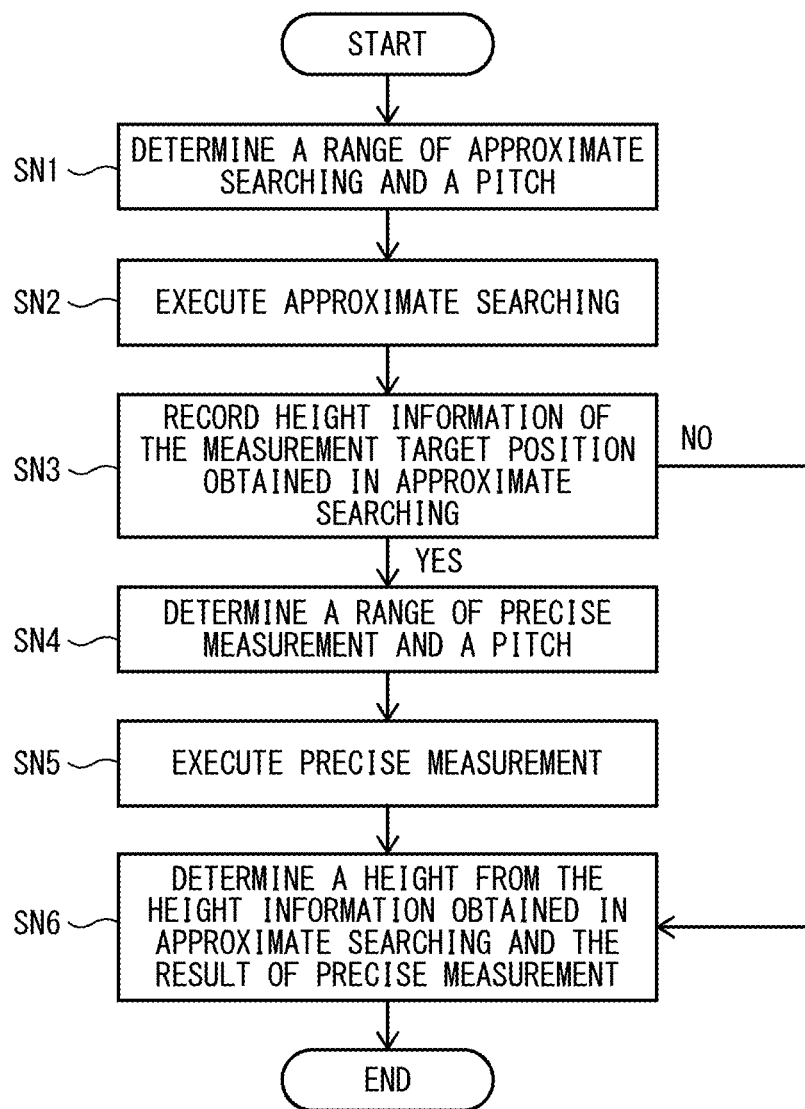
FIG. 53 is a flowchart of the approximate searching and the precise measurement processing in which a measurement position is determined from both results of the approximate searching and the precise measurement.

FIG. 53 is a flowchart of the approximate searching and the precise measurement processing in which a measurement position is determined from both results of the approximate searching and the precise measurement. In step SN1, a range of the approximate searching and a pitch of the measurement light are determined. In step SN2, the approximate searching in which the pitch of the measurement light is large is started. In step SN3, height information at the measurement position, which is obtained by the approximate searching, is recorded. In step SN4, a range of the precise measurement and a pitch of the measurement light are determined. In step SN5, the precise measurement is executed. In step SN6, the height of the measurement object W is determined from the height information, which is obtained by the approximate searching in step SN3, and the result of the precise measurement, which is obtained in step SN5.

Procedure in Line Mode

Figure 54:
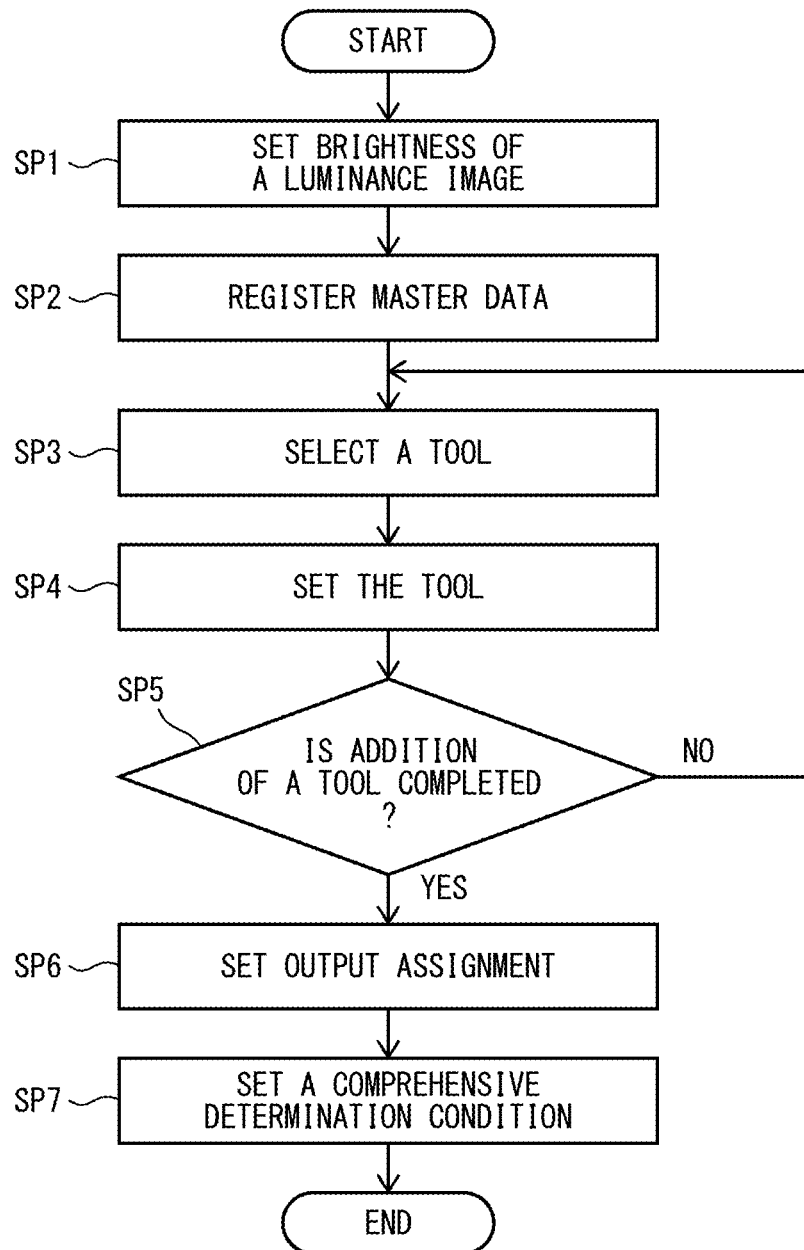
FIG. 54 is a flowchart in the line mode.

FIG. 54 is a flowchart in the line mode. A step for setting an external trigger, an internal trigger, or other conditions is omitted in this flowchart. In step SP1, brightness of a luminance image is set. In step SP2, master data is registered. In step SP3, a measurement tool is selected. After the measurement tool is selected, the procedure advances to step SP4, and setting of each tool is performed. Whether addition of the measurement tool is completed is determined in step SP5. If addition of the measurement tool is still not completed, the measurement tool is added through steps SP3 and SP4. After addition of the measurement tool is completed, the procedure advances to step SP6. In step SP6, output assignment is set. Thereafter, a comprehensive determination condition is set in step SP7. As in the case of the scanning mode, registration of the master data in step SP2 may be omitted.

Figure 55:
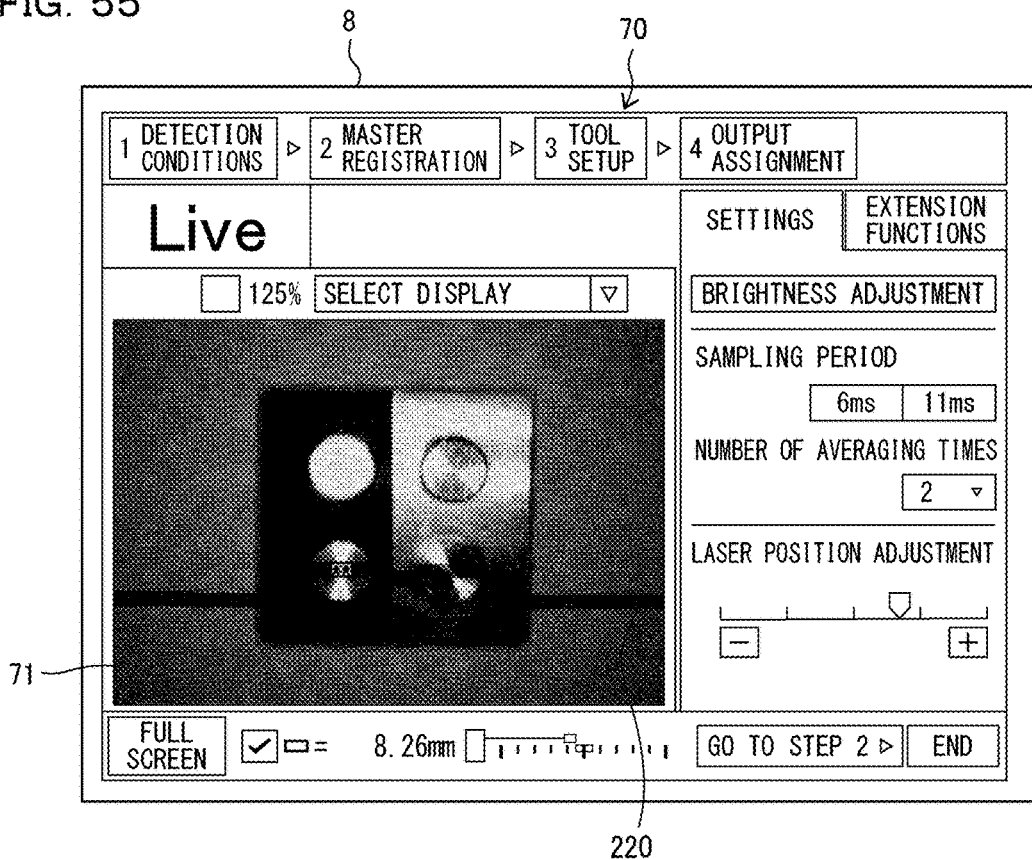
FIG. 55 shows a user interface showing a luminance image in the line mode.

As shown in FIG. 55, a virtual measurement emission line 220 is displayed in a manner superimposed on a luminance image displayed in the user interface 70. The measurement emission line 220 indicates a part irradiated with the measurement light and is displayed so as to correspond to the position of irradiation of the measurement light.

Figure 56:
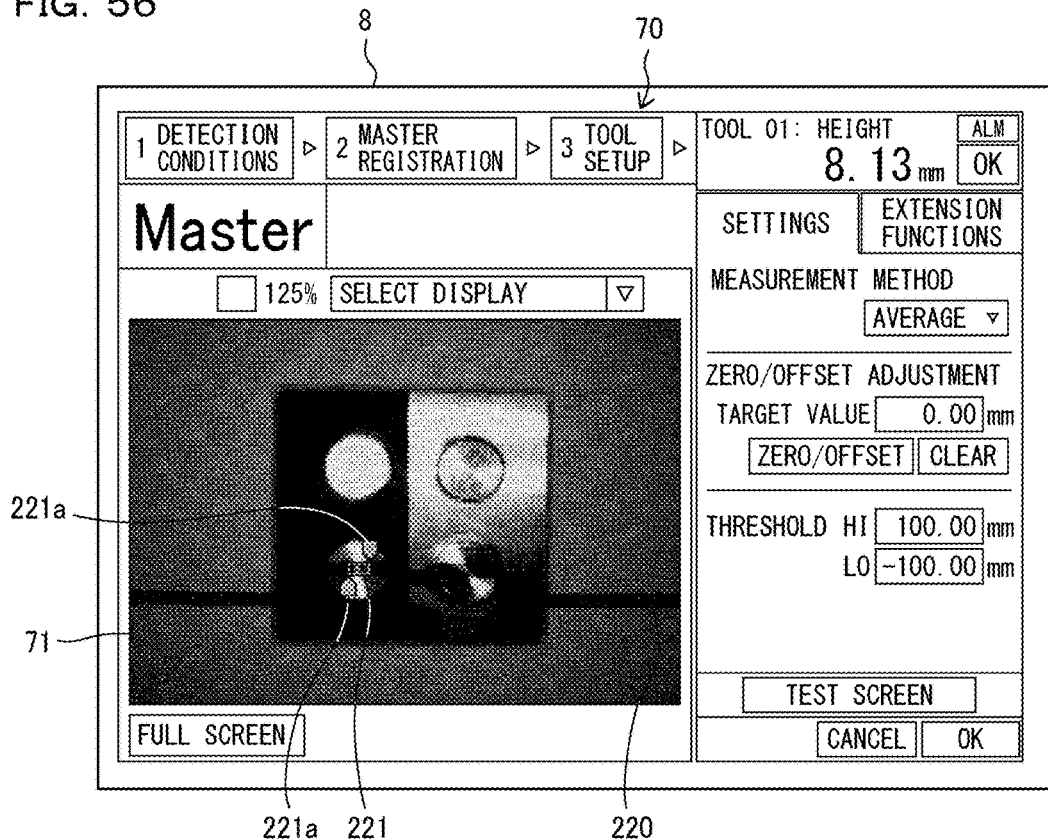
FIG. 56 corresponds to FIG. 55 and shows a state in which the displacement measurement range is set by using the height tool.

FIG. 56 shows a state in which a displacement measurement range 221 is set by using the height tool in the line mode. It is possible to set the displacement measurement range 221 on the measurement emission line 220. A mark 221a with an arrow shape at each side of the displacement measurement range 221 is controlled to change the length and the position of the displacement measurement range 221.

Figure 57:
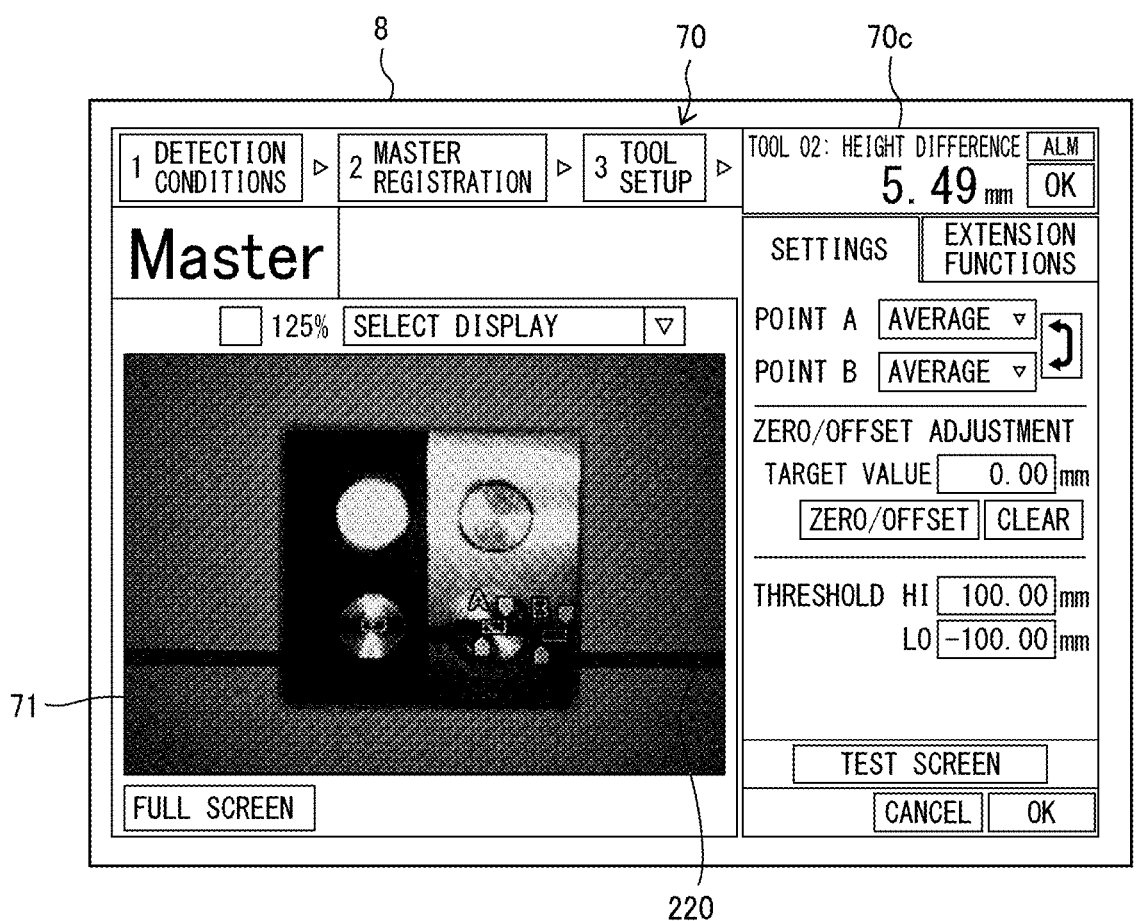
FIG. 57 corresponds to FIG. 55 and shows a state in which the displacement measurement range is set by using the height difference tool.

FIG. 57 shows a state in which a displacement measurement range 221 is set by using the height difference tool in the line mode. It is possible to set two positions, for example, a point A and a point B, on the measurement emission line 220. In response to designation of the points A and B, a height difference between the two points is displayed in terms of numerical value in the measured value display part 70c that is provided at the upper part of the user interface 70.

Master Registration in Line Mode

Figure 58:
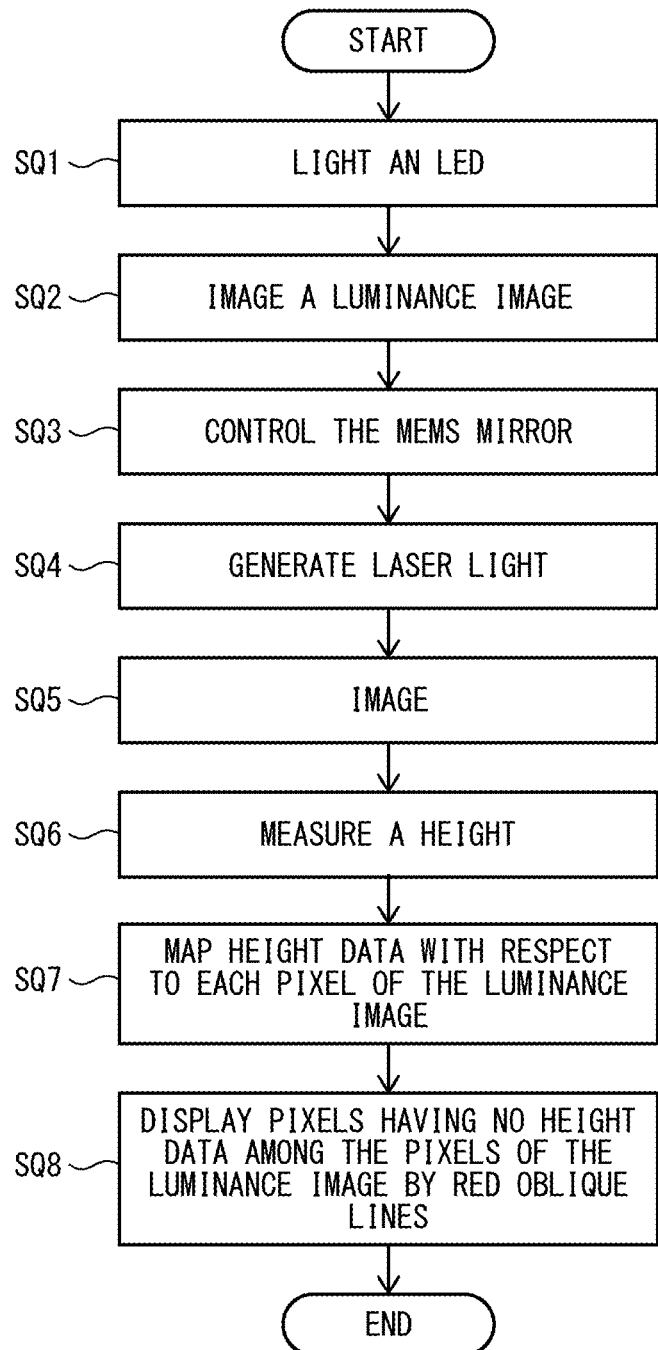
FIG. 58 is a master registration flowchart in the line mode.

Next, details of the master registration in the line mode are described. In step SQ1 in a master registration flowchart shown in FIG. 58, the first to the fourth light emitting diodes 31 to 34 of the illuminator 30 are lighted. In step SQ2, a luminance image is imaged. In step SQ3, the MEMS mirror 15 is controlled to enable measurement of displacements of the whole measurement object W in the whole luminance image. In step SQ4, strip-shaped measurement light is emitted from the laser output unit 12 to irradiate the measurement object W. An image is obtained in step SQ5, and a displacement is measured in step SQ6.

In step SQ7, height data is mapped with respect to each pixel of the luminance image. In step SQ8, each pixel having no height data among the pixels of the luminance image is shown on the display 8 by red oblique lines.

Operation in Line Mode

Figure 59:
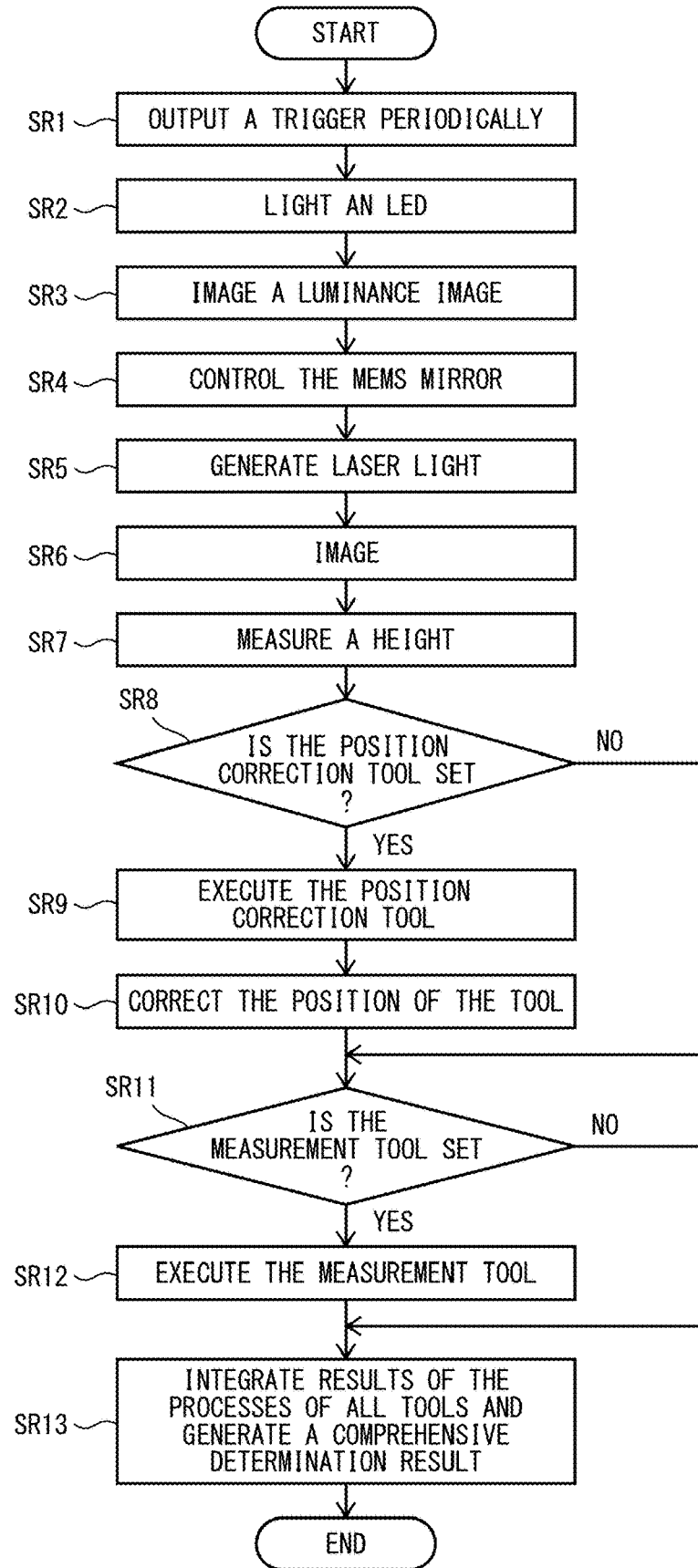
FIG. 59 is a flowchart of operation of the line mode.

FIG. 59 is a flowchart showing a procedure in operating the line mode of the displacement measuring apparatus 1. In step SR1 in the flowchart of operation in the line mode, a trigger signal is output periodically. In step SR2, the first to the fourth light emitting diodes 31 to 34 of the illuminator 30 are lighted. In step SR3, a luminance image is imaged. In step SR4, the MEMS mirror 15 is controlled to enable measurement of a displacement in the displacement measurement range containing the measurement position. In step SR5, strip-shaped measurement light is emitted from the laser output unit 12 to irradiate the measurement object W. Imaging is performed in step SR6, and a displacement is measured in step SR7.

In step SR8, whether the position correction tool is applied is determined. If the position correction tool is selected at the time of setting, the procedure advances to step SR9, and if the position correction tool is not selected at the time of setting, the procedure advances to step SR11. The position correction tool is executed in step SR9, and the position of the measurement tool, that is, the measurement position is corrected in step SR10.

In step SR11, whether the measurement tool is applied is determined. If the measurement tool is selected at the time of setting, the procedure advances to step SR12, and if the measurement tool is not selected at the time of setting, the procedure advances to step SR13. In step SR12, the measurement tool is executed. When all measurements are completed, all results of the processes of the measurement tools are integrated to generate a comprehensive determination result in step SR13. The generated comprehensive determination result is output.

Effects of Embodiment

In this embodiment, a measurement position at which a displacement is to be measured is set in a luminance image displayed on the display 8, and the measurement position is irradiated with the measurement light. The measurement light is reflected back from the measurement position and is received by the displacement measurement light receiver 40, thereby providing a received-light quantity distribution for displacement measurement. On the basis of this received-light quantity distribution for displacement measurement, a displacement at the measurement position is measured. Thus, it is not necessary to scan the whole measurement object W by using the measurement light, to measure the three-dimensional shape of the measurement object W. This enables short-time measurement of a displacement at a predetermined position of the measurement object W.

In operation of the displacement measuring apparatus 1, the position and the posture of the measurement object W are determined by using position correction information, and the measurement position is corrected. The measurement light is emitted to the corrected measurement position to measure a displacement at the corrected measurement position. This enables short-time measurement of a displacement at a predetermined position of the measurement object W even when the position or the posture of the measurement object W is changed.

A first irradiation angle of the scanning mirror at the time the measurement light is emitted to a measurement position is determined while the measurement light scans in the first scanning range. Thereafter, a second irradiation angle of the scanning mirror at the time the measurement light is emitted to the measurement position is determined while the scanning mirror is moved in a second scanning range that covers the first irradiation angle and that is smaller than the first scanning range. In these conditions, a displacement at the measurement position is measured on the basis of the second irradiation angle and the position in the second direction of the measurement position. This enables measuring a displacement at a predetermined position of the measurement object W for a short time at a high accuracy.

The irradiation angle of the scanning mirror at the time the measurement light is emitted to the measurement position is determined, and a displacement at the measurement position is measured on the basis of the irradiation angle and the peak position of the received-light quantity distribution acquired when the measurement light is emitted to the measurement position. This enables short-time measurement of a displacement at a predetermined position of the measurement object W.

In the case in which the scanning mode is selected, the measurement light is sequentially emitted to different positions in the second direction of the measurement object W. In the case in which the line mode is selected, the measurement light is emitted to the same positions of the measurement object W. Thereafter, a displacement of the measurement object W is measured on the basis of the received-light quantity distribution output from the displacement measurement light receiver 40. Thus, a displacement at a predetermined position is measured in each of the cases in which the measurement object W remains stationary and in which the measurement object W moves.

The forgoing embodiment is merely an illustration in every aspect and should not be limitedly understood. Moreover, all modifications and alterations belonging to equivalents of the claims are considered to fall within the scope of the present invention.

As described above, the displacement measuring apparatus according to the present invention can be used in measuring a displacement at a predetermined position of each type of a measurement object.

What is claimed is:

1. A displacement measuring apparatus for measuring a displacement at a predetermined position of a measurement object, the displacement measuring apparatus comprising:
   a light projector including a measurement light source and a light projection lens that receives light from the measurement light source, and the light projector configured to emit strip-shaped measurement light extending in a first direction, to the measurement object;
   a scanning part including a scanning mirror that is configured to perform scanning using the measurement light in a second direction crossing the first direction;
   a light receiver including a two-dimensional light receiving element, the two-dimensional light receiving element configured to output a received-light quantity distribution for displacement measurement in response to sequentially receiving the measurement light, and the measurement light made to scan by the scanning part and be reflected back from different positions in the second direction of the measurement object;
   a setting unit configured to receive setting of a measurement position, at which a displacement is measured, in a range scannable by the scanning part;
   an angle measuring unit configured to measure an irradiation angle of the scanning mirror;
   a measurement controller configured to acquire a first irradiation angle of the scanning mirror that is measured by the angle measuring unit at the time the measurement light is emitted to the measurement position while the measurement controller moves the scanning mirror in a first scanning range that is narrower than the scannable range to cause the measurement light to irradiate at least the measurement position that is set by the setting unit, and the measurement controller further configured to acquire a second irradiation angle of the scanning mirror that is measured by the angle measuring unit at the time the measurement light is emitted to the measurement position while the measurement controller moves the scanning mirror in a second scanning range that covers the first irradiation angle and that is narrower than the first scanning range; and
   a displacement measuring unit configured to acquire the received-light quantity distribution for displacement measurement output from the light receiver and to measure the displacement at the measurement position on a basis of the second irradiation angle and the position in the second direction of the measurement position.

2. The displacement measuring apparatus according to claim 1, wherein the displacement measuring unit acquires the received-light quantity distribution for displacement measurement, which is output from the light receiver while scanning is performed in the first scanning range, at intervals longer than the intervals of the acquisition of the received-light quantity distribution for displacement measurement, which is output from the light receiver while scanning is performed in the second scanning range.

3. The displacement measuring apparatus according to claim 1, wherein the measurement controller performs a second scanning process for scanning the measurement object at a relatively small pitch by using the measurement light in the second scanning range after performing a first scanning process for scanning the measurement object at a relatively large pitch by using the measurement light in the first scanning range, and the displacement measuring unit is configured to measure the displacement at the measurement position on a basis of the received-light quantity distribution obtained at the time the measurement light is emitted to a region containing the measurement position in the second scanning process.

4. The displacement measuring apparatus according to claim 1, wherein the setting unit is configured to set multiple positions that differ from each other at least in the second direction in the range scannable by the scanning part, as measurement positions at which a displacement is to be measured, and the measurement controller is configured to cause the measurement light to irradiate each of the measurement positions in the first scanning range and in the second scanning range, in this order.

5. The displacement measuring apparatus according to claim 1, wherein the setting unit is configured to set multiple positions that differ from each other at least in the second direction in the range scannable by the scanning part, as a first measurement position and a second measurement position at which a displacement is to be measured, and the measurement controller is configured to cause the measurement light to irradiate the first measurement position in the first scanning range and in the second scanning range, in this order, and then irradiate the second measurement position in the first scanning range and in the second scanning range, in this order.

6. The displacement measuring apparatus according to claim 1, wherein the setting unit is configured to set multiple positions that differ from each other at least in the second direction in the range scannable by the scanning part, as a first measurement position and a second measurement position at which a displacement is to be measured, and the measurement controller is configured to cause the measurement light to irradiate the first measurement position and the second measurement position in the first scanning range and then irradiate the first measurement position and the second measurement position in the second scanning range.

7. The displacement measuring apparatus according to claim 1, further comprising a measurement tool selector having multiple measurement tools, in which dimensions of displacement measurement regions differ from each other, and configured to receive selection of the measurement tool that is freely selected from among the multiple measurement tools, and the measurement controller is configured to vary the pitch of the measurement light for scanning the measurement position, in accordance with dimensions of the measurement region of the measurement tool selected by the measurement tool selector.

8. The displacement measuring apparatus according to claim 7, wherein the measurement controller moves the scanning mirror to cause the measurement light to irradiate the measurement region of the measurement tool that is selected by the measurement tool selector.

9. The displacement measuring apparatus according to claim 8, wherein the measurement controller moves the scanning mirror to cause the measurement light to irradiate the measurement region of the measurement tool selected by the measurement tool selector, at intervals in the second direction multiple times, the displacement measuring unit is configured to measure the displacement at the measurement position multiple times by acquiring the received-light quantity distribution for displacement measurement, which is output from the light receiver, each time the measurement light is emitted, and the displacement measuring unit is further configured to average the obtained multiple displacements.

* * * * *